US012458753B2

(12) United States Patent
Jepson et al.

(10) Patent No.: US 12,458,753 B2
(45) Date of Patent: Nov. 4, 2025

(54) MANAGING BOLUS DOSES

(71) Applicant: DexCom, Inc., San Diego, CA (US)

(72) Inventors: Lauren Hruby Jepson, San Diego, CA (US); Alexandra Elena Constantin, San Diego, CA (US); Matthew T. Vogel, Encinitas, CA (US); Christopher Robert Hannemann, San Diego, CA (US); Todd N. Haseyama, San Diego, CA (US); Apurv Ullas Kamath, San Diego, CA (US); Sarah Kate Pickus, San Diego, CA (US); Stephen J. Vanslyke, Carlsbad, CA (US); Kamuran Turksoy, Clarksburg, MD (US); Ghazaleh R. Esmaili, San Diego, CA (US); Leah Ziegler, San Diego, CA (US)

(73) Assignee: Dexcom, Inc., San Diego, CA (US)

( * ) Notice: Subject to any disclaimer, the term of this patent is extended or adjusted under 35 U.S.C. 154(b) by 362 days.

(21) Appl. No.: 17/131,364

(22) Filed: Dec. 22, 2020

(65) Prior Publication Data

US 2021/0205534 A1 Jul. 8, 2021

Related U.S. Application Data

(60) Provisional application No. 62/958,636, filed on Jan. 8, 2020.

(51) Int. Cl.
*A61M 5/172* (2006.01)
*G16H 10/20* (2018.01)
(Continued)

(52) U.S. Cl.
CPC .......... *A61M 5/1723* (2013.01); *G16H 10/20* (2018.01); *G16H 20/17* (2018.01); *G16H 40/67* (2018.01);
(Continued)

(58) Field of Classification Search
CPC .......... A61M 5/1723; A61M 2205/502; A61M 2230/201; A61M 5/142; A61M 5/003;
(Continued)

(56) References Cited

U.S. PATENT DOCUMENTS

2001/0025156 A1 9/2001 Bui et al.
2010/0174266 A1* 7/2010 Estes ...................... G16H 20/17
604/504

(Continued)

OTHER PUBLICATIONS

International Search Report and Written Opinion dated Apr. 13, 2021 for Application No. PCT/US2020/066717 filed Dec. 22, 2020; 20 pages.

*Primary Examiner* — Kami A Bosworth
*Assistant Examiner* — Avery Smale
(74) *Attorney, Agent, or Firm* — PATTERSON + SHERIDAN, LLP

(57) ABSTRACT

Various examples are directed to systems and methods for generating a bolus dose for a host. A bolus application may display a first bolus configuration parameter question at a user interface and receive, through the user interface, a first answer to the first bolus configuration parameter question. The first answer may describe a previous bolus determination technique of the host. The bolus application may select a second bolus configuration parameter question using the first answer and provide the second bolus configuration parameter question at the user interface. The bolus application may determine a set of at least one bolus configuration parameter using the first answer and a second answer to the second bolus configuration parameter question.

17 Claims, 31 Drawing Sheets

(51) Int. Cl.
   *G16H 20/17*      (2018.01)
   *G16H 40/67*      (2018.01)
(52) U.S. Cl.
   CPC . *A61M 2205/502* (2013.01); *A61M 2230/201* (2013.01)
(58) Field of Classification Search
   CPC .... A61M 2005/14208; A61M 5/14244; A61M 5/14248; A61M 2005/14272; A61M 5/168; A61M 2205/04; A61M 2205/33; A61M 2205/3303; G16H 10/20; G16H 20/17; G16H 40/67; G16H 20/10
   See application file for complete search history.

(56) References Cited

U.S. PATENT DOCUMENTS

| | | |
|---|---|---|
| 2013/0274654 A1 | 10/2013 | Tsoukalis et al. |
| 2017/0049386 A1 | 2/2017 | Abraham et al. |
| 2017/0189614 A1* | 7/2017 | Mazlish ............... A61M 5/1452 |
| 2017/0269023 A1* | 9/2017 | Sloan .................... G01N 27/307 |
| 2017/0316592 A1 | 11/2017 | Kamath et al. |
| 2019/0180858 A1* | 6/2019 | Booth .................... G16H 80/00 |

\* cited by examiner

MANAGING BOLUS DOSES

INCORPORATION BY REFERENCE TO ANY PRIORITY APPLICATIONS

This application claims the benefit of priority to U.S. Provisional Patent Application No. 62/958,636, filed on Jan. 8, 2020, entitled "MANAGING BOLUS DOSES," the contents of which are hereby incorporated by reference in its entirety, and is hereby expressly made a part of this specification. Any and all applications for which a foreign or domestic priority claim is identified in the Application Data Sheet as filed with the present application are hereby incorporated by reference under 37 CFR 1.57.

TECHNICAL FIELD

The present disclosure relates generally to medical devices such as analyte sensors, and more particularly, by way of example but not by way of limitation, to systems, devices, and methods that utilize analyte sensors to manage bolus doses of insulin for a diabetes patient.

BACKGROUND

Diabetes is a metabolic condition relating to the production or use of insulin by the body. Insulin is a hormone that allows the body to use glucose for energy, or store glucose as fat.

When a person eats a meal that contains carbohydrates, the food is processed by the digestive system, which produces glucose in the person's blood. Blood glucose can be used for energy or stored as fat. The body normally maintains blood glucose concentration in a range that provides sufficient energy to support bodily functions and avoids problems that can arise when glucose concentration is too high, or too low. Regulation of blood glucose concentration depends on the production and use of insulin, which regulates the movement of blood glucose into cells.

When the body does not produce enough insulin, or when the body is unable to effectively use insulin that is present, glucose concentration can elevate beyond normal ranges. The state of having a higher than normal glucose concentration is called "hyperglycemia." Chronic hyperglycemia can lead to a number of health problems, such as cardiovascular disease, cataract and other eye problems, nerve damage (neuropathy), and kidney damage. Hyperglycemia can also lead to acute problems, such as diabetic ketoacidosis—a state in which the body becomes excessively acidic due to the presence of blood glucose and ketones, which are produced when the body cannot use glucose. The state of having lower than normal glucose concentration is called "hypoglycemia." Severe hypoglycemia can lead to acute crises that can result in seizures or death.

Diabetes conditions are sometimes referred to as "Type 1" and "Type 2." A Type 1 diabetes patient is typically able to use insulin when it is present, but the body is unable to produce sufficient amounts of insulin, because of a problem with the insulin-producing beta cells of the pancreas. A Type 2 diabetes patient may produce some insulin, but the patient has become "insulin resistant" due to a reduced sensitivity to insulin. The result is that even though insulin is present in the body, the insulin is not sufficiently used by the patient's body to effectively regulate glucose concentration. A diabetes patient can receive insulin to manage glucose concentration. Insulin can be received, for example, through a manual injection with a needle. Wearable insulin pumps are also available.

SUMMARY

This present disclosure describes, among other things, systems, devices, and methods for managing bolus doses, for example, for users of analyte sensors and related techniques.

Example 1 is a system for generating a bolus dose for a host, the method comprising: at least one processor programmed to perform operations comprising: displaying at a user interface a first bolus configuration parameter question; receiving through the user interface a first answer to the first bolus configuration parameter question, the first answer describing a previous bolus determination technique of the host; selecting, using the first answer a second bolus configuration parameter question; providing, at the user interface the second bolus configuration parameter question; determining a set of at least one bolus configuration parameter using the first answer and a second answer to the second bolus configuration parameter question; receiving from a continuous glucose sensor, a host glucose concentration; determining a bolus dose for the host using the host glucose concentration and the set of at least one bolus configuration parameter; and displaying an indication of the bolus dose at the user interface.

In Example 2, the subject matter of Example 1 optionally includes the operations further comprising selecting a second set of questions using the first answer, wherein the second bolus configuration parameter question is part of the second set of questions.

In Example 3, the subject matter of any one or more of Examples 1-2 optionally includes the operations further comprising: receiving through the user interface, the second answer to the second bolus configuration parameter question; after receiving the second answer, determining that it can calculate less than all of a set of bolus configuration parameters; and providing at the user interface, a third bolus configuration parameter question, wherein the determining of the set of at least one bolus configuration parameter is also based at least in part on a third answer to the third bolus configuration parameter question.

In Example 4, the subject matter of any one or more of Examples 1-3 optionally includes wherein the first answer indicates that the previous bolus determination technique of the host considers glucose concentration and an indication of meal size, and wherein the second answer to the second bolus configuration parameter question indicates that the previous bolus determination technique of the host uses a formula.

In Example 5, the subject matter of any one or more of Examples 1-4 optionally includes wherein the first answer indicates that the previous bolus determination technique of the host considers a bolus-associated meal, and wherein the second answer to the second bolus configuration parameter question requests that the host provide an indication of a bolus insulin dose according to the previous bolus determination technique and an indication of a meal associated with the bolus insulin dose according to the previous bolus determination technique.

In Example 6, the subject matter of any one or more of Examples 1-5 optionally includes wherein the first answer indicates that the previous bolus determination technique of the host considers a glucose concentration of the host, and wherein the second answer to the second bolus configuration parameter question requests that the host provide an indication of a bolus insulin dose and an indication of a deviation between the glucose concentration of the host and a target glucose concentration of the host.

In Example 7, the subject matter of any one or more of Examples 1-6 optionally includes wherein the first answer indicates that the previous bolus determination technique of the host uses a constant bolus dose, the system the operations further comprising executing a model based at least in part on the first answer and the second answer to generate a first bolus configuration parameter of the set of at least one bolus configuration parameters.

In Example 8, the subject matter of any one or more of Examples 1-7 optionally includes the operations further comprising sending and to an insulin delivery system, data describing the bolus dose, the data for use in providing the bolus dose to the host by the insulin delivery system.

Example 9 is a method of using a bolus application to generate a bolus insulin dose for a host, the method comprising: displaying by the bolus application and at a bolus application user interface, a first bolus configuration parameter question; receiving, by the bolus application and through the bolus application user interface, a first answer to the first bolus configuration parameter question, the first answer describing a previous bolus determination technique of the host; selecting, by the bolus application using the first answer, a second bolus configuration parameter question; providing, by the bolus application and at the bolus application user interface, the second bolus configuration parameter question; determining, by the bolus application, a set of at least one bolus configuration parameter using the first answer and a second answer to the second bolus configuration parameter question; receiving, by the bolus application and from a continuous glucose sensor, a host glucose concentration; determining, by the bolus application, a bolus dose for the host using the host glucose concentration and the set of at least one bolus configuration parameter; and displaying an indication of the bolus dose at the bolus application user interface.

In Example 10, the subject matter of Example 9 optionally includes selecting a second set of questions using the first answer, wherein the second bolus configuration parameter question is part of the second set of questions.

In Example 11, the subject matter of any one or more of Examples 9-10 optionally includes receiving, by the bolus application and through the bolus application user interface, the second answer to the second bolus configuration parameter question; after receiving the second answer, determining, by the bolus application that it can calculate less than all of a set of bolus configuration parameters; and providing, by the bolus application and at the bolus application user interface, a third bolus configuration parameter question, wherein the determining of the set of at least one bolus configuration parameter is also based at least in part on a third answer to the third bolus configuration parameter question.

In Example 12, the subject matter of any one or more of Examples 9-11 optionally includes wherein the first answer indicates that the previous bolus determination technique of the host considers glucose concentration and an indication of meal size, and wherein the second answer to the second bolus configuration parameter question indicates that the previous bolus determination technique of the host uses a formula.

In Example 13, the subject matter of any one or more of Examples 9-12 optionally includes wherein the first answer indicates that the previous bolus determination technique of the host considers a bolus-associated meal, and wherein the second answer to the second bolus configuration parameter question requests that the host provide an indication of a bolus insulin dose according to the previous bolus determination technique and an indication of a meal associated with the bolus insulin dose according to the previous bolus determination technique.

In Example 14, the subject matter of any one or more of Examples 9-13 optionally includes wherein the first answer indicates that the previous bolus determination technique of the host considers a glucose concentration of the host, and wherein the second answer to the second bolus configuration parameter question requests that the host provide an indication of a bolus insulin dose and an indication of a deviation between the glucose concentration of the host and a target glucose concentration of the host.

In Example 15, the subject matter of any one or more of Examples 9-14 optionally includes wherein the first answer indicates that the previous bolus determination technique of the host uses a constant bolus dose, the method further comprising executing a model based at least in part on the first answer and the second answer to generate a first bolus configuration parameter of the set of at least one bolus configuration parameters.

In Example 16, the subject matter of any one or more of Examples 9-15 optionally includes sending, by the bolus application and to an insulin delivery system, data describing the bolus dose, the data for use in providing the bolus dose to the host by the insulin delivery system.

Example 17 is a machine-readable medium comprising instructions thereon that, when executed by at least one processor, cause the at least one processor to execute operations comprising: displaying at a user interface, a first bolus configuration parameter question; receiving through the user interface, a first answer to the first bolus configuration parameter question, the first answer describing a previous bolus determination technique of the host; selecting, using the first answer, a second bolus configuration parameter question; providing, at the user interface, the second bolus configuration parameter question; determining a set of at least one bolus configuration parameter using the first answer and a second answer to the second bolus configuration parameter question; receiving from a continuous glucose sensor, a host glucose concentration; determining a bolus dose for the host using the host glucose concentration and the set of at least one bolus configuration parameter; and displaying an indication of the bolus dose at the user interface.

Example 18 is a system for using a continuous glucose sensor to manage treatment of a host, the system comprising: at least one processor programmed to perform operations comprising: accessing an indication of a bolus dose to be provided to the host; receiving from the continuous glucose sensor, glucose concentration data describing a glucose concentration of the host; generating effect data describing an effect of the bolus dose, the generating using the glucose concentration data; and displaying at a user interface, the effect data to the host.

In Example 19, the subject matter of Example 18 optionally includes the operations further comprising receiving the indication of the bolus dose from an insulin delivery system.

In Example 20, the subject matter of any one or more of Examples 18-19 optionally includes wherein the glucose concentration data comprises a plurality of glucose concentrations for the host over a first time period, the operations further comprising determining the indication of the bolus dose using the plurality of glucose concentrations for the host over the first time period.

In Example 21, the subject matter of any one or more of Examples 18-20 optionally includes wherein the glucose concentration data indicates a current glucose concentration of the host, the operations further comprising: determining a glucose correction of the bolus dose based at least in part on the current glucose concentration and a target glucose concentration for the host; determining a correction component of the bolus dose based at least in part on the glucose correction and the bolus dose; and determining a meal component of the bolus dose based at least in part on the correction component, wherein generating the effect data comprises determining a carbohydrate coverage of the meal component.

In Example 22, the subject matter of any one or more of Examples 18-21 optionally includes the operations further comprising: accessing meal data describing a meal associated with the bolus dose; determining a meal component of the bolus dose based at least in part on the meal data; and determining a correction component of the bolus dose based at least in part on the meal component, wherein generating the effect data comprises determining a glucose correction based at least in part on the correction component.

In Example 23, the subject matter of Example 22 optionally includes wherein accessing the meal data comprises: determining a meal associated with the bolus dose; and accessing a carbohydrate count associated with the meal.

In Example 24, the subject matter of any one or more of Examples 22-23 optionally includes wherein determining the meal associated with the bolus dose comprises receiving, from an insulin delivery system, an image of at least a portion of the meal associated with the bolus dose.

In Example 25, the subject matter of any one or more of Examples 18-24 optionally includes wherein the effect data comprises a carbohydrate coverage associated with the bolus dose, and wherein displaying the effect data at the user interface comprises displaying an indication of the carbohydrate coverage.

In Example 26, the subject matter of any one or more of Examples 18-25 optionally includes wherein the effect data comprises a glucose correction, and wherein displaying the effect data at the user interface comprises: generating an estimated future glucose concentration trace based at least in part on the glucose correction; and displaying the estimated future glucose trace.

In Example 27, the subject matter of any one or more of Examples 18-26 optionally includes the operations further comprising: accessing model data describing a physiological model associated with the host; accessing previous meal data describing a meal previously consumed by the host; accessing previous bolus dose data describing a previous bolus dose administered to the host; and determining a carbohydrate coverage using the previous meal data, the previous bolus dose data, and the model data, wherein the effect data is based at least in part on the carbohydrate coverage.

Example 28 is a method of using a continuous glucose sensor for managing treatment of a host, the method comprising: accessing, by a bolus application executing at a computing device, an indication of a bolus dose to be provided to the host; receiving, by the bolus application and from the continuous glucose sensor, glucose concentration data describing a glucose concentration of the host; generating, by the bolus application, effect data describing an effect of the bolus dose, the generating using the glucose concentration data; and displaying, by the bolus application at a user interface, the effect data to the host.

In Example 29, the subject matter of Example 28 optionally includes receiving the indication of the bolus dose from an insulin delivery system.

In Example 30, the subject matter of any one or more of Examples 28-29 optionally includes wherein the glucose concentration data comprises a plurality of glucose concentrations for the host over a first time period, further comprising determining the indication of the bolus dose using the plurality of glucose concentrations for the host over the first time period.

In Example 31, the subject matter of any one or more of Examples 28-30 optionally includes wherein the glucose concentration data indicates a current glucose concentration of the host, the method further comprising: determining a glucose correction of the bolus dose based at least in part on the current glucose concentration and a target glucose concentration for the host; determining a correction component of the bolus dose based at least in part on the glucose correction and the bolus dose; and determining a meal component of the bolus dose based at least in part on the correction component, wherein generating the effect data comprises determining a carbohydrate coverage of the meal component.

In Example 32, the subject matter of any one or more of Examples 28-31 optionally includes accessing meal data describing a meal associated with the bolus dose; determining a meal component of the bolus dose based at least in part on the meal data; and determining a correction component of the bolus dose based at least in part on the meal component, wherein generating the effect data comprises determining a glucose correction based at least in part on the correction component.

In Example 33, the subject matter of Example 32 optionally includes wherein accessing the meal data comprises: determining a meal associated with the bolus dose; and accessing a carbohydrate count associated with the meal.

In Example 34, the subject matter of any one or more of Examples 32-33 optionally includes wherein determining the meal associated with the bolus dose comprises receiving, from an insulin delivery system, an image of at least a portion of the meal associated with the bolus dose.

In Example 35, the subject matter of any one or more of Examples 28-34 optionally includes wherein the effect data comprises a carbohydrate coverage associated with the bolus dose, and wherein displaying the effect data at the user interface comprises displaying an indication of the carbohydrate coverage.

In Example 36, the subject matter of any one or more of Examples 28-35 optionally includes wherein the effect data comprises a glucose correction, and wherein displaying the effect data at the user interface comprises: generating an estimated future glucose concentration trace based at least in part on the glucose correction; and displaying the estimated future glucose trace.

In Example 37, the subject matter of any one or more of Examples 28-36 optionally includes accessing, by the bolus application, model data describing a physiological model associated with the host; accessing, by the bolus application, previous meal data describing a meal previously consumed by the host; accessing, by the bolus application, previous bolus dose data describing a previous bolus dose administered to the host; and determining, by the bolus application, a carbohydrate coverage using the previous meal data, the previous bolus dose data, and the model data, wherein the effect data is based at least in part on the carbohydrate coverage.

Example 38 is a machine-readable medium comprising instructions thereon that, when executed by at least one processor, cause the at least one processor to execute operations comprising: accessing an indication of a bolus dose to be provided to the host; receiving from the continuous glucose sensor, glucose concentration data describing a glucose concentration of the host; generating effect data describing an effect of the bolus dose, the generating using the glucose concentration data; and displaying at a user interface, the effect data to the host.

Example 39 is a system for generating a bolus dose for a host, the system comprising: at least one processor programmed to perform operations comprising: receiving current case parameter data describing a current bolus case, the current case parameter data comprising at least a current time of day and current glucose concentration data describing a current glucose concentration at a host received from a continuous glucose sensor system; comparing the current case parameter data to a plurality of nominal cases to select a closest nominal case, the closest nominal case associated with nominal case parameter data and nominal case therapy data, the nominal case parameter data comprising at least a nominal case time of day and a nominal case glucose concentration; determining a therapy modification factor using difference data describing a difference between the current case parameter data and the closest nominal case parameter data; applying the therapy modification factor to the nominal case therapy parameter data to generate current case therapy data; and determining a current case bolus dose using the current case therapy data.

In Example 40, the subject matter of Example 39 optionally includes wherein applying the therapy modification factor comprises applying a multiplier to a bolus configuration parameter associated with the closest nominal case.

In Example 41, the subject matter of any one or more of Examples 39-40 optionally includes the operations further comprising: receiving second current case parameter data describing a second current bolus case; comparing the second current case parameter data to the plurality of nominal cases to select a second closest nominal case; and determining that a difference between the second current bolus case and the second closest nominal case is greater than a threshold.

In Example 42, the subject matter of Example 41 optionally includes the operations further comprising, responsive to the difference between the second current bolus case and the second closest nominal case being greater than the threshold, determining a second current case bolus dose using an alternate bolus method.

In Example 43, the subject matter of any one or more of Examples 41-42 optionally includes the operations further comprising: receiving result data describing results of the second current bolus case; and generating a new nominal case using the second current case parameter data and the result data.

In Example 44, the subject matter of any one or more of Examples 41-43 optionally includes the operations further comprising: monitoring result data describing results of the second current bolus case; determining that an intervening event occurs before completion of the monitoring; and generating supplemental result data using the second closest nominal case.

In Example 45, the subject matter of any one or more of Examples 39-44 optionally includes the operations further comprising: monitoring result data describing results of the bolus case; and modifying at least one of the nominal case therapy data or a therapy modification parameter based at least in part on the result data.

Example 46 is a system for generating a bolus dose for a host, the system comprising: at least one processor programmed to perform operations comprising: receiving current case parameter data describing a current bolus case, the current case parameter data comprising at least a current time of day and current glucose concentration data describing a current glucose concentration at a host received from a continuous glucose sensor system; comparing the current case parameter data to a plurality of stored cases to select a closest stored case, the closest stored case associated with stored case parameter data and stored case therapy data, the stored case parameter data comprising at least a stored case time of day and a stored case glucose concentration; determining a current case bolus dose using stored case therapy parameter data to generate current case therapy data; monitoring result data describing results of the current bolus case; determining that an intervening event occurs before completion of the monitoring; generating supplemental result data using the closest stored case; and generating a new stored case using the current case parameter data, the closest stored case therapy data, and the supplemental result data.

Example 47 is a bolus calculator method, comprising: receiving current case parameter data describing a current bolus case, the current case parameter data comprising at least a current time of day and current glucose concentration data describing a current glucose concentration at a host received from a continuous glucose sensor system; comparing the current case parameter data to a plurality of nominal cases to select a closest nominal case, the closest nominal case associated with nominal case parameter data and nominal case therapy data, the nominal case parameter data comprising at least a nominal case time of day and a nominal case glucose concentration; determining a therapy modification factor using difference data describing a difference between the current case parameter data and the closest nominal case parameter data; applying the therapy modification factor to the nominal case therapy parameter data to generate current case therapy data; and determine a current case bolus dose using the current case therapy data.

In Example 48, the subject matter of Example 47 optionally includes wherein applying the therapy modification factor comprises applying a multiplier to a bolus configuration parameter associated with the closest nominal case.

In Example 49, the subject matter of any one or more of Examples 47-48 optionally includes receiving second current case parameter data describing a second current bolus case; comparing the second current case parameter data to the plurality of nominal cases to select a second closest nominal case; and determining that a difference between the second current bolus case and the second closest nominal case is greater than a threshold.

In Example 50, the subject matter of Example 49 optionally includes responsive to the difference between the second current bolus case and the second closest nominal case being greater than the threshold, determining a second current case bolus dose using an alternate bolus method.

In Example 51, the subject matter of any one or more of Examples 49-50 optionally includes receiving result data describing results of the second current bolus case; and generating a new nominal case using the second current case parameter data and the result data.

In Example 52, the subject matter of any one or more of Examples 49-51 optionally includes monitoring result data describing results of the second current bolus case; determining that an intervening event occurs before completion of the monitoring; and generating supplemental result data using the second closest nominal case.

In Example 53, the subject matter of any one or more of Examples 47-52 optionally includes monitoring result data describing results of the bolus case; and modifying at least one of the nominal case therapy data or a therapy modification parameter based at least in part on the result data.

Example 54 is a method for generating a bolus dose for a host, comprising: receiving current case parameter data describing a current bolus case, the current case parameter data comprising at least a current time of day and current glucose concentration data describing a current glucose concentration at a host received from a continuous glucose sensor system; comparing the current case parameter data to a plurality of stored cases to select a closest stored case, the closest stored case associated with stored case parameter data and stored case therapy data, the stored case parameter data comprising at least a stored case time of day and a stored case glucose concentration; determining a current case bolus dose using stored case therapy parameter data to generate current case therapy data; monitoring result data describing results of the current bolus case; determining that an intervening event occurs before completion of the monitoring; generating supplemental result data using the closest stored case; and generating a new stored case using the current case parameter data, the closest stored case therapy data, and the supplemental result data.

Example 55 is a machine-readable medium comprising instructions thereon that, when executed by at least one processor, cause the at least one processor to execute operations comprising: receiving current case parameter data describing a current bolus case, the current case parameter data comprising at least a current time of day and current glucose concentration data describing a current glucose concentration at a host received from a continuous glucose sensor system; comparing the current case parameter data to a plurality of nominal cases to select a closest nominal case, the closest nominal case associated with nominal case parameter data and nominal case therapy data, the nominal case parameter data comprising at least a nominal case time of day and a nominal case glucose concentration; determining a therapy modification factor using difference data describing a difference between the current case parameter data and the closest nominal case parameter data; applying the therapy modification factor to the nominal case therapy parameter data to generate current case therapy data; and determining a current case bolus dose using the current case therapy data.

Example 56 is a system to determine and provide diabetes treatment, the system comprising: at least one processor programmed to perform operations comprising: accessing training data; training a classification model; receiving test bolus data describing a test bolus dose for the host; receiving from a continuous glucose sensor, glucose concentration data describing glucose concentration of the host; applying the classification model to determine that the test bolus dose belongs to a first bolus category, the applying of the classification model using the test bolus data and the glucose concentration data; selecting a host action based at least in part on the test bolus data and the first bolus category; and providing a host action prompt at a bolus application user interface, the bolus application prompt prompting the host take the host action.

In Example 57, the subject matter of Example 56 optionally includes the operations further comprising: comparing the test bolus data to first bolus category data describing a plurality of bolus doses in the first bolus category; determining a difference between the test bolus data and the first bolus category data; and selecting the host action based on the difference between the test bolus data and the first bolus category data.

In Example 58, the subject matter of Example 57 optionally includes wherein the host action comprises a modification to a basal dose of the host.

In Example 59, the subject matter of any one or more of Examples 57-58 optionally includes wherein the host action comprises a modification to a bolus configuration parameter for the host.

In Example 60, the subject matter of any one or more of Examples 56-59 optionally includes the operations further comprising, determining a change to an insulin pump parameter based at least in part on the test bolus data and the first bolus category; and sending insulin pump change data indicating the change to the insulin pump change.

In Example 61, the subject matter of any one or more of Examples 56-60 optionally includes the operations further comprising: generating a glucose concentration trace for the host using the glucose concentration data; generating a user interface screen indicating the glucose concentration trace; and at a position on the user interface screen corresponding to a time of the test bolus, displaying a test bolus indicator, wherein the test bolus indicator also indicates the first bolus category.

In Example 62, the subject matter of any one or more of Examples 56-61 optionally includes the operations further comprising determining, using the glucose concentration data and the first bolus category, that the host has greater than a threshold risk of hypoglycemia, wherein the host action is to treat hypoglycemia.

In Example 63, the subject matter of any one or more of Examples 56-62 optionally includes wherein the classification model comprises a logistic regression model.

Example 64 is a method of using a computing device to determine and provide diabetes treatment, the method comprising: accessing training data by a bolus application executing at a computing device; training a classification model; receiving, by the bolus application, test bolus data describing a test bolus dose for the host; receiving, by the bolus application and from a continuous glucose sensor, glucose concentration data describing glucose concentration of the host; applying the classification model, by the bolus application, to determine that the test bolus dose belongs to a first bolus category, the applying of the classification model using the test bolus data and the glucose concentration data; selecting, by the bolus application, a host action based at least in part on the test bolus data and the first bolus category; and providing, by the bolus application, a host action prompt at a bolus application user interface, the bolus application prompt prompting the host take the host action.

In Example 65, the subject matter of Example 64 optionally includes comparing the test bolus data to first bolus category data describing a plurality of bolus doses in the first bolus category; determining a difference between the test bolus data and the first bolus category data; and selecting the host action based on the difference between the test bolus data and the first bolus category data.

In Example 66, the subject matter of Example 65 optionally includes wherein the host action comprises a modification to a basal dose of the host.

In Example 67, the subject matter of any one or more of Examples 65-66 optionally includes wherein the host action comprises a modification to a bolus configuration parameter for the host.

In Example 68, the subject matter of any one or more of Examples 64-67 optionally includes determining, by the bolus application, a change to an insulin pump parameter based at least in part on the test bolus data and the first bolus category; and sending, by the bolus application, insulin pump change data indicating the change to the insulin pump change.

In Example 69, the subject matter of any one or more of Examples 64-68 optionally includes generating a glucose concentration trace for the host using the glucose concentration data; generating a user interface screen indicating the glucose concentration trace; and at a position on the user interface screen corresponding to a time of the test bolus, displaying a test bolus indicator, wherein the test bolus indicator also indicates the first bolus category.

In Example 70, the subject matter of any one or more of Examples 64-69 optionally includes determining, using the glucose concentration data and the first bolus category, that the host has greater than a threshold risk of hypoglycemia, wherein the host action is to treat hypoglycemia.

In Example 71, the subject matter of any one or more of Examples 64-70 optionally includes wherein the classification model comprises a logistic regression model.

Example 72 is a machine-readable medium comprising instructions thereon that, when executed by at least one processor, cause the at least one processor to execute operations comprising: accessing training data; training a classification model; receiving test bolus data describing a test bolus dose for the host; receiving from a continuous glucose sensor, glucose concentration data describing glucose concentration of the host; applying the classification model to determine that the test bolus dose belongs to a first bolus category, the applying of the classification model using the test bolus data and the glucose concentration data; selecting a host action based at least in part on the test bolus data and the first bolus category; and providing a host action prompt at a bolus application user interface, the bolus application prompt prompting the host take the host action.

Example 73 is a system to manage diabetes treatment, the system comprising: at least one processor programmed to perform operations comprising: accessing correction bolus data describing a correction bolus dose received by a host at a first time; receiving, from a glucose sensor, glucose concentration data for the host describing a first time period including the first time; determining, using the correction bolus data and the glucose concentration data, a recommended change to an insulin-on-board parameter for the host; and providing, to the host, an indication of the recommended change to the insulin-on-board parameter.

In Example 74, the subject matter of Example 73 optionally includes the operations further comprising accessing meal bolus data describing a meal bolus dose received by the host at a second time before the first time, wherein the determining of the recommended change to the insulin-on-board parameter is based at least in part on the meal bolus data.

In Example 75, the subject matter of Example 74 optionally includes the operations further comprising determining that there was less than a threshold time between the second time and the first time.

In Example 76, the subject matter of any one or more of Examples 73-75 optionally includes the operations further comprising: determining an actual insulin-on-board value at the first time; and comparing the actual insulin-on-board value to a calculated insulin-on-board value determined using the insulin-on-board parameter for the host, wherein the recommended change to the insulin-on-board parameter is based at least in part on the comparing.

In Example 77, the subject matter of Example 76 optionally includes the operations further comprising determining a projected insulin-on-board parameter that results in a second calculated insulin-on-board value that is substantially the same as the actual insulin-on-board value, wherein the recommended change to the insulin-on-board parameter is to the projected insulin-on-board parameter.

In Example 78, the subject matter of any one or more of Examples 73-77 optionally includes the operations further comprising: accessing past correction bolus data describing a plurality of correction bolus doses received by the host before the first time; and identifying a post-bolus pattern in the glucose concentration of the host after the plurality of correction bolus doses, wherein the change to the insulin-on-board parameter is based at least in part on the post-bolus pattern.

In Example 79, the subject matter of Example 78 optionally includes wherein the post-bolus pattern describes a glucose concentration lower than a target glucose concentration for the host, and wherein the change to the insulin-on-board parameter is to decrease estimated insulin-on-board for meal boluses.

In Example 80, the subject matter of any one or more of Examples 78-79 optionally includes wherein the post-bolus pattern describes a glucose concentration higher than a target glucose concentration for the host, and wherein the change to the insulin-on-board parameter is to increase estimated insulin-on-board for meal boluses.

Example 81 is a method of using a computing device to manage diabetes treatment, the method comprising: accessing correction bolus data describing a correction bolus dose received by a host at a first time; receiving, from a glucose sensor, glucose concentration data for the host describing a first time period including the first time; determining, using the correction bolus data and the glucose concentration data, a recommended change to an insulin-on-board parameter for the host; and providing, to the host, an indication of the recommended change to the insulin-on-board parameter.

In Example 82, the subject matter of Example 81 optionally includes accessing meal bolus data describing a meal bolus dose received by the host at a second time before the first time, wherein the determining of the recommended change to the insulin-on-board parameter is based at least in part on the meal bolus data.

In Example 83, the subject matter of Example 82 optionally includes determining that there was less than a threshold time between the second time and the first time.

In Example 84, the subject matter of any one or more of Examples 81-83 optionally includes determining an actual insulin-on-board value at the first time; and comparing the actual insulin-on-board value to a calculated insulin-on-board value determined using the insulin-on-board parameter for the host, wherein the recommended change to the insulin-on-board parameter is based at least in part on the comparing.

In Example 85, the subject matter of Example 84 optionally includes determining a projected insulin-on-board parameter that results in a second calculated insulin-on-board value that is substantially the same as the actual insulin-on-board value, wherein the recommended change to the insulin-on-board parameter is to the projected insulin-on-board parameter.

In Example 86, the subject matter of any one or more of Examples 81-85 optionally includes accessing past correction bolus data describing a plurality of correction bolus doses received by the host before the first time; and identifying a post-bolus pattern in the glucose concentration of the host after the plurality of correction bolus doses, wherein the change to the insulin-on-board parameter is based at least in part on the post-bolus pattern.

In Example 87, the subject matter of Example 86 optionally includes wherein the post-bolus pattern describes a glucose concentration lower than a target glucose concentration for the host, and wherein the change to the insulin-on-board parameter is to decrease estimated insulin-on-board for meal boluses.

In Example 88, the subject matter of any one or more of Examples 86-87 optionally includes wherein the post-bolus pattern describes a glucose concentration higher than a target glucose concentration for the host, and wherein the change to the insulin-on-board parameter is to increase estimated insulin-on-board for meal boluses.

Example 89 is a machine-readable medium comprising instructions thereon that, when executed by at least one processor, cause the at least one processor to execute operations comprising: accessing correction bolus data describing a correction bolus dose received by a host at a first time; receiving, from a glucose sensor, glucose concentration data for the host describing a first time period including the first time; determining, using the correction bolus data and the glucose concentration data, a recommended change to an insulin-on-board parameter for the host; and providing, to the host, an indication of the recommended change to the insulin-on-board parameter.

Example 90 is a system for managing diabetes for a host using a continuous glucose sensor, the system comprising: at least one processor programmed to perform operations comprising: receiving and from the continuous glucose sensor, glucose concentration data describing at least a first glucose concentration of the host at a first time and a second glucose concentration of the host at a second time; determining a glucose concentration rate-of-change for the host using the glucose concentration data; determining a predicted glucose concentration for the host at a future time using the glucose rate-of-change; and determining a bolus dose for the host using the predicted glucose concentration for the future time and a current glucose concentration of the host at a current time.

In Example 91, the subject matter of Example 90 optionally includes the operations further comprising determining a trend component of the bolus dose using the predicted glucose concentration and an insulin sensitivity factor (ISF) for the host, wherein the bolus dose is based at least in part on the trend component.

In Example 92, the subject matter of any one or more of Examples 90-91 optionally includes minutes after the current time.

In Example 93, the subject matter of any one or more of Examples 90-92 optionally includes the operations further comprising selecting the future time, by the bolus application, based at least in part on an age of the host.

In Example 94, the subject matter of any one or more of Examples 90-93 optionally includes the operations further comprising: receiving, by the bolus application and from the continuous glucose sensor, second glucose concentration data describing at least a third glucose concentration of the host at a third time and a fourth glucose concentration of the host at a fourth time; determining, by the bolus application, a second glucose concentration rate-of-change for the host using the glucose concentration data; determining, by the bolus application, that the second glucose concentration rate-of-change is negative; determining to omit a trend component for a second bolus dose for the host; and determining the second bolus dose for the host using the second glucose concentration data.

In Example 95, the subject matter of any one or more of Examples 90-94 optionally includes the operations further comprising: receiving, by the bolus application and from the continuous glucose sensor, second glucose concentration data describing at least a third glucose concentration of the host at a third time and a fourth glucose concentration of the host at a fourth time; determining, by the bolus application, a second glucose concentration rate-of-change for the host using the glucose concentration data; determining, by the bolus application a second predicted glucose concentration for the host at a second future time using the second glucose rate-of-change; determining, by the bolus application, that the second predicted glucose concentration for the host is greater than a threshold value; determining to omit a trend component for a second bolus dose for the host; and determining the second bolus dose for the host using the second glucose concentration data.

In Example 96, the subject matter of Example 95 optionally includes the operations further comprising selecting the threshold value, by the bolus application, based at least in part on an age of the host.

In Example 97, the subject matter of any one or more of Examples 90-96 optionally includes the operations further comprising: receiving, by the bolus application, a request to determine a second bolus dose for the host; determining that the request to determine the second bolus is received within a threshold time of a meal bolus for the host; determining to omit a trend component for the second bolus dose for the host; and determining the second bolus dose for the host using second glucose concentration data received from the continuous glucose sensor.

In Example 98, the subject matter of any one or more of Examples 90-97 optionally includes the operations further comprising: receiving, by the bolus application, a request to determine a second bolus dose for the host, the request comprising meal data describing a meal associated with the second bolus dose; determining that the request to determine the second bolus is received within a threshold time of a previous meal bolus for the host; determining to omit a trend component for the second bolus dose for the host; and determining the second bolus dose for the host using second glucose concentration data received from the continuous glucose sensor.

Example 99 is a method for managing diabetes for a host using a continuous glucose sensor and a bolus application executing at a computing device, the method comprising: receiving, by the bolus application and from the continuous glucose sensor, glucose concentration data describing at least a first glucose concentration of the host at a first time and a second glucose concentration of the host at a second time; determining, by the bolus application, a glucose concentration rate-of-change for the host using the glucose concentration data; determining, by the bolus application a predicted glucose concentration for the host at a future time using the glucose rate-of-change; and determining, by the bolus application, a bolus dose for the host using the predicted glucose concentration for the future time and a current glucose concentration of the host at a current time.

In Example 100, the subject matter of Example 99 optionally includes determining a trend component of the bolus dose using the predicted glucose concentration and an insulin sensitivity factor (ISF) for the host, wherein the bolus dose is based at least in part on the trend component.

In Example 101, the subject matter of any one or more of Examples 99-100 optionally includes minutes after the current time.

In Example 102, the subject matter of any one or more of Examples 99-101 optionally includes selecting the future time, by the bolus application, based at least in part on an age of the host.

In Example 103, the subject matter of any one or more of Examples 99-102 optionally includes receiving, by the bolus application and from the continuous glucose sensor, second glucose concentration data describing at least a third glucose concentration of the host at a third time and a fourth glucose concentration of the host at a fourth time; determining, by the bolus application, a second glucose concentration rate-of-change for the host using the glucose concentration data; determining, by the bolus application, that the second glucose concentration rate-of-change is negative; determining to omit a trend component for a second bolus dose for the host; and determining the second bolus dose for the host using the second glucose concentration data.

In Example 104, the subject matter of any one or more of Examples 99-103 optionally includes receiving, by the bolus application and from the continuous glucose sensor, second glucose concentration data describing at least a third glucose concentration of the host at a third time and a fourth glucose concentration of the host at a fourth time; determining, by the bolus application, a second glucose concentration rate-of-change for the host using the glucose concentration data; determining, by the bolus application a second predicted glucose concentration for the host at a second future time using the second glucose rate-of-change; determining, by the bolus application, that the second predicted glucose concentration for the host is greater than a threshold value; determining to omit a trend component for a second bolus dose for the host; and determining the second bolus dose for the host using the second glucose concentration data.

In Example 105, the subject matter of Example 104 optionally includes selecting the threshold value, by the bolus application, based at least in part on an age of the host.

In Example 106, the subject matter of any one or more of Examples 99-105 optionally includes receiving, by the bolus application, a request to determine a second bolus dose for the host; determining that the request to determine the second bolus is received within a threshold time of a meal bolus for the host; determining to omit a trend component for the second bolus dose for the host; and determining the second bolus dose for the host using second glucose concentration data received from the continuous glucose sensor.

In Example 107, the subject matter of any one or more of Examples 99-106 optionally includes receiving, by the bolus application, a request to determine a second bolus dose for the host, the request comprising meal data describing a meal associated with the second bolus dose; determining that the request to determine the second bolus is received within a threshold time of a previous meal bolus for the host; determining to omit a trend component for the second bolus dose for the host; and determining the second bolus dose for the host using second glucose concentration data received from the continuous glucose sensor.

Example 108 is a machine-readable medium comprising instructions thereon that, when executed by at least one processor, cause the at least one processor to execute operations comprising: receiving and from the continuous glucose sensor, glucose concentration data describing at least a first glucose concentration of the host at a first time and a second glucose concentration of the host at a second time; determining a glucose concentration rate-of-change for the host using the glucose concentration data; determining a predicted glucose concentration for the host at a future time using the glucose rate-of-change; and determining a bolus dose for the host using the predicted glucose concentration for the future time and a current glucose concentration of the host at a current time.

Example 109 is a system for managing diabetes for a host using a continuous glucose sensor, comprising: at least one processor programmed to perform operations comprising: accessing glucose concentration data from a continuous glucose sensor, the glucose concentration data indicating a current glucose concentration for the host; accessing bolus data indicating a bolus dose received by the host; and selecting a hyperglycemic alert threshold based at least in part on the bolus data; determining that the current glucose concentration meets the hyperglycemic alert threshold; and serving to the host a glucose alert.

In Example 110, the subject matter of Example 109 optionally includes the operations further comprising determining an insulin-on-board value for the host, wherein the determining of the hyperglycemic alert threshold is based at least in part on the insulin-on-board value.

In Example 111, the subject matter of Example 110 optionally includes the operations further comprising determining that the insulin-on-board value is less than a threshold value, wherein selecting the hyperglycemic alert threshold comprises reducing the hyperglycemic alert threshold based at least in part on determining that the insulin-on-board value is less than the threshold value.

In Example 112, the subject matter of any one or more of Examples 110-111 optionally includes the operations further comprising determining that the insulin-on-board value is greater than a threshold value, wherein selecting the hyperglycemic alert threshold comprises increasing the hyperglycemic alert threshold based at least in part on determining that the insulin-on-board value is greater than the threshold value.

In Example 113, the subject matter of any one or more of Examples 109-112 optionally includes the operations further comprising determining that more than a threshold time has passed since the bolus dose received by the host, wherein the determining of the hyperglycemic alert threshold is based at least in part on the determining that more than the threshold time has passed since the bolus dose received by the host.

In Example 114, the subject matter of Example 113 optionally includes wherein selecting the hyperglycemic alert threshold comprises reducing the hyperglycemic alert threshold based at least in part on the determining that more than the threshold time has passed since the bolus dose received by the host.

In Example 115, the subject matter of any one or more of Examples 109-114 optionally includes the operations further comprising determining that less than a threshold time period has passed since the bolus dose received by the host, wherein selecting the hyperglycemic alert threshold comprises increasing the hyperglycemic alert threshold based at least in part on the determining that less than a threshold time period has passed since the bolus dose received by the host.

Example 116 is a method for managing diabetes for a host using a continuous glucose sensor and a bolus application executing at a computing device, the method comprising: accessing, by the bolus application, glucose concentration data from a continuous glucose sensor, the glucose concentration data indicating a current glucose concentration for the host; accessing, by the bolus application, bolus data indicating a bolus dose received by the host; and selecting, by the bolus application, a hyperglycemic alert threshold based at least in part on the bolus data; determining, by the bolus application, that the current glucose concentration meets the hyperglycemic alert threshold; and serving to the host, by the bolus application, a glucose alert.

In Example 117, the subject matter of Example 116 optionally includes determining, by the bolus application, an insulin-on-board value for the host, wherein the determining of the hyperglycemic alert threshold is based at least in part on the insulin-on-board value.

In Example 118, the subject matter of Example 117 optionally includes determining that the insulin-on-board value is less than a threshold value, wherein selecting the hyperglycemic alert threshold comprises reducing the hyperglycemic alert threshold based at least in part on determining that the insulin-on-board value is less than the threshold value.

In Example 119, the subject matter of any one or more of Examples 117-118 optionally includes determining that the insulin-on-board value is greater than a threshold value, wherein selecting the hyperglycemic alert threshold comprises increasing the hyperglycemic alert threshold based at least in part on determining that the insulin-on-board value is greater than the threshold value.

In Example 120, the subject matter of any one or more of Examples 116-119 optionally includes determining, by the bolus application, that more than a threshold time has passed since the bolus dose received by the host, wherein the determining of the hyperglycemic alert threshold is based at least in part on the determining that more than the threshold time has passed since the bolus dose received by the host.

In Example 121, the subject matter of Example 120 optionally includes wherein selecting the hyperglycemic alert threshold comprises reducing the hyperglycemic alert threshold based at least in part on the determining that more than the threshold time has passed since the bolus dose received by the host.

In Example 122, the subject matter of any one or more of Examples 116-121 optionally includes determining, by the bolus application, that less than a threshold time period has passed since the bolus dose received by the host, wherein selecting the hyperglycemic alert threshold comprises increasing the hyperglycemic alert threshold based at least in part on the determining that less than a threshold time period has passed since the bolus dose received by the host.

Example 123 is a machine-readable medium comprising instructions thereon that, when executed by at least one processor, cause the at least one processor to execute operations comprising: accessing glucose concentration data from a continuous glucose sensor, the glucose concentration data indicating a current glucose concentration for the host; accessing bolus data indicating a bolus dose received by the host; and selecting a hyperglycemic alert threshold based at least in part on the bolus data; determining that the current glucose concentration meets the hyperglycemic alert threshold; and serving to the host a glucose alert.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments described in the present document.

DETAILED DESCRIPTION

Various examples described herein are directed to analyte sensors and methods for using analyte sensors to manage bolus doses of insulin for a host. An analyte sensor is placed in contact with bodily fluid of a host to measure a concentration of an analyte, such as glucose, in the bodily fluid. In some examples, the analyte sensor is inserted under the skin of the host and placed in contact with interstitial fluid below the skin to measure the concentration of the analyte in the interstitial fluid.

A diabetes patient who receives insulin can receive basal insulin doses and bolus insulin doses. Basal insulin doses, also referred to herein as basal doses, are used to manage resting glucose concentrations while bolus insulin doses are used correct for or cover events, such as meals, that cause glucose concentrations to rise. Basal doses are provided to bring about a desired background or resting glucose concentration. In patients who use an insulin pump or similar delivery device, basal doses can be provided constantly or semi-constantly according to a profile over time. In some examples, a long-acting insulin medicament is used for basal doses. For example, some patients who do not use an insulin pump receive basal doses of long-acting insulin one or more times a day, often in constant amounts.

Bolus insulin doses, also referred to herein as bolus doses, typically utilize a short-acting insulin medicament that has a strong, but often short-lived effect on glucose concentrations. Accordingly, bolus doses are used to cover food eaten by the patient (meal boluses) and/or to correct for deviations from a target glucose concentration (correction boluses). In some examples, a bolus dose is determined and/or administered in conjunction with a basal dose. For example, any suitable of the examples described herein may be used to generate a combined dose that includes a bolus component and a basal component.

Many factors are relevant to determining a bolus dose for a patient including, the amount of food that the host intends to eat, the host's current glucose concentration, the way that the host's body responds to food, the host's activity level, the host's intake of alcohol, etc. Various examples herein are directed to arrangements for supporting a host who receives a bolus dose, for example, utilizing an analyte sensor and/or analyte data detected with an analyte sensor.

Figure 1:
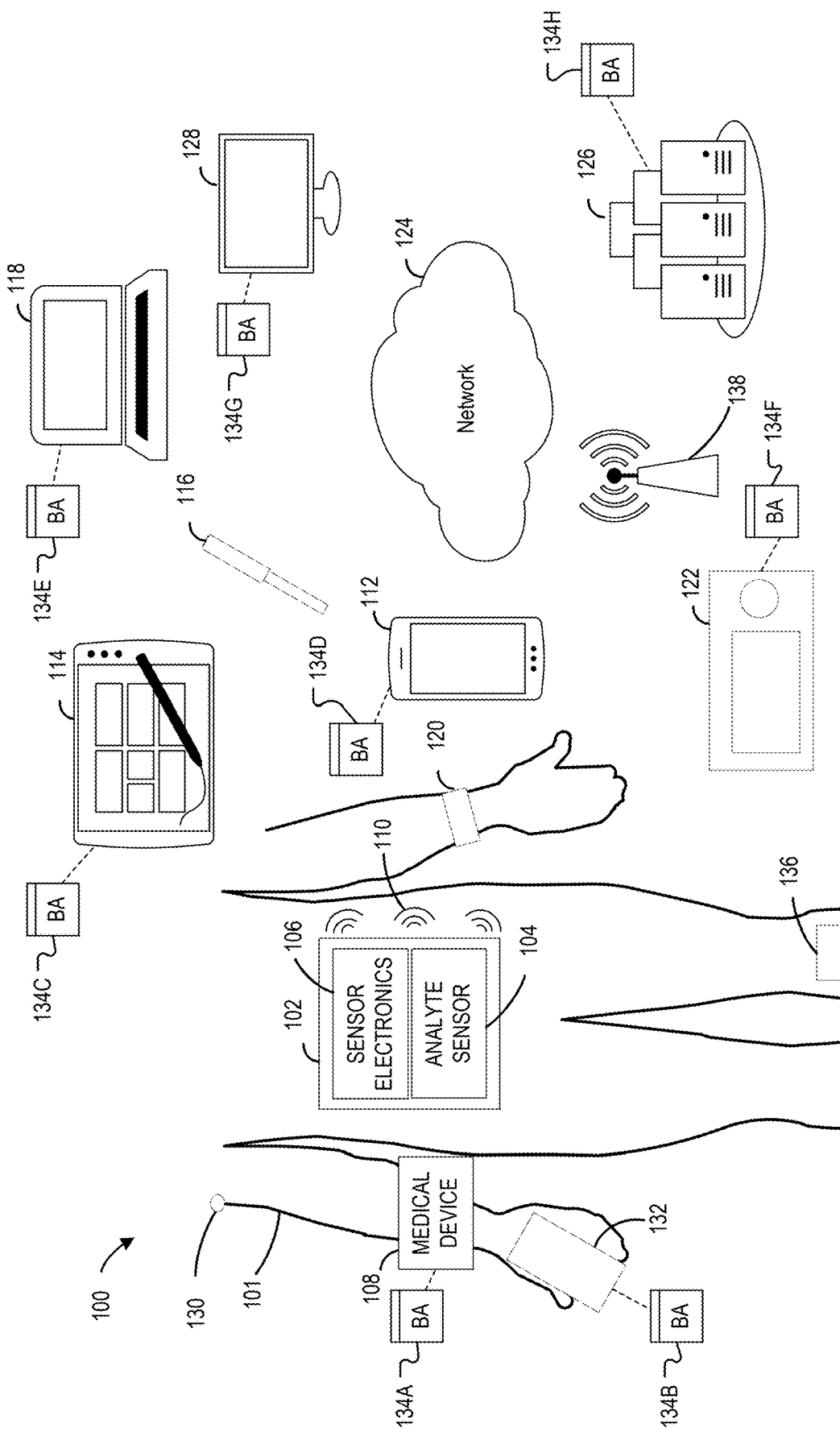
FIG. 1 is a diagram showing an example of an environment including an analyte sensor system.

FIG. 1 is a diagram showing an example of an environment 100 including an analyte sensor system 102. The analyte sensor system 102 is coupled to a host 101, which may be a human patient. In some examples, the host 101 is a diabetes patient who is subject to a temporary or permanent diabetes condition or other health condition that makes analyte monitoring useful. It will be appreciated that the environment 100 includes various components that may be used in various different combinations to implement the systems and methods described herein.

The analyte sensor system 102 includes an analyte sensor 104. In some examples, the analyte sensor 104 is or includes a glucose sensor configured to measure a glucose concentration in the host 101. The analyte sensor 104 can be exposed to analyte at the host 101 in any suitable way. In some examples, the analyte sensor 104 is fully implantable under the skin of the host 101. In other examples, the analyte sensor 104 is wearable on the body of the host 101 (e.g., on the body but not under the skin). Also, in some examples, the analyte sensor 104 is a transcutaneous device (e.g., with a sensor residing at least partially under or in the skin of a host). It should be understood that the devices and methods described herein can be applied to any device capable of detecting a concentration of an analyte, such as glucose, and providing an output signal that represents the concentration of the analyte.

According to various embodiments, the glucose detected can be D-glucose. However, it is possible to detect any stereoisomer or blend of stereoisomers of glucose as well as any glucose in an open-chain form, cyclic form, or a mixture thereof. In the example of FIG. 1, the analyte sensor system 102 also includes sensor electronics 106. In some examples, the sensor electronics 106 and analyte sensor 104 are provided in a single integrated package. In other examples, the analyte sensor 104 and sensor electronics 106 are provided as separate components or modules. For example, the analyte sensor system 102 may include a disposable (e.g., single-use) sensor mounting unit (FIG. 3) that may include the analyte sensor 104, a component for attaching the sensor 104 to a host (e.g., an adhesive pad), and/or a mounting structure configured to receive a sensor electronics unit including some or all of the sensor electronics 106 shown in FIG. 2. The sensor electronics unit may be reusable.

The analyte sensor 104 may use any known method, including invasive, minimally-invasive, or non-invasive sensing techniques (e.g., optically excited fluorescence, microneedle, transdermal monitoring of glucose), to provide a raw sensor signal indicative of the concentration of the analyte in the host 101. The raw sensor signal may be converted into calibrated and/or filtered analyte concentration data used to provide a useful value of the analyte concentration (e.g., estimated blood glucose concentration level) to a user, such as the host or a caretaker (e.g., a parent, a relative, a guardian, a teacher, a doctor, a nurse, or any other individual that has an interest in the wellbeing of the host 101).

In some examples, the analyte sensor 104 is or includes a continuous glucose sensor. A continuous glucose sensor can be or include a subcutaneous, transdermal (e.g., transcutaneous), and/or intravascular device. In some embodiments, such a sensor or device may recurrently (e.g., periodically or intermittently) analyze sensor data. The glucose sensor may use any method of glucose measurement, including enzymatic, chemical, physical, electrochemical, spectrophotometric, polarimetric, calorimetric, iontophoretic, radiometric, immunochemical, and the like. In various examples, the analyte sensor system 102 may be or include a continuous glucose sensor available from DexCom, Inc. of San Diego, California, (e.g., the DexCom G5™ sensor or Dexcom G6™ sensor or any variation thereof), from Abbott™ (e.g., the Libre™ sensor), or from Medtronic™ (e.g., the Enlite™ sensor).

In some examples, analyte sensor 104 includes an implantable glucose sensor, such as described with reference to U.S. Pat. No. 6,001,067 and U.S. Patent Publication No. US-2005-0027463-A1, which are incorporated by reference. In some examples, analyte sensor 104 includes a transcutaneous glucose sensor, such as described with reference to U.S. Patent Publication No. US-2006-0020187-A1, which is incorporated by reference. In some examples, analyte sensor 104 may be configured to be implanted in a host vessel or extracorporeally, such as is described in U.S. Patent Publication No. US-2007-0027385-A1, U.S. Patent Publication No. US-2008-0119703-A1 filed Oct. 4, 2006, U.S. Patent Publication No. US-2008-0108942-A1 filed on Mar. 26, 2007, and U.S. Patent Application No. US-2007-0197890-A1 filed on Feb. 14, 2007, all of which are incorporated by reference. In some examples, the continuous glucose sensor may include a transcutaneous sensor such as described in U.S. Pat. No. 6,565,509 to Say et al., which is incorporated by reference. In some examples, analyte sensor 104 may include a continuous glucose sensor that includes a subcutaneous sensor such as described with reference to U.S. Pat. No. 6,579,690 to Bonnecaze et al. or U.S. Pat. No. 6,484,046 to Say et al., which are incorporated by reference. In some examples, the continuous glucose sensor may include a refillable subcutaneous sensor such as described with reference to U.S. Pat. No. 6,512,939 to Colvin et al., which is incorporated by reference. The continuous glucose sensor may include an intravascular sensor such as described with reference to U.S. Pat. No. 6,477,395 to Schulman et al., which is incorporated by reference. The continuous glucose sensor may include an intravascular sensor such as described with reference to U.S. Pat. No. 6,424,847 to Mastrototaro et al., which is incorporated by reference.

The environment 100 may also include a second medical device 108. The second medical device 108 may be or include a drug delivery device such as an insulin pump or an insulin pen. In some examples, the medical device 108 includes one or more sensors, such as another analyte sensor, a heart rate sensor, a respiration sensor, a motion sensor (e.g. accelerometer), posture sensor (e.g. 3-axis accelerometer), acoustic sensor (e.g. to capture ambient sound or sounds inside the body). The medical device 108 may be wearable, e.g., on a watch, glasses, contact lens, patch, wristband, ankle band, or other wearable item, or may be incorporated into a handheld device (e.g., a smartphone). In some examples, the medical device 108 includes a multi-sensor patch that may, for example, detect one or more of an analyte level (e.g., glucose, lactate, insulin or other substance), heart rate, respiration (e.g., using impedance), activity (e.g., using an accelerometer), posture (e.g., using an accelerometer), galvanic skin response, tissue fluid levels (e.g., using impedance or pressure).

In some examples, the analyte sensor system 102 and the second medical device 108 communicate with one another. Communication between the analyte sensor system 102 and medical device 108 may occur over any suitable wired connection and/or via a wireless communication signal 110. For example, the analyte sensor system 102 may be configured to communicate using via radio frequency (e.g., Bluetooth, Medical Implant Communication System (MICS), Wi-Fi, near field communication (NFC), radio frequency identification (RFID), Zigbee, Z-Wave or other communication protocols), optically (e.g., infrared), sonically (e.g., ultrasonic), or a cellular protocol (e.g., Code Division Multiple Access (CDMA) or Global System for Mobiles (GSM)), or via a wired connection (e.g., serial, parallel, etc.).

In some examples, the environment 100 also includes a wearable sensor 130. The wearable sensor 130 can include a sensor circuit (e.g., a sensor circuit configured to detect a glucose concentration or other analyte concentration) and a communication circuit, which may, for example, be an NFC circuit. In some examples, information from the wearable sensor 130 may be retrieved from the wearable sensor 130 using a user computing device 132, such as a smart phone, that is configured to communicate with the wearable sensor 130 via the wearable sensor's communication circuit, for example, when the user device 132 is placed near the wearable sensor 130. For example, swiping the user device 132 over the sensor 130 may retrieve sensor data from the wearable sensor 130 using NFC or other suitable wireless communication. The use of NFC communication may reduce power consumption by the wearable sensor 130, which may reduce the size of a power source (e.g., battery or capacitor) in the wearable sensor 130 or extend the usable life of the power source. In some examples, the wearable sensor 130 may be wearable on an upper arm as shown. In some examples, a wearable sensor 130 may additionally or alternatively be on the upper torso of the patient (e.g., over the heart or over a lung), which may, for example, facilitate detecting heart rate, respiration, or posture. A wearable sensor 136 may also be on the lower body (e.g., on a leg).

In some examples, the environment 100 also includes a wearable device 120, such as a watch. The wearable device 120 may include an activity sensor, a heart rate monitor (e.g., light-based sensor or electrode-based sensor), a respiration sensor (e.g., acoustic- or electrode-based), a location sensor (e.g., GPS), or other sensors. The wearable device 120 may be in communication with a user device 132, smart device 112, tablet computing device 114, or other suitable computing device. For example, the user device 132, smart device 112 or other suitable computing device may execute an application that communicates with the wearable device 120 and provides the host 101 with data captured by and/or derived from one or more sensors of the wearable device 120.

In some examples, an array or network of sensors may be associated with the patient. For example, one or more of the analyte sensor system 102, medical device 108, wearable device 120, and/or the additional wearable sensor 130 may communicate with one another via wired or wireless (e.g., Bluetooth, MICS, NFC or any of the other options described above,) communication. The additional wearable sensor 130 may be any of the examples described above with respect to medical device 108. The analyte sensor system 102, medical device 108, and additional sensor 130 on the host 101 are provided for illustration and description and are not necessarily drawn to scale.

The environment 100 may also include one or more computing devices, such as a hand-held smart device (e.g., smart device) 112, tablet computing device 114, smart pen 116 (e.g., insulin delivery pen with processing and communication capability), computing device 118, the wearable device 120, or peripheral medical device 122 (which may be a proprietary device such as a proprietary user device available from DexCom, Inc. of San Diego, California), any of which may communicate with the analyte sensor system 102 via a wireless communication signal 110, and may also communicate over a network 124 with a server system (e.g., remote data center) or with a remote terminal 128 to facilitate communication with a remote user (not shown) such as a technical support staff member or a clinician.

In some examples, the environment 100 includes a server system 126. The server system 126 can include one or more computing devices, such as one or more server computing devices. In some examples, the server system 126 is used to collect analyte data from the analyte sensor system 102 and/or analyte or other data from the plurality of other devices, and to perform analytics on collected data, generate or apply universal or individualized models for glucose concentrations, and communicate such analytics, models, or information based thereon back to one or more of the devices in the environment 100. In some examples, the server system 126 gathers inter-host and/or intra-host break-in data to generate one or more break-in characteristics, as described herein.

The environment 100 may also include a wireless access point (WAP) 138 used to communicatively couple one or more of analyte sensor system 102, network 124, server system 126, medical device 108 or any of the peripheral devices described above. For example, WAP 138 may provide Wi-Fi and/or cellular connectivity within environment 100. Other communication protocols, such as NFC or Bluetooth, may also be used among devices of the environment 100.

Various devices in the environment 100 can execute a bolus application 134A, 134B, 134C, 134D, 134E, 134F, 134G, 134H. A bolus application 134A, 134B, 134C, 134D, 134E, 134F, 134G, 134H performs functions, as described herein, that are related to managing one or more bolus doses of insulin for the host 101. In some examples, this includes determining bolus doses for the host 101. For example, a bolus application 134A, 134B, 134C, 134D, 134E, 134F, 134G, 134H can receive bolus input parameters, such as the host's glucose concentration, a number of carbohydrates to be consumed, etc., and output a bolus dose, for example, in units of insulin. In some examples, a bolus application 134A, 134B, 134C, 134D, 134E, 134F, 134G, 134H can also detect and/or characterize bolus insulin doses, for example, to determine and/or optimize future treatment options for the host 101.

Bolus doses of insulin determined by a bolus application 134A, 134B, 134C, 134D, 134E, 134F, 134G, 134H may be provided to a drug delivery device such as, for example, an insulin pump or other suitable drug delivery device included with the medical device 108 and/or a smart pen 116. The drug delivery device may provide the indicated bolus dose to the host 101 directly (e.g., by an insulin pump) and/or indirectly (by setting the dosage of an insulin pen 116 that can then be used by the host or other suitable human user to inject the bolus insulin dose to the host).

In the environment 100 of FIG. 1, the various bolus applications 134A, 134B, 134C, 134D, 134E, 134F, 134G, 134H are executed by different computing devices including the medical device 108 (bolus application 134A), the user computing device 132 (bolus application 134B), the tablet computing device 114 (bolus application 134C), smart device 112 (bolus application 134D), computing device 118 (bolus application 134E), medical device 122 (bolus application 134F), and server system (bolus application 134H). In some examples, a bolus application 134A, 134B, 134C, 132D, 132E, 134F, 134G, 134H is executed on just one of these provides some or all of the functionality described herein. For example, the host 101 may utilize the bolus application 134A executing at the medical device 108 to determine bolus doses of insulin or to provide other functionality as described herein. In other examples, bolus applications 134A, 134B, 134C, 132D, 132E, 134F, 134G, 134H executing at different devices may operate independently or in conjunction with one another to perform the functionality described herein.

A bolus dose determined by a bolus application 134A, 134B, 134C, 134D, 134E, 134F, 134G, 134H, can include a correction component, a meal component, or may include a correction component and a meal component. A bolus dose that includes a correction component only is referred to herein as a correction bolus. A bolus dose that includes a meal component is referred to herein as a meal bolus. A meal bolus may include, or may not include, a correction component.

The correction component of a bolus dose is used to correct for deviations from a target glucose concentration of the host 101. An example formula that can be used by a bolus application 134A, 134B, 134C, 134D, 134E, 134F, 134G, 134H to determine a correction component is given by Equation [1]:

$$CC = \frac{GC_M - GC_T}{ISF} \quad [1]$$

In Equation [1], CC is the correction component. $GC_M$ is the measured glucose concentration of the host 101 and indicates the glucose concentration of the host 101 at or about the time that the bolus dose is to be received. The measured glucose concentration, in some examples, indicates a value that is denominated in units of milligrams per deciliter (mg/dL). In some examples, the measured glucose concentration $GC_M$ is or is based on a measurement made by the analyte sensor 104. $GC_T$ is the target glucose concentration for the host 101. The target glucose concentration is a desired glucose concentration. The target glucose concentration can be selected for the host 101, for example, by or with the input of a physician or medical professional. In some examples, the target glucose concentration is selected depending on the age, sex, weight, or other characteristics of the host. In Equation [1], ISF is the insulin sensitivity factor of the host 101. The ISF for the host 101 indicates an amount by which glucose concentration is reduced per unit of insulin. For example, the ISF may be expressed in terms of mg/dL per unit of insulin. CC in Equation [1] refers to the correction component and is expressed in units of insulin.

A meal component of a bolus dose is used to cover food eaten by the host 101. When the host 101 eats food, the body of the host 101 converts the food to glucose. This raises the host's glucose concentration. The body of the host 101 uses insulin to process the glucose, either for use as energy or for storage as fat. A meal component of a bolus is to provide some or all of the insulin that the host 101 needs to process a meal. An example formula for determining a meal component of a bolus dose is given by Equation [2] below:

$$MC = \frac{C}{ICR} \quad [2]$$

In Equation [2], MC is the meal component and is expressed as a number of units of insulin. C is a measure of the carbohydrates of the consumed meal. C can be expressed in different suitable units but is often expressed as the mass of carbohydrates consumed in grams. A gram of carbohydrates is sometimes referred to as a "carb." In practice, the body can convert other components of a meal to glucose, such as protein, fat, etc. In many applications, however, because the glucose effects of proteins and other food types are smaller and more delayed that those of carbohydrates, a suitable meal component can be determined by considering carbohydrates only. Nonetheless, in some examples, a meal component of a bolus is determined by considering carbohydrates as well as other components of the meal (e.g., protein, fat, etc.)

ICR is the insulin-to-carbs ratio for the host 101. The ICR indicates the number of units of insulin that the body of the host 101 needs to process a unit of food. In Equation [2], which uses grams of carbohydrates to indicate the unit of food, the ICR is expressed as grams of carbohydrates per unit of insulin. ICR varies from patient-to-patient and even from time-to-time for the same patient/host 101. ICR can also be affected by environmental or behavioral factors. For example, the hosts ICR can effectively decrease (lowering the meal component) if the host 101 has been exercising or plans to exercise. Other behavior factors, such as alcohol consumption, etc., also affect ICR.

As described herein, a bolus dose can include a meal component, a correction component, or both. Also, in some examples, a bolus application 134A, 134B, 134C, 134D, 134E, 134F, 134G, 134H can consider factors other than those of EQUATIONS 1 and 2. For example, a bolus application 134A, 134B, 134C, 134D, 134E, 134F, 134G, 134H may also consider insulin-on-board (IOB), a trend adjustment, carbohydrates on board (COB) and/or other factors. IOB indicates an amount of insulin present and active in the body of the host 101. An increased IOB may tend to reduce a bolus dose for the host 101.

A trend adjustment affects a bolus dose of insulin based on the way that the host's measured glucose concentration is changing. Consider a first example in which the host's glucose concentration is 120 mg/dL and dropping at 10 mg/dL per minute and a second example in which the host's glucose concentration is 120 mg/dL and steady. It will be appreciated that the same bolus dose may not be indicated for both examples. With all else being equal, applying a trend adjustment may tend to result in a lower bolus dose for the first example than for the second. Various techniques can be used to incorporate trend adjustment when determining bolus doses including, for example, the Scheiner method, the Pettus/Edelman method, the Klonoff/Kerr method, the Endocrine Society method, etc.

COB is an indication of carbohydrates that the host 101 has previously eaten but that have not yet been processed by the body. With all else being equal, the presence of COB may tend to increase a bolus dose. Further details of bolus applications 134A, 134B, 134C, 134D, 134E, 134F, 134G, 134H programmed to utilize IOB, COB, and/or trend adjustment are described herein.

Figure 2:
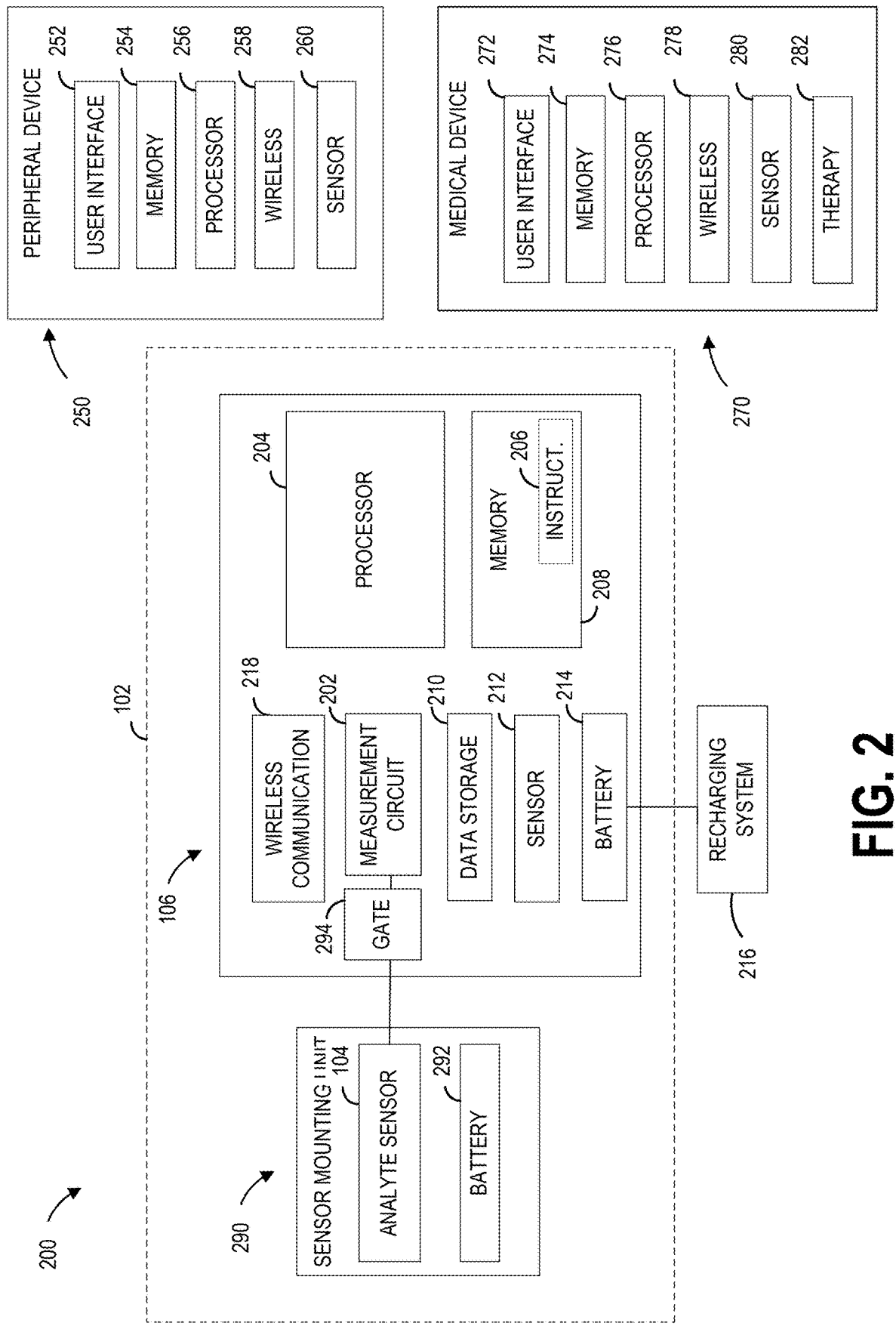
FIG. 2 is a diagram showing an example of a medical device system including the analyte sensor system of FIG. 1.

FIG. 2 is a diagram showing an example of a medical device system 200 including the analyte sensor system 102 of FIG. 1. In the example of FIG. 2, the analyte sensor system 102 includes sensor electronics 106 and a sensor mounting unit 290. While a specific example of division of components between the sensor mounting unit 290 and sensor electronics 106 is shown, it is understood that some examples may include additional components in the sensor mounting unit 290 or in the sensor electronics 106, and that some of the components (e.g., a battery or supercapacitor) that are shown in the sensor electronics 106 may be alternatively or additionally (e.g., redundantly) provided in the sensor mounting unit 290.

In the example shown in FIG. 2, the sensor mounting unit 290 includes the analyte sensor 104 and a battery 292. In some examples, the sensor mounting unit 290 may be replaceable, and the sensor electronics 106 may include a debouncing circuit (e.g., gate with hysteresis or delay) to avoid, for example, recurrent execution of a power-up or power down process when a battery is repeatedly connected and disconnected or avoid processing of noise signal associated with removal or replacement of a battery.

The sensor electronics 106 may include electronics components that are configured to process sensor information, such as raw sensor signals, and generate corresponding analyte concentration values. The sensor electronics 106 may, for example, include electronic circuitry associated with measuring, processing, storing, or communicating continuous analyte sensor data, including prospective algorithms associated with processing and calibration of the raw sensor signal. The sensor electronics 106 may include hardware, firmware, and/or software that enables measurement of levels of the analyte via a glucose sensor. Electronic components may be affixed to a printed circuit board (PCB), or the like, and can take a variety of forms. For example, the electronic components may take the form of an integrated circuit (IC), such as an Application-Specific Integrated Circuit (ASIC), a microcontroller, and/or a processor.

In the example of FIG. 2, the sensor electronics 106 include a measurement circuit 202 (e.g., potentiostat) coupled to the analyte sensor 104 and configured to recurrently obtain analyte sensor readings using the analyte sensor 104. For example, the measurement circuit 202 may continuously or recurrently measure a raw sensor signal indicating a current flow at the analyte sensor 104 between a working electrode and a counter or reference (e.g., counter-reference) electrode. The sensor electronics 106 may include a gate circuit 294, which may be used to gate the connection between the measurement circuit 202 and the analyte sensor 104. For example, the analyte sensor 104 may accumulate charge over an accumulation period. After the accumulation period, the gate circuit 294 is opened so that the measurement circuit 202 can measure the accumulated charge. Gating the analyte sensor 104 may improve the performance of the sensor system 102 by creating a larger signal to noise or interference ratio (e.g., because charge accumulates from an analyte reaction, but sources of interference, such as the presence of acetaminophen near a glucose sensor, do not accumulate, or accumulate less than the charge from the analyte reaction).

The sensor electronics 106 may also include a processor 204. The processor 204 is configured to retrieve instructions 206 from memory 208 and execute the instructions 206 to control various operations in the analyte sensor system 102. For example, the processor 204 may be programmed to control application of bias potentials to the analyte sensor 104 via a potentiostat at the measurement circuit 202, interpret raw sensor signals from the analyte sensor 104, and/or compensate for environmental factors.

The processor 204 may also save information in data storage memory 210 or retrieve information from data storage memory 210. In various examples, data storage memory 210 may be integrated with memory 208, or may be a separate memory circuit, such as a non-volatile memory circuit (e.g., flash RAM). Examples of systems and methods for processing sensor analyte data are described in more detail herein and in U.S. Pat. Nos. 7,310,544 and 6,931,327.

The sensor electronics 106 may also include a sensor 212, which may be coupled to the processor 204. The sensor 212 may be a temperature sensor, accelerometer, or another suitable sensor. The sensor electronics 106 may also include a power source such as a capacitor or battery 214, which may be integrated into the sensor electronics 106, or may be removable, or part of a separate electronics unit. The battery 214 (or other power storage component, e.g., capacitor) may optionally be rechargeable via a wired or wireless (e.g., inductive or ultrasound) recharging system 216. The recharging system 216 may harvest energy or may receive energy from an external source or on-board source. In various examples, the recharge circuit may include a triboelectric charging circuit, a piezoelectric charging circuit, an RF charging circuit, a light charging circuit, an ultrasonic charging circuit, a heat charging circuit, a heat harvesting circuit, or a circuit that harvests energy from the communication circuit. In some examples, the recharging circuit may recharge the rechargeable battery using power supplied from a replaceable battery (e.g., a battery supplied with a base component).

The sensor electronics 106 may also include one or more supercapacitors in the sensor electronics unit (as shown), or in the sensor mounting unit 290. For example, the supercapacitor may allow energy to be drawn from the battery 214 in a highly consistent manner to extend the life of the battery 214. The battery 214 may recharge the supercapacitor after the supercapacitor delivers energy to the communication circuit or to the processor 204, so that the supercapacitor is prepared for delivery of energy during a subsequent high-load period. In some examples, the supercapacitor may be configured in parallel with the battery 214. A device may be configured to preferentially draw energy from the supercapacitor, as opposed to the battery 214. In some examples, a supercapacitor may be configured to receive energy from a rechargeable battery for short-term storage and transfer energy to the rechargeable battery for long-term storage. The supercapacitor may extend an operational life of the battery 214 by reducing the strain on the battery 214 during the high-load period.

The sensor electronics 106 may also include a wireless communication circuit 218, which may for example include a wireless transceiver operatively coupled to an antenna. The wireless communication circuit 218 may be operatively coupled to the processor 204 and may be configured to wirelessly communicate with one or more peripheral devices or other medical devices, such as an insulin pump or smart insulin pen.

In the example of FIG. 2, the medical device system 200 also includes an optional peripheral device 250. The peripheral device 250 may be any suitable user computing device such as, for example, a wearable device (e.g., activity monitor), such as a wearable device 120. In other examples, the peripheral device 250 may be a hand-held smart device (e.g., smartphone or other device such as a proprietary handheld device available from Dexcom), a tablet computing device 114, a smart pen 116, or a computing device 118 shown in FIG. 1.

The peripheral device 250 may include a UI 252, a memory circuit 254, a processor 256, a wireless communication circuit 258, a sensor 260, or any combination thereof. The peripheral device 250 may not necessarily include all the components shown in FIG. 2. The peripheral device 250 may also include a power source, such as a battery.

The UI 252 may, for example, be provided using any suitable input/output device or devices of the peripheral device 250 such as, for example, a touch-screen interface, a microphone (e.g., to receive voice commands), or a speaker, a vibration circuit, or any combination thereof. The UI 252 may receive information from the host or another user (e.g., instructions, glucose values). The UI 252 may also deliver information to the host or other user, for example, by displaying UI elements at the UI 252. For example, UI elements can indicate glucose or other analyte concentration values, glucose or other analyte trends, glucose or other analyte alerts, etc. Trends can be indicated by UI elements such as arrows, graphs, charts, etc.

The processor 256 may be configured to present information to a user, or receive input from a user, via the UI 252. The processor 256 may also be configured to store and retrieve information, such as communication information (e.g., pairing information or data center access information), user information, sensor data or trends, or other information in the memory circuit 254. The wireless communication circuit 258 may include a transceiver and antenna configured to communicate via a wireless protocol, such as any of the wireless protocols described herein. The sensor 260 may, for example, include an accelerometer, a temperature sensor, a location sensor, biometric sensor, or blood glucose sensor, blood pressure sensor, heart rate sensor, respiration sensor, or other physiologic sensor.

The peripheral device 250 may be configured to receive and display sensor information that may be transmitted by sensor electronics 106 (e.g., in a customized data package that is transmitted to the display devices based on their respective preferences). Sensor information (e.g., blood glucose concentration level) or an alert or notification (e.g., "high glucose level", "low glucose level" or "fall rate alert" may be communicated via the UI 252 (e.g., via visual display, sound, or vibration). In some examples, the peripheral device 250 may be configured to display or otherwise communicate the sensor information as it is communicated from the sensor electronics 106 (e.g., in a data package that is transmitted to respective display devices). For example, the peripheral device 250 may transmit data that has been processed (e.g., an estimated analyte concentration level that may be determined by processing raw sensor data), so that a device that receives the data may not be required to further process the data to determine usable information (such as the estimated analyte concentration level). In other examples, the peripheral device 250 may process or interpret the received information (e.g., to declare an alert based on glucose values or a glucose trend). In various examples, the peripheral device 250 may receive information directly from sensor electronics 106, or over a network (e.g., via a cellular or Wi-Fi network that receives information from the sensor electronics 106 or from a device that is communicatively coupled to the sensor electronics 106).

In the example of FIG. 2, the medical device system 200 includes an optional medical device 270. For example, the medical device 270 may be used in addition to or instead of the peripheral device 250. The medical device 270 may be or include any suitable type of medical or other computing device including, for example, the medical device 108, peripheral medical device 122, wearable device 120, wearable sensor 130, or wearable sensor 136 shown in FIG. 1. The medical device 270 may include a UI 272, a memory circuit 274, a processor 276, a wireless communication circuit 278, a sensor 280, a therapy circuit 282, or any combination thereof.

Similar to the UI 252, the UI 272 may be provided using any suitable input/output device or devices of the medical device 270 such as, for example, a touch-screen interface, a microphone, or a speaker, a vibration circuit, or any combination thereof. The UI 272 may receive information from the host or another user (e.g., glucose values, alert preferences, calibration coding). The UI 272 may also deliver information to the host or other user, for example, by displaying UI elements at the UI 252. For example, UI elements can indicate glucose or other analyte concentration values, glucose or other analyte trends, glucose or other analyte alerts, etc. Trends can be indicated by UI elements such as arrows, graphs, charts, etc.

The processor 276 may be configured to present information to a user, or receive input from a user, via the UI 272. The processor 276 may also be configured to store and retrieve information, such as communication information (e.g., pairing information or data center access information), user information, sensor data or trends, or other information in the memory circuit 274. The wireless communication circuit 278 may include a transceiver and antenna configured communicate via a wireless protocol, such as any of the wireless protocols described herein.

The sensor 280 may, for example, include an accelerometer, a temperature sensor, a location sensor, biometric sensor, or blood glucose sensor, blood pressure sensor, heart rate sensor, respiration sensor, or other physiologic sensor. The medical device 270 may include two or more sensors (or memories or other components), even though only one sensor 280 is shown in the example in FIG. 2. In various examples, the medical device 270 may be a smart handheld glucose sensor (e.g., blood glucose meter), drug pump (e.g., insulin pump), or other physiologic sensor device, therapy device, or combination thereof.

In examples where medical device 270 is or includes an insulin pump, the pump and analyte sensor system 102 may be in two-way communication (e.g., so the pump can request a change to an analyte transmission protocol, e.g., request a data point or request data on a more frequent schedule), or the pump and analyte sensor system 102 may communicate using one-way communication (e.g., the pump may receive analyte concentration level information from the analyte sensor system). In one-way communication, a glucose value may be incorporated in an advertisement message, which may be encrypted with a previously-shared key. In a two-way communication, a pump may request a value, which the analyte sensor system 102 may share, or obtain and share, in response to the request from the pump, and any or all of these communications may be encrypted using one or more previously-shared keys. An insulin pump may receive and track analyte (e.g., glucose) values transmitted from analyte sensor system 102 using one-way communication to the pump for one or more of a variety of reasons. For example, an insulin pump may suspend or activate insulin administration based on a glucose value being below or above a threshold value.

In some examples, the medical device system 200 includes two or more peripheral devices and/or medical devices that each receive information directly or indirectly from the analyte sensor system 102. Because different display devices provide many different user interfaces, the content of the data packages (e.g., amount, format, and/or type of data to be displayed, alarms, and the like) may be customized (e.g., programmed differently by the manufacturer and/or by an end user) for each particular device. For example, referring now to the example of FIG. 1, a plurality of different peripheral devices may be in direct wireless communication with sensor electronics 106 (e.g., such as an on-skin sensor electronics 106 that are physically connected to the continuous analyte sensor 104) during a sensor session to enable a plurality of different types and/or levels of display and/or functionality associated with the displayable sensor information, or, to save battery power in the sensor system 102, one or more specified devices may communicate with the analyte sensor system 102 and relay (i.e., share) information to other devices directly or through a server system 126 (e.g., a network-connected data center).

Figure 3:
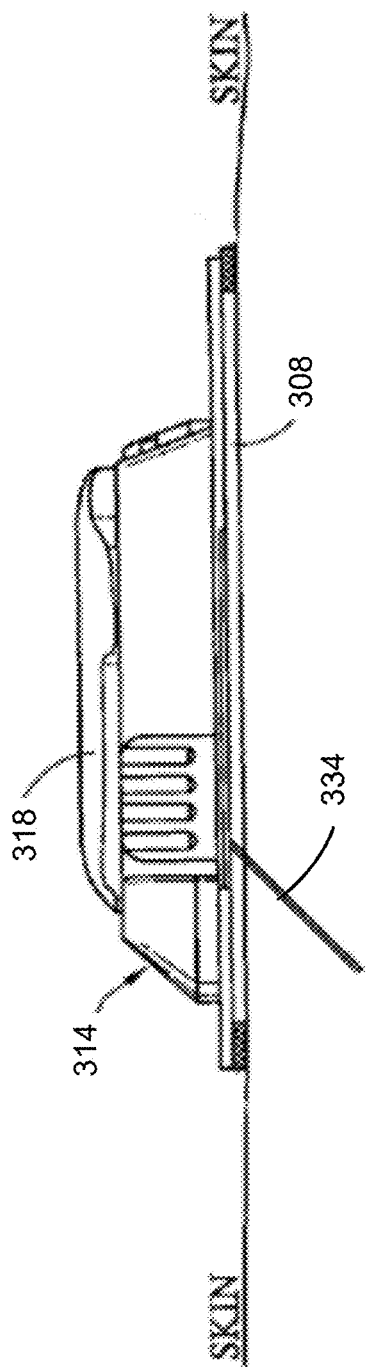
FIG. 3 is an illustration of an example analyte sensor.

FIG. 3 is a side view of an example analyte sensor 334 that may be implanted into a host. A mounting unit 314 may be adhered to the host's skin using an adhesive pad 308. The adhesive pad 308 may be formed from an extensible material, which may be removably attached to the skin using an adhesive. Electronics unit 318 may mechanically couple to the mounting unit 314. In some examples, the electronics unit 318 and mounting unit 314 are arranged in a manner similar to the sensor electronics 106 and sensor mounting unit 290 shown in FIGS. 1 and 2.

Figure 4:
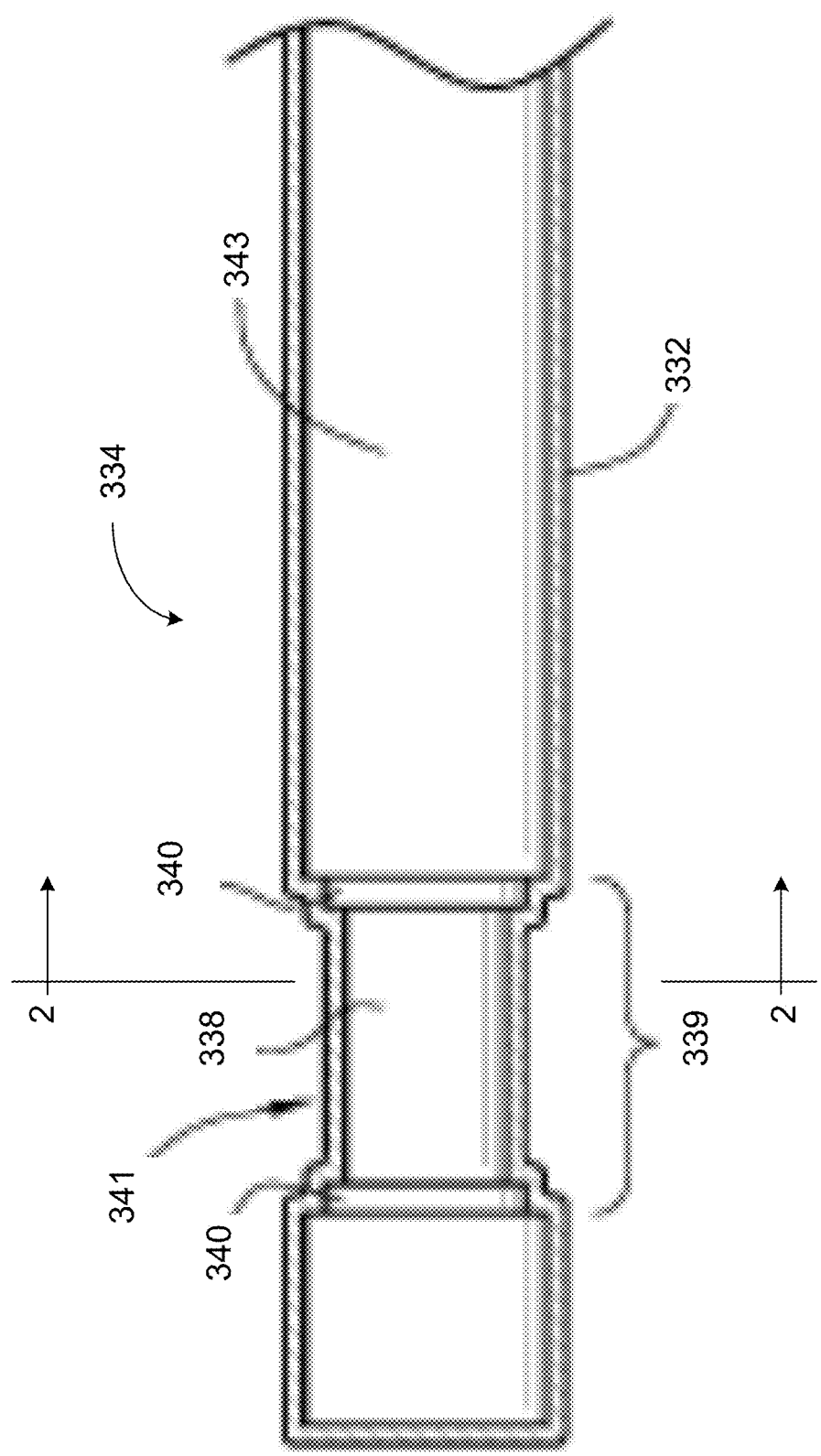
FIG. 4 is an enlarged view of an example analyte sensor portion of the analyte sensor system shown in FIG. 3.

FIG. 4 is an enlarged view of a distal portion of the analyte sensor 334. The analyte sensor 334 may be adapted for insertion under the host's skin and may be mechanically coupled to the mounting unit 314 and electrically coupled to the electronics unit 318. The example analyte sensor 334 shown in FIG. 4 includes an elongated conductive body 341. The elongated conductive body 341 can include a core with various layers positioned thereon. A first layer 338 that at least partially surrounds the core and includes a working electrode, for example located in window 339). In some examples, the core and the first layer 338 are made of a single material (such as, for example, platinum). In some examples, the elongated conductive body 341 is a composite of two conductive materials, or a composite of at least one conductive material and at least one non-conductive material. A membrane system 332 is located over the working electrode and may cover other layers and/or electrodes of the sensor 334, as described herein.

The first layer 338 may be formed of a conductive material. The working electrode (at window 339) is an exposed portion of the surface of the first layer 338. Accordingly, the first layer 338 is formed of a material configured to provide a suitable electroactive surface for the working electrode. Examples of suitable materials include, but are not limited to, platinum, platinum-iridium, gold, palladium, iridium, graphite, carbon, a conductive polymer, an alloy thereof, and/or the like.

A second layer 340 surrounds at least a portion of the first layer 338, thereby defining boundaries of the working electrode. In some examples, the second layer 340 serves as an insulator and is formed of an insulating material, such as polyimide, polyurethane, parylene, or any other suitable insulating materials or materials.

The analyte sensor 334 may include two (or more) electrodes, e.g., a working electrode at the layer 338 and exposed at window 339 and at least one additional electrode, such as a reference (e.g., counter-reference) electrode of the layer 343. In the example arrangement of FIGS. 3-5, the reference electrode also functions as a counter electrode, although other arrangements can include a separate counter electrode. While the analyte sensor 334 may be used with a mounting unit in some examples, in other examples, the analyte sensor 334 may be used with other types of sensor systems. For example, the analyte sensor 334 may be part of a system that includes a battery and sensor in a single package, and may optionally include, for example, a near-field communication (NFC) circuit.

Figure 5:
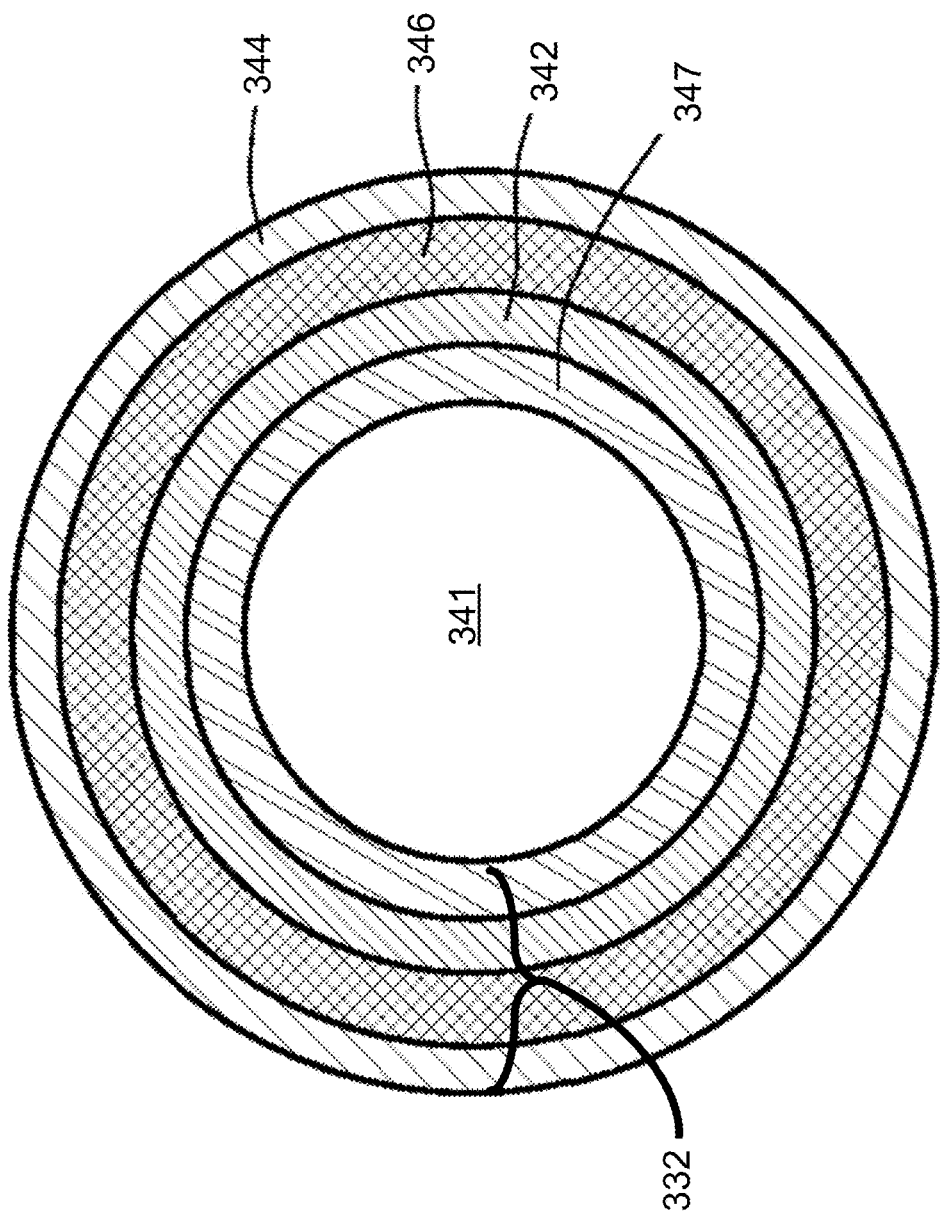
FIG. 5 is a cross-sectional view of the analyte sensor of FIGS. 3 and 4.

FIG. 5 is a cross-sectional view through the sensor 334 of FIG. 4 on plane 2-2 illustrating a membrane system 332. The membrane system 332 may include a number of domains (e.g., layers). In an example, the membrane system 332 may include an enzyme domain 342, a diffusion resistance domain 344, and a bioprotective domain 346 located around the working electrode. In some examples, a unitary diffusion resistance domain and bioprotective domain may be included in the membrane system 332 (e.g., wherein the functionality of both the diffusion resistance domain and bioprotective domain are incorporated into one domain).

The membrane system 332, in some examples, also includes an electrode layer 347. The electrode layer 347 may be arranged to provide an environment between the surfaces of the working electrode and the reference (e.g., counter-reference) electrode that facilitates the electrochemical reaction between the electrodes. For example, the electrode layer 347 may include a coating that maintains a layer of water at the electrochemically reactive surfaces of the sensor 334.

In some examples, the sensor 334 may be configured for short-term implantation (e.g., from about 1 to 30 days). However, it is understood that the membrane system 332 can be modified for use in other devices, for example, by including only one or more of the domains, or additional domains. For example, a membrane system 332 may include a plurality of resistance layers, or a plurality of enzyme layers. In some example, the resistance domain 344 may include a plurality of resistance layers, or the enzyme domain 342 may include a plurality of enzyme layers.

The diffusion resistance domain 344 may include a semi-permeable membrane that controls the flux of oxygen and glucose to the underlying enzyme domain 342. As a result, the upper limit of linearity of glucose measurement is extended to a much higher value than that which is achieved without the diffusion resistance domain 344.

In some examples, the membrane system 332 may include a bioprotective domain 346, also referred to as a domain or biointerface domain, comprising a base polymer. However, the membrane system 332 of some examples can also include a plurality of domains or layers including, for example, an electrode domain, an interference domain, or a cell disruptive domain, such as described in more detail elsewhere herein and in U.S. Pat. Nos. 7,494,465, 8,682,608, and 9,044,199, which are incorporated herein by reference in their entirety.

It is to be understood that sensing membranes modified for other sensors, for example, may include fewer or additional layers. For example, in some examples, the membrane system 332 may comprise one electrode layer, one enzyme layer, and two bioprotective layers, but in other examples, the membrane system 332 may comprise one electrode layer, two enzyme layers, and one bioprotective layer. In some examples, the bioprotective layer may be configured to function as the diffusion resistance domain 344 and control the flux of the analyte (e.g., glucose) to the underlying membrane layers.

Although the examples illustrated in FIGS. 4-5 involve circumferentially extending membrane systems, the membranes described herein may be applied to any planar or non-planar surface, for example, the substrate-based sensor structure of U.S. Pat. No. 6,565,509 to Say et al., which is incorporated by reference.

In an example in which the analyte sensor 334 is a glucose sensor, glucose analyte can be detected utilizing glucose oxidase or another suitable enzyme, as described in more detail elsewhere herein. For example, glucose oxidase may react with glucose to product hydrogen peroxide ($H_2O_2$). An oxidation/redox reaction pair as the working and reference electrodes generates a sensor current. The magnitude of the sensor current is indicative of the concentration of hydrogen peroxide, and thereby also indicative of the concentration of glucose.

A calibration curve may be used to generate an estimated glucose concentration level based on the measured sensor current. The magnitude of the sensor current, however, also depends on other factors such as the diffusivity of glucose through the sensor membrane system, the operating potential at the reference electrode, etc. The glucose diffusivity of the membrane system may change over time, which may cause the sensor glucose sensitivity to change over time or "drift." Sensor drift can be compensated, for example, by modeling the sensor drift and making appropriate adjustments to the calibration curve. Changes to the operating potential at the reference (e.g., counter-reference) electrode, described in more detail elsewhere herein, may be mitigated and/or compensated, for example, using the techniques described herein.

Figure 6:
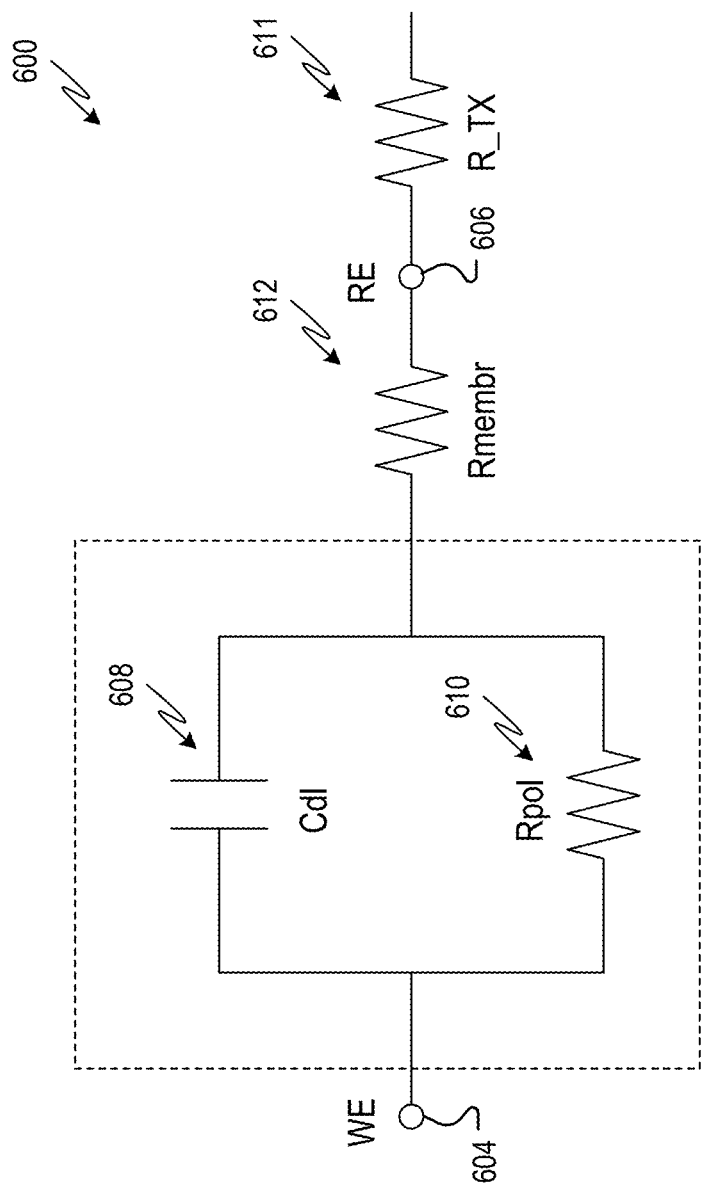
FIG. 6 is a schematic illustration of a circuit that represents the behavior of an example analyte sensor.

FIG. 6 is a schematic illustration of a circuit 600 that represents the behavior of an example analyte sensor, such as the analyte sensor 334 shown in FIGS. 3-5. As described herein, the interaction of hydrogen peroxide (generated from the interaction between glucose analyte and glucose oxidase) and working electrode (WE) 604 produces a voltage differential between the working electrode (WE) 604 and reference (e.g., counter-reference) electrode (RE) 606 which drives a current. The current may make up all or part of a raw sensor signal that is measured by sensor electronics, such as the sensor electronics 106 of FIGS. 1-2, and used to estimate an analyte concentration (e.g., glucose concentration).

The circuit 600 also includes a double-layer capacitance (Cdl) 608, which occurs at an interface between the working electrode (WE) 604 and the adjacent membrane (not shown in FIG. 6, see, e.g., FIGS. 3-5 above). The double-layer capacitance (Cdl) may occur at an interface between the working electrode 604 and the adjacent membrane due to the presence of two layers of ions with opposing polarity, as may occur during application of an applied voltage between the working electrode 604 and reference (e.g., counter-reference) electrode. The equivalent circuit 600 may also include a polarization resistance (Rpol) 610, which may be relatively large, and may be modeled, for example, as a static value (e.g., 100 mega-Ohms), or as a variable quantity that varies as a function of glucose concentration level.

An estimated analyte concentration may be determined from a raw sensor signal based upon a measured current (or charge flow) through the analyte sensor membrane 612 when a bias potential is applied to the sensor circuit 600. For example, sensor electronics or another suitable computing device can use the raw sensor signal and a sensitivity of the sensor, which correlates a detected current flow to a glucose concentration level, to generate the estimated analyte concentration. In some examples, the device also uses a break-in characteristic, as described herein.

The change in glucose diffusivity over time presents a problem, in that two unknown variables (glucose concentration around the membrane 612 and glucose diffusivity in the membrane 612) are present in the system. For example, frequent blood glucose meter calibrations may be used to account for the drift, but this need for meter calibrations may be undesirable for a variety of reasons (e.g., inconvenience to the patient, cost, the potential for inaccurate blood glucose meter data, etc.).

With reference to the equivalent circuit 600, when a voltage is applied across the working and reference (e.g., counter-reference) electrodes 604 and 606, a current may be considered to flow (forward or backward depending on polarity) through the internal electronics of transmitter (represented by R_Tx_internal) 611; through the reference (e.g., counter-reference) electrode (RE) 606 and working electrode (WE) 604, which may be designed to have a relatively low resistance; and through the sensor membrane 612 (Rmembr, which is relatively small). Depending on the state of the circuit, current may also flow through, or into, the relatively large polarization resistance 610 (which is indicated as a fixed resistance, but may also be a variable resistance that varies with the body's glucose level, where a higher glucose level provides a smaller polarization resistance), or into the double-layer capacitance 608 (i.e., to charge the double-layer membrane capacitor formed at the working electrode 604), or both.

The impedance (or conductance) of the membrane (Rmembr) 612 is related to electrolyte mobility in the membrane, which is in turn related to glucose diffusivity in the membrane. As the impedance goes down (i.e., conductance goes up, as electrolyte mobility in the membrane 612 goes up), the glucose sensitivity goes up (i.e., a higher glucose sensitivity means that a particular glucose concentration will produce a larger signal in the form of more current or charge flow). Impedance, glucose diffusivity, and glucose sensitivity are further described in U.S. Patent Publication No. US2012/0262298, which is incorporated by reference in its entirety.

Various arrangements described herein are directed to arrangements for setting bolus configuration parameters for determining bolus insulin doses for host. Bolus configuration parameters are input parameters that are used to generate a bolus dose for the host. Example bolus configuration parameters include the insulin sensitivity factor (ISF), insulin-to-carbs ration (ICR), and target glucose concentration ($GC_T$), described herein, for example, with respect Equations [1] and [2]. Other bolus configuration parameters include parameters for utilizing insulin-on-board, carbs on board, trend adjustment, or other features, for example, as described herein. As described herein, bolus configuration parameters depend on the individual physiology of the host 101 and may even vary over time.

Sometimes, when the host 101 begins to use a new bolus calculator, such as a bolus calculator implemented by a bolus application 134A, 134B, 134C, 134D, 134E, 134F, 134G, 134H, the host 101 will have initial values for bolus configuration parameters, such as ISF, ICR, $GC_T$, etc. that can be input to the bolus application 134A, 134B, 134C, 134D, 134E, 134F, 134G, 134H. For example, the host 101 may have previously used a different bolus calculator, calculated bolus doses by hand, and/or a medical care provider may have recommended specific configuration parameters. This may allow the host 101 to copy previously-used bolus configuration parameters to the new bolus calculator.

In some examples, however, a host 101 begins using a bolus calculator without knowledge of previously-used bolus configuration parameters. Sometimes the host 101 is simply unaware of the bolus configuration parameters that were used with a previous technique. Also, sometimes, the host 101 previously used a different method of determining bolus doses that does not use the same bolus configuration parameters as the desired bolus calculator.

For example, some patients use bolus-dosing techniques based on simple heuristics that do not translate well to bolus calculators. For example, some patients receive the same bolus dose (for example, by meal) regardless of the specific food consumed in a meal. Other patients receive a bolus dose that includes a rough adjustment for the patient's current glucose concentration, but not for the meal consumed. Still other patients receive a bolus dose that is fixed for a particular meal size (e.g., a small meal corresponds to X units of insulin, a medium meal corresponds to Y units of insulin, a large meal corresponds to Z units of insulin).

Figure 7:
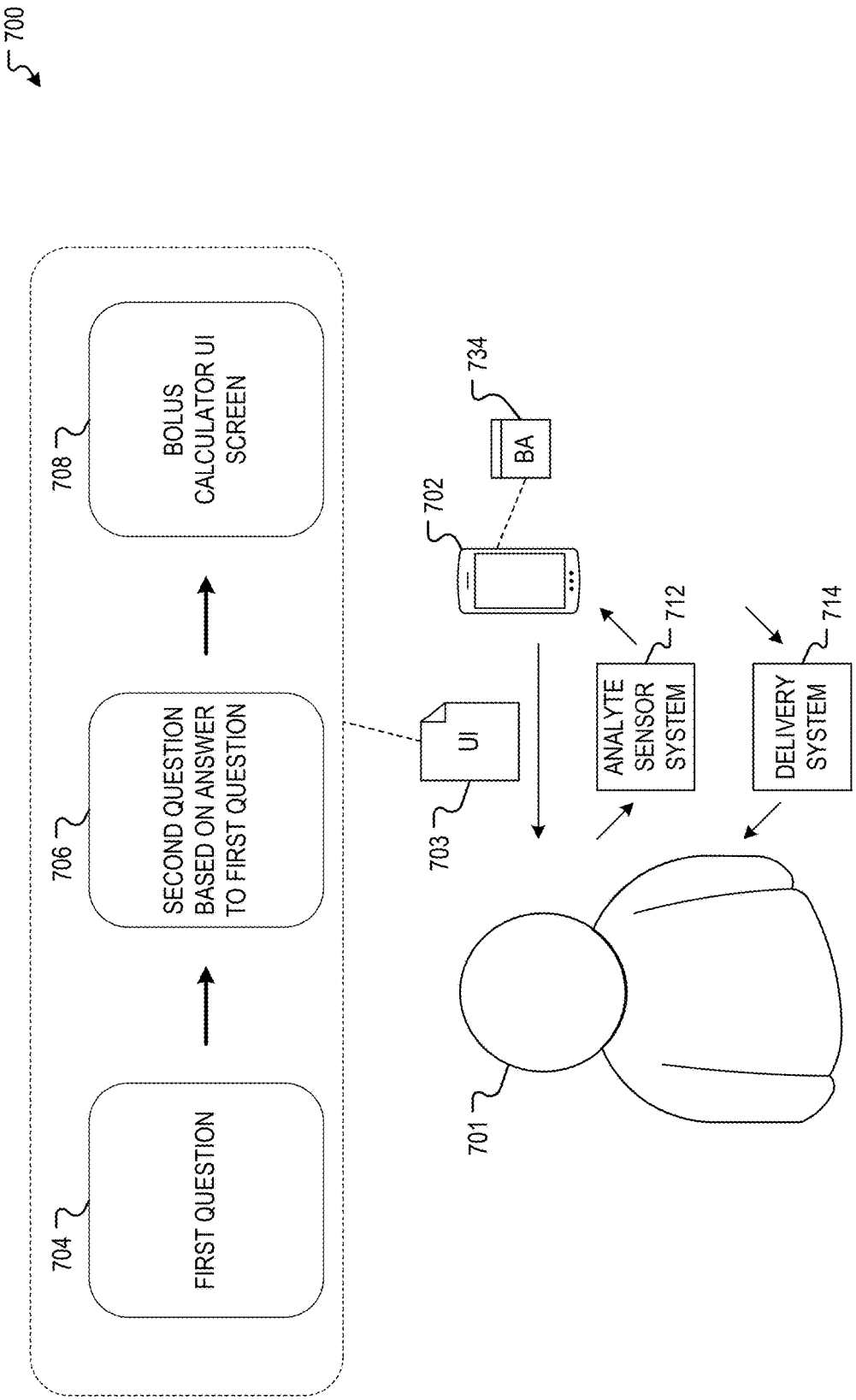
FIG. 7 is a diagram showing an example of an environment that demonstrates the use of a bolus application to determine and use a set of at least one bolus configuration parameters for a host.

Various examples described herein address these and other issues by implementing a bolus application that is configured to determine a set of at least one bolus configuration parameter for the host 101. FIG. 7 is a diagram showing an example of an environment 700 that demonstrates the use of a bolus application 734 to determine and use a set of at least one bolus configuration parameters for a host 701. In this example, the host 701 utilizes a computing device 702 to execute the bolus application 734. The computing device 702 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 702 may include and/or be in communication with an analyte sensor system 712 and a delivery system 714. The analyte sensor system 712, similar to the analyte sensor system 102, may detect an analyte at the host 701, such as a glucose concentration of the host 701. The delivery system 714 is configured to deliver a bolus dose to the host 701. For example, the delivery system 714 can be or include an insulin pen, an insulin pump, or other suitable delivery system. The bolus application 734 generates a bolus application user interface 703 that is provided to the host 701. The bolus application user interface 703 may include visual and/or audible elements to provide information to the host 701 and/or to receive information from the host 701. In the arrangement of FIG. 7, the bolus application 734 is configured to generate a set of at least one bolus configuration parameter for use in generating a bolus dose for the host 701. The set of at least one bolus configuration parameter can include one bolus configuration parameter and/or more than one bolus configuration parameter.

In the example of FIG. 7, the bolus application 734 utilizes a set of questions that may include adaptive questions to determine bolus configuration parameters. The bolus application 734 may determine bolus configuration parameters, for example, upon setup. According to the adaptive set of questions, questions are selected based on the answers provided by the host 701 to previous questions. For example, a first question may query the host 701 to provide a description of the bolus determination technique that the host 701 currently uses. Subsequent questions may be selected based on the host's current bolus determination technique.

In the example of FIG. 7, a number of example screens 704, 706, 708 of the bolus application user interface 703 are shown. A first screen 704 of the bolus application user interface 703 may serve to the host 701 a first question. The first question, for example, can query the host 701 for information about a previous bolus determination technique of the host. The first question can be arranged in a format that is simple for the host 701 to understand and answer. For example, the first question may ask the host 701, "Do you use a formula or equation to calculate bolus doses of insulin?" The host 701 provides an answer to the first question via the bolus application user interface 703, for example, utilizing an input device of the computing device 702 such as a microphone, a keyboard, a touchpad, etc. In another example, the first question may as about a property of the host 701, such as, "How much do you weigh?"

Upon receiving a response to the first question, the bolus application 734 selects a second bolus configuration parameter question and serves to the host 701 a second screen 706 indicating the second bolus configuration parameter question. The second bolus configuration parameter question is based on the provided answer to the first bolus configuration parameter question. For example, if the host 701 provides a first answer indicating that the host 701 uses a formula to calculate boluses, the second question may specifically ask for an ISF, ICR, or $GC_T$ that the host 701 currently uses. If the host 701 provides a first answer indicating that the host 701 does not use a formula to calculate bolus doses of insulin, the second question may ask a question that is to provide a rough indication of a bolus configuration parameter. For example, the second question may ask the host 701 to provide an indication of an example meal and an example bolus that would have been used to cover the meal under the previous bolus determination technique of the host. In some examples, the host 701 is prompted to provide an image of the example meal. The bolus application 734 may derive nutritional information (e.g., a number of carbs) from the image. In some examples, the image is captured by a camera or other image sensor incorporated into the delivery system 714. Although two questions are described in FIG. 7, in some examples, additional adaptive questions may be provided and answers to the additional questions provided by the host 701. Upon receiving the answers to one or more bolus configuration parameter questions, the bolus application 734 determines a set of one or more bolus configuration parameters, such as ISF, ICR, or $GC_T$, etc.

Upon determining a set of one or more bolus configuration parameters, the bolus applications 734 may serve a bolus calculator UI screen 708. The bolus calculator UI screen 708 is provided to the host 701 when a bolus dose is requested, for example, by the host 701 and/or by the bolus application 734 (for example, in response to detecting an uncovered meal or desired correction). The host 701 may provide bolus input parameters, such as a number of carbs consumed or to be consumed. In some examples, the bolus application 734 receives a glucose concentration of the host 701 from the analyte sensor system 712. Based on the bolus input parameters and the bolus configuration parameters, the bolus application 734 determines a bolus dose for the host 701 using any suitable technique including, for example, the techniques described herein.

An indication of the determined bolus dose can be provided to the host 701 via the bolus application user interface 703. In this way, the host 701 may utilize a syringe, insulin pen, insulin pump, or other suitable delivery system to receive the determined insulin bolus dose. In some examples, the bolus application 734 provides an indication of the determined bolus dose directed to the delivery system 714. In response, the delivery system 714 may deliver the bolus dose and/or configure itself to deliver the bolus dose. In examples in which the delivery system 714 is or comprises an insulin pen, the insulin pen may configure itself to provide the determined bolus dose. The host 701 may utilize the pen to provide the bolus dose, as determined. In some examples in which the delivery system 714 is or comprises an insulin pump, the insulin pump may provide the determined bolus with or without further input from the host 701.

In some examples, the bolus application 734, via the UI 703, requests that the host 701 provide data describing previous meals (e.g., a number of carbs in the previous meal) and associated bolus doses received by the host 701 for the previous meals. The bolus application 734 may use this data, either alone or in conjunction with answers to other questions, to derive bolus configuration parameters.

Figure 8:
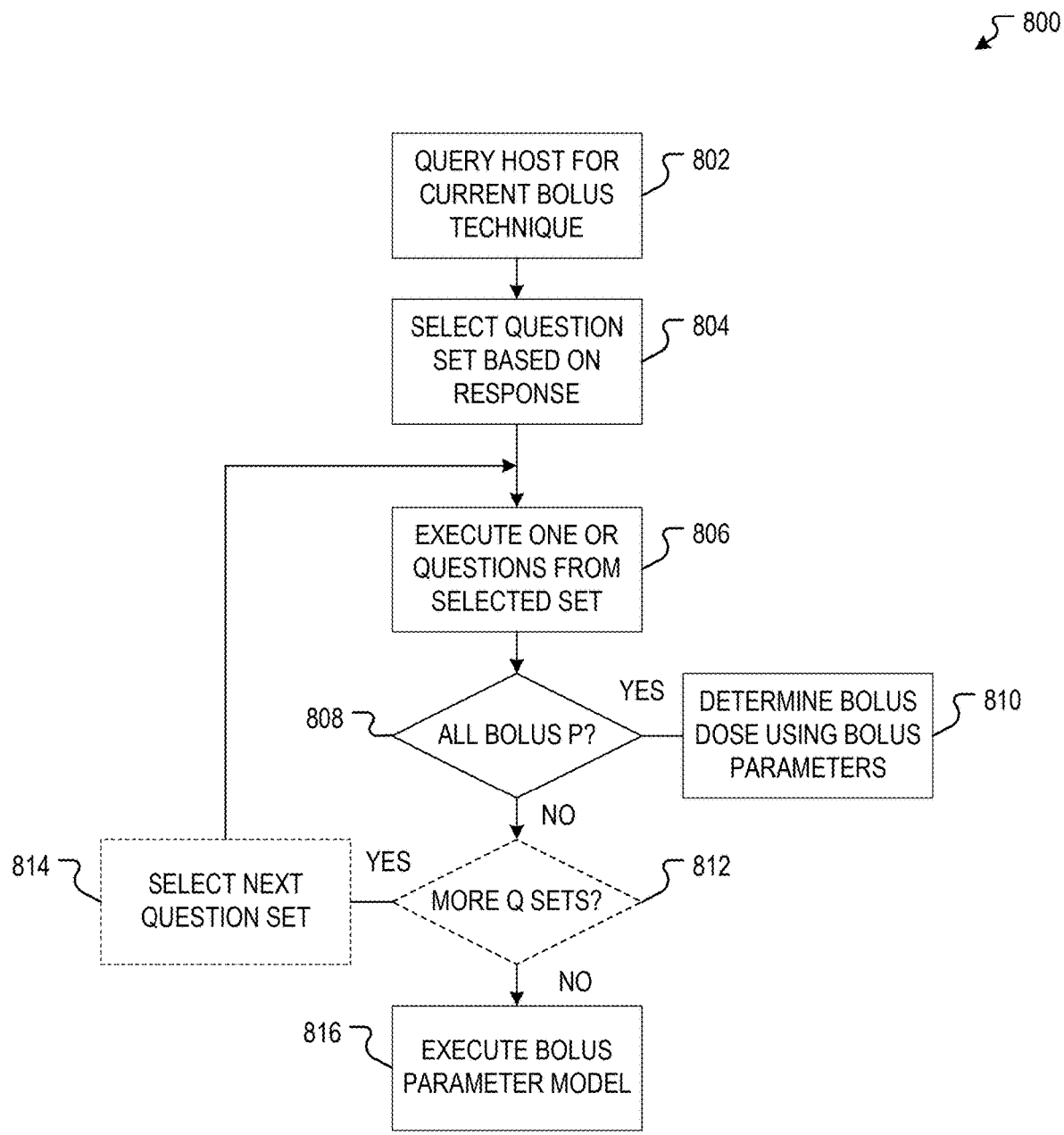
FIG. 8 is a flowchart showing an example of a process flow that may be executed by a bolus application to determine a set of one or more bolus configuration parameters, as described herein.

FIG. 8 is a flowchart showing an example of a process flow 800 that may be executed by the bolus application 734 to determine a set of one or more bolus configuration parameters, as described herein. At operation 802, the bolus application 734 queries the host 701 to provide data describing a current bolus technique used by the host 701. Based on the answer provided by the host 701, the bolus application 734 selects a question set for further questions. The selected question set includes one or more questions that are based on the answer that the host 701 provides to the question of operation 802. The selected question set can include questions that relate to the current bolus technique, properties of the host 701 (e.g., weight, height etc.), or any other suitable topic for determining bolus calculator parameters. At operation 806, the bolus application 734 executes one or more questions from the set of questions selected at operation 804.

At operation 808, the bolus application 734 determines whether the answers that it has received from the host 701 are sufficient to determine all bolus configuration parameters necessary to determine a bolus dose for the host 701. If the bolus application 734 determines that it can determine all of the bolus configuration parameters, it may do so and operation 810 and use the determined parameters to calculate a bolus dose for the host 701, for example, as described herein.

If the bolus application 734 does not have sufficient answers to determine bolus configuration parameters, it may skip to operation 816 or, optionally, may determine at operation 812 whether there is an additional set of questions that may be presented to the host 701. If the bolus application 734 does have sufficient answers to determine bolus configuration parameters, it may execute a bolus parameter model at operation 816 (as described herein) or, at optional operation 812, the bolus application 734 determines if there is an additional question set. If there is an additional question set, the bolus application 734 selects the next question set at operation 814 and then executes one or more questions from the selected set at operation 806. The additional question set selected at operation 814 may be selected based on one or more answers received from the host 701 to the previous question set.

If there are no additional question sets at operation 812 (or in arrangements where operation 812 is omitted), the bolus application 734 may execute a bolus configuration parameter model at operation 816. The bolus configuration parameter model may be any suitable type of model that relates characteristics of the host 701 to bolus configuration parameters. The model, in some examples, also relates answers to the questions provided to the host at operation 806 to bolus configuration parameters, either in combination with or instead of host characteristics. Example host characteristics that can be utilized by the model include body weight, body mass index (BMI), diabetes diagnosis (e.g., Type I or Type II), other medications taken, type of insulin used, etc. The bolus application 734 may query the host 701 to provide one or more characteristics, for example, if the characteristics were not previously provided in response to other queries. In some examples, host characteristics can be received in response to questions from the question set executed at operation 806. Further details regarding an example model are described herein with respect to FIGS. 9 and 10.

Figure 9:
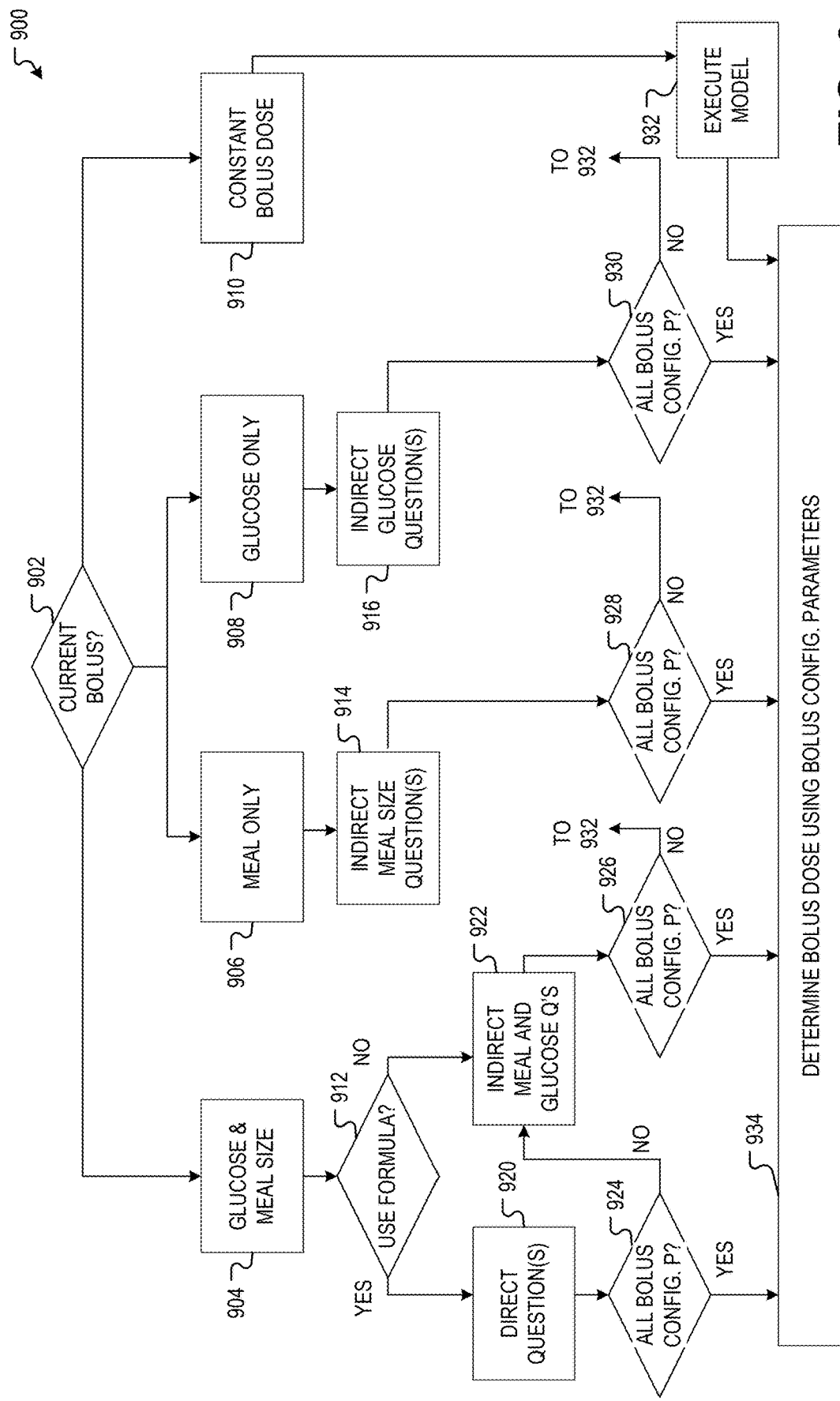
FIG. 9 is a flowchart showing an example of a question workflow that may be executed by a bolus application to determine bolus configuration parameters.

FIG. 9 is a flowchart showing an example of a question workflow 900 that may be executed by the bolus application 734 to determine bolus configuration parameters for the host 701. The workflow 900, for example, demonstrates one arrangement of questions that may be presented to the host 701 to determine bolus configuration parameters.

At 902, the bolus application 734 queries the host 701 (e.g., via the bolus application user interface 703) to indicate information about a previous bolus determination technique that was used by the host 701. In some examples, the bolus application 734 queries the host 701 to indicate things that the host 701 considered to determine a bolus dose under the previous bolus determination technique. For example, the host 701 may determine bolus insulin doses based on a meal eaten at or near the time of a bolus (e.g., a bolus-associated meal) and/or based on glucose concentration. An example question for executing 902 is indicated by Example Question 1:

Example Question 1: The amount of insulin that I take at each meal is:
  (A) Based on my glucose concentration and meal size
  (B) Based only on my meal size
  (C) The same every time I eat breakfast, lunch or dinner
  (D) The same for every meal In some examples, the query at 902 can include more than one question, such as example Questions 2 and 3 below:
  Example Question 2: Do you use your glucose concentration to determine a bolus?
  Example Question 3: Do you use the size of your meal to determine a bolus?

Based on the answer or answers provided by the host 701 to the query of 902, the bolus application 734 selects a next set of one or more questions. If the host 701 indicates that he or she uses both glucose concentration and meal size of a bolus-associated meal to determine a bolus with the previous bolus determination technique, the bolus application 734 queries the host 701 using question set 904. For example, at 912, the bolus application 734 queries the host 701 to indicate whether the previous bolus determination technique includes using a formula. Use of a formula may indicate that the host 701 already knows or may be able to find direct values for one or more bolus configuration parameters. If the host 701 indicates that the previous bolus determination technique uses a formula, then the bolus application 734 queries the host 701 with one or more direct questions at 920. Direct questions may include questions that ask the host 701 to directly provide one or more bolus configuration parameters, such as ISF, ICR, $GC_T$, etc. At 924, the bolus application 734 determines whether the answers provided by the host 701 to the direct questions at 920 provide all bolus configuration parameters for determining bolus doses of insulin for the host 701. If all bolus configuration parameters are received, then the bolus application 734 may determine one or more bolus doses of insulin for the host 701 at operation 934.

If the host 701 indicates at 912 that the host 701 does not use a formula to determine a bolus with the previous bolus determination technique, (or if the direct questions at 920 did not provide all bolus configuration parameters) the bolus application 734 selects a set of questions that includes indirect questions about meal and correction bolus components. The bolus application 734 queries the host 701 with the selected indirect questions at 922. Indirect questions may not directly ask the host 701 to provide a bolus input parameter but may instead ask the host 701 for other information that can be used to derive bolus configuration parameters. Example indirect questions related to meal bolus components are provided below:
  Example Question 4: What is your typical lunch?
  Example Question 5: If your glucose is on target, how much insulin would you take for the typical lunch that you previously described?

From the answers to these questions, the bolus application 734 may be able to determine an ICR for the host 701. For example, the bolus application 734 may estimate a number of carbs (e.g., grams of carbohydrates) in the typical lunch. From the insulin that the host 701 takes, the bolus application 734 determines the ICR. For example, the ICR for the host 701 may be or be based on the estimated carbs for the meal multiplied by the indicated amount of insulin taken. In some examples, versions of the Example Questions 4 and 5 are asked for each meal of the day to determine meal-specific bolus configuration parameters.

Also, in some examples, the bolus application 734 requests information about different example meals in order to check the validity of the answers provided by the host 701. For example, the host 701 may be queried for information about multiple commonly-eaten lunches. If the ICR derived from the different lunches is the same or is within a threshold, the bolus application 734 may determine that the derived ICR is valid. (If the ICR from different example meals is different, but within a threshold, the bolus application 734, in some examples, uses a mean or other aggregation of the different ICRs.) If the ICRs determined from the different meals are sufficiently different from one another, the bolus application 734 may discard all of the determined ICRs as unreliable.

The bolus application 734 may determine whether ICRs derived different example meals are reliable in any suitable manner. For example, the bolus application 734 may receive and/or be programmed with a largest acceptable error threshold in the ICR. This may be, for example, a constant. An example constant largest acceptable error is when no ICR generated from an example meal is greater than 2 grams/Unit different than any other ICR. In some example, the largest acceptable error threshold is different for different age ranges. For example, 2 grams/Unit for hosts less than eight years old, 5 grams/Unit for hosts 9-18 years old, 10 grams/Unit for hosts over 18 years of age. In other example, the largest acceptable error threshold is a multiple of the ISF (e.g., between $\frac{1}{3}$ and $\frac{2}{3}$ of the ISF, about $\frac{1}{2}$ of the ISF).

Example indirect questions for determining bolus configuration parameters related to correction bolus components are given by the examples below:
  Example Question 6: How do you change your insulin dose at a meal when your sugar is 20 mg/dL above your target?
  Example Question 7: How do you change your insulin dose at a meal when your sugar is 50 mg/dL above your target?

The bolus application 734 may determine an ISF, for example, using the answers to questions similar to example Question 6 and example Question 7. In some examples, the bolus application 734 checks the determined ISF, for example, by comparing an ISF indicated by the answers to multiple questions similar to Example Questions 6 and 7. If the determined ISFs are within a threshold of one another, the bolus application 734 may use the determined ISF (or a mean or other aggregation of the similar ISFs) as the ISF bolus configuration parameter. If the ISFs determined based on different questions are sufficiently different from one another, the bolus application 734 may discard all of the determined ISFs as unreliable.

Upon asking indirect meal and glucose questions at 922, the bolus application 734 determines if it has successfully determined bolus configuration parameters to determine bolus doses of insulin for the host 701 at operation 926. If yes, then the bolus application 734 may determine bolus doses of insulin at operation 934. If not, the bolus application 734 may execute a model at operation 932, as described in more detail herein.

Referring back to 902, if the host 701 indicates that he or she determines boluses based only on the size of a bolus-associated meal, then the bolus application 734 may select a meal-only question set 906 and query the host 701 with one or more indirect meal size questions at 914. Indirect meal size questions may ask the host 701 to provide example meal descriptions and corresponding insulin doses, for example, similar to Examples Questions 4 and 5 above. At 928, the bolus application 734 determines if the answers to the indirect questions at 914 provided bolus configuration parameters sufficient to determine bolus doses of insulin for the host 701. If yes, then the bolus application 734 may determine bolus doses of insulin at operation 934. If not, the bolus application 734 may execute a model at operation 932, as described in more detail herein.

Again referring back to 902, if the host 701 indicates that he or she determines boluses based only on their glucose concentration, then the bolus application 734 may select a glucose only question set 908 and query the host 701, at operation 916 with one or more indirect glucose questions. Indirect glucose questions may ask the host 701 to provide example insulin boluses provided at different glucose concentrations and/or different deviations from a target glucose concentrations, such as Example Questions 6 and 7 above. At 930, the bolus application 734 determines if the answers to the indirect questions at 916 provided bolus configuration parameters sufficient to determine bolus doses of insulin for the host 701. If yes, then the bolus application 734 may determine bolus doses of insulin at operation 934. If not, the bolus application 734 may execute a model at operation 932, as described in more detail herein.

If at 902, the host 701 indicates that he or she uses a constant bolus dose that does not depend on meal size or blood glucose, in some examples, the bolus application 734 executes a model at 932 to generate bolus configuration parameters for the host 701. The model may be a trained model, which may be trained, for example, as described below in conjunction with FIG. 10. In other examples, the model may be a manually designed model, heuristic, or set of heuristics. For example, the bolus application 734 may apply a rule or set of rules to the answers received in the workflow 900.

Figure 10:
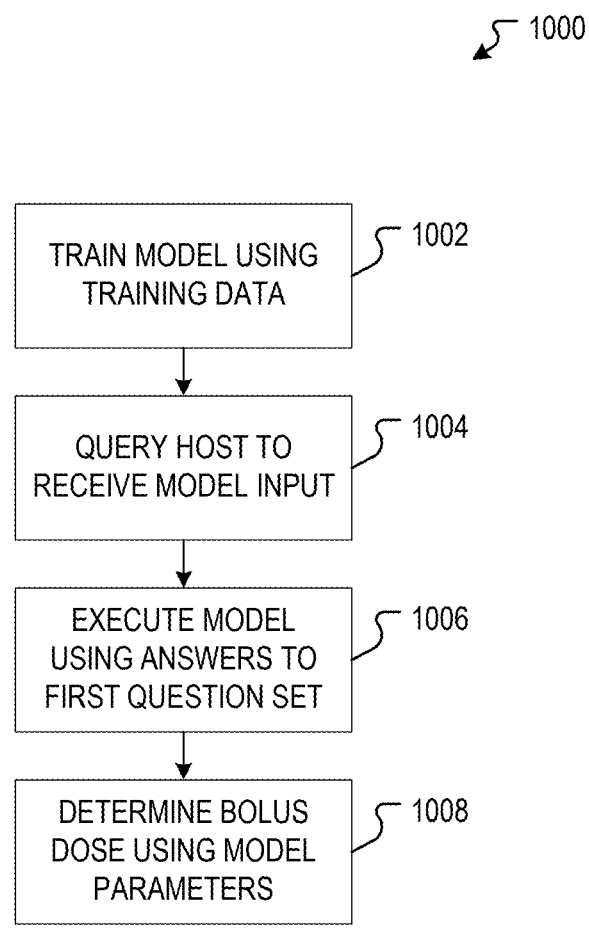
FIG. 10 is a flowchart showing an example of a process flow that may be executed by a bolus application to determine one or more bolus configuration parameters using a model.

FIG. 10 is a flowchart showing an example of a process flow 1000 that may be executed by the bolus application 734 to determine one or more bolus configuration parameters using a model. At operation 1002, the bolus application 734 trains a model using training data. Any suitable type of model may be trained including, for example, a regression model such as a linear regression model, a polynomial regression model, a logistic regression model, a quantile regression model, a support vector regression model, a regression tree model, a principle component regression model, etc. Training data may relate various host characteristics to different values for bolus configuration parameters. Training data may describe the host 701 and/or may describe multiple different hosts. In some examples, the operation 1002 is prior to other operations of the process flow 1000. For example, the model may be trained and the trained model stored at the computing device 702. In some examples, the model is trained at another computing device (e.g., at the server system 126) and provided to the computing device 702 that executes the bolus application 734.

At operation 1004, the bolus application 734 queries the host 701 using a question set that includes one or more questions to query model inputs. Any suitable model inputs may be queried including, for example, host body weight, host BMI, the host's type of diabetes diagnosis, other medications being taken by the host 701, etc. At operation 1006, the bolus application 734 executes the trained model using the received model inputs to generate one or more bolus configuration parameters. At operation 1008, the bolus application 734 determines a bolus insulin dose for the host 701 using the bolus configuration parameters determine at operation 1006.

In some examples, a bolus application is used to monitor and/or manage bolus doses for a host in addition to or instead of determining the bolus doses themselves. The bolus application may be configured to determine the effect of a bolus, such as, for example, a glucose concentration correction, a meal size (e.g., number of carbs) covered by the bolus, etc. This effect data can be displayed to the host or other user. The host or other user can use the bolus effect data as a check. For example, if the host intends the bolus dose to cover for a particular meal, he or she would expect the bolus effect data to match the meal. Similarly, if the host intends the bolus dose to provide a given glucose concentration correct, he or she would expect the displayed bolus effect data to match the desired correction.

Although the techniques for determining bolus configuration parameters are described with respect to FIGS. 7-10 in the context of determining bolus doses for the host, some or all of the examples herein can be used with respect to basal doses. For example, bolus and basal doses may be determined together in a single calculation, such that the bolus configuration parameters described herein are used to calculate a combined basal/bolus insulin dose that includes both bolus and basal components. Also, in some examples, some or all of the bolus configuration parameters described herein are relevant to determining basal doses for the host. Accordingly, the bolus application 1134 (or another suitable application) may determine bolus configuration parameters as described herein and use the bolus configuration parameters, at least in part, to determine a basal dose of insulin.

Figure 11:
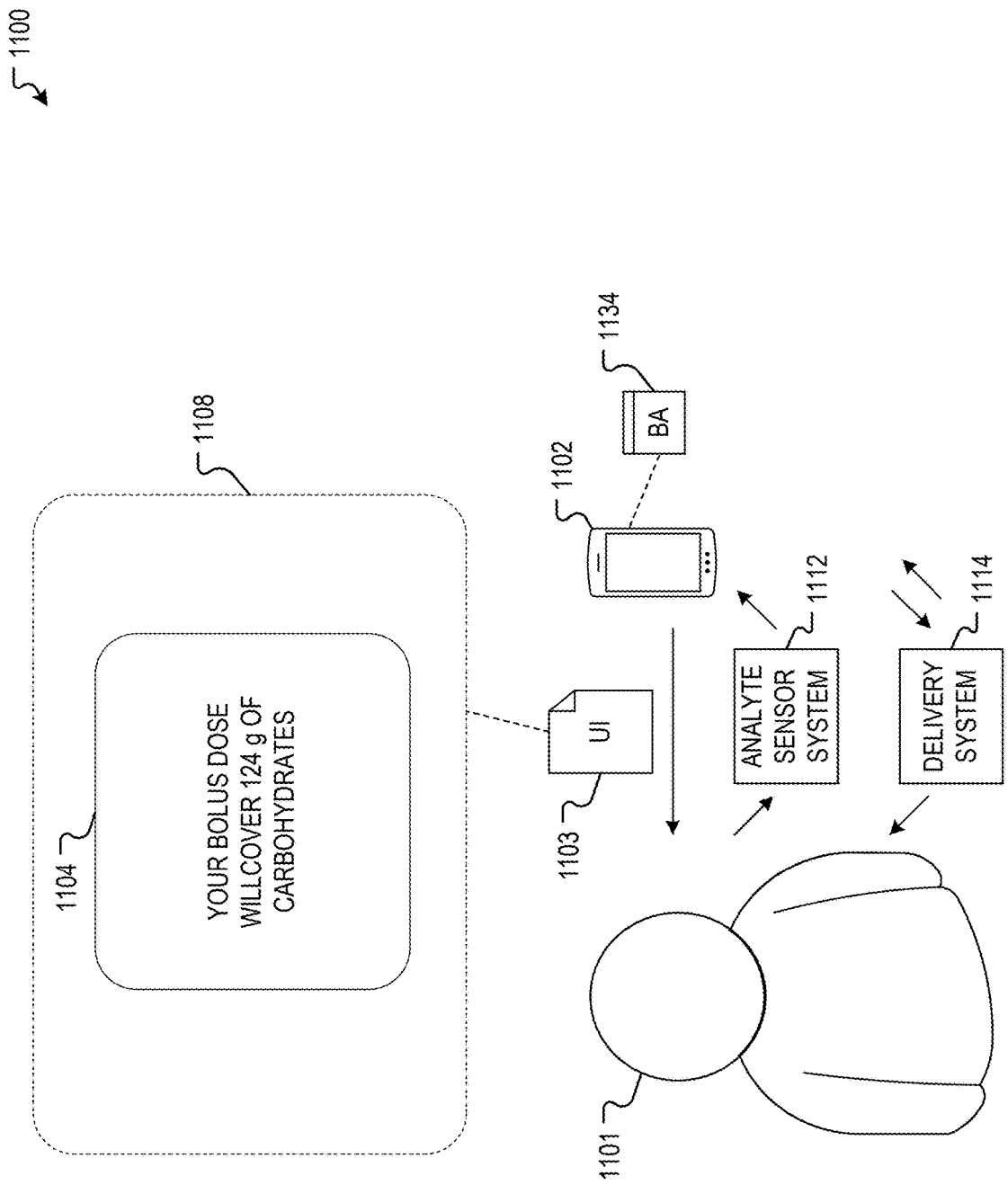
FIG. 11 is a diagram showing an example of an environment including that demonstrates the use of a bolus application to determine and utilize bolus effect data.

FIG. 11 is a diagram showing an example of an environment 1100 that demonstrates the use of a bolus application 1134 to determine and utilize bolus effect data. In this example, the host 1101 utilizes a computing device 1102 to execute the bolus application 1134. The computing device 1102 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 1102 may include and/or be in communication with an analyte sensor system 1112 and a delivery system 1114. The analyte sensor system 1112, similar to the analyte sensor system 102, may detect an analyte at the host 1101, such as a glucose concentration of the host 1101. The delivery system 1114 is configured to deliver a bolus dose to the host 1101. For example, the delivery system 1114 can be or include an insulin pen, an insulin pump, or other suitable delivery system. The bolus application 1134 generates a bolus application user interface 1103 that is provided to the host 1101. The bolus application user interface 1103 may include visual and/or audible elements to provide information to the host 1101 and/or to receive information from the host 1101.

In the arrangement of FIG. 11, the bolus application 1134 is configured to generate bolus effect data describing a bolus dose that has been or is to be administered to the host 1101. The bolus effect data may include, for example, a glucose concentration correction associated with the bolus dose, a carbohydrate coverage associated with the bolus dose, etc. FIG. 11 shows an example screen 1104 of the bolus application user interface 1103 providing example bolus effect information. In this example, the displayed bolus effect information indicates that a planned or recently-administered bolus dose will cover 124 grams of carbohydrates.

Figure 12:
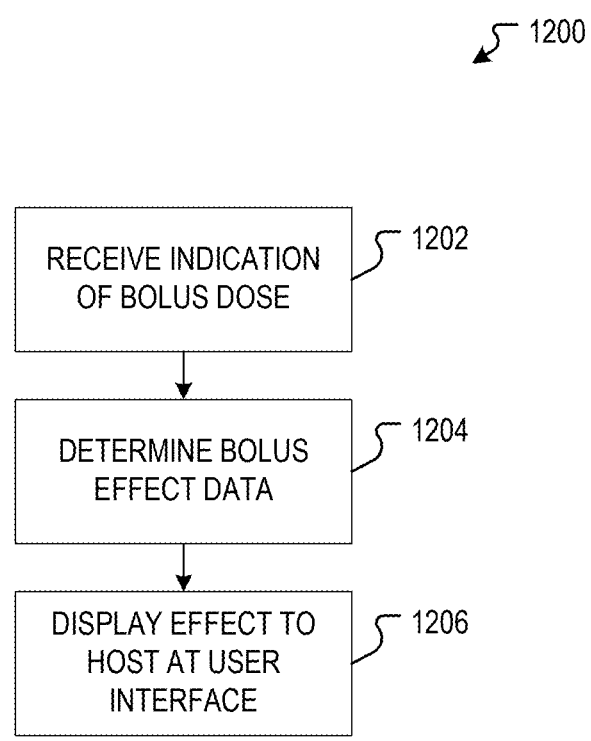
FIG. 12 is flowchart showing an example of a process flow that can be executed by a bolus application to determine and display bolus effect data.

FIG. 12 is flowchart showing an example of a process flow 1200 that can be executed by the bolus application 1134 to determine and display bolus effect data. At operation 1202, the bolus application 1134 receives an indication of a bolus dose. The indication of the bolus dose can be received in any suitable manner. In some examples, the indication of the bolus dose is received from the delivery system 1114. Consider an example in which the delivery system 1114 is or includes an insulin pen, such as the smart pen 116 of FIG. 1. The host 1101 may configure the insulin pen to provide a desired bolus dose. The insulin pen provides the bolus application 1134, via the computing device 1102, with an indication of the bolus dose. The insulin pen may provide the indication of the bolus dose before or after the bolus dose is administered to the host 1101. Consider another example in which the delivery system 1114 is or includes an insulin pump. The insulin pump may similarly provide the bolus application 1134 with an indication of a bolus dose that is to be delivered or has been delivered. In some examples, described in more detail herein, the bolus application 1134 is configured to detect the bolus using data received from the analyte sensor system 1112. Examples for detecting a bolus dose and/or data about a bolus dose are described herein, for example, with respect to FIGS. 20-22.

At operation 1204, the bolus application 1134 determines bolus effect data. Bolus effect data can be determined in various different ways. Examples for determining bolus effect data are provided herein with respect to FIGS. 13-15. The bolus application 1134 displays the bolus effect data at the bolus application user interface 1103 at operation 1206.

Figure 13:
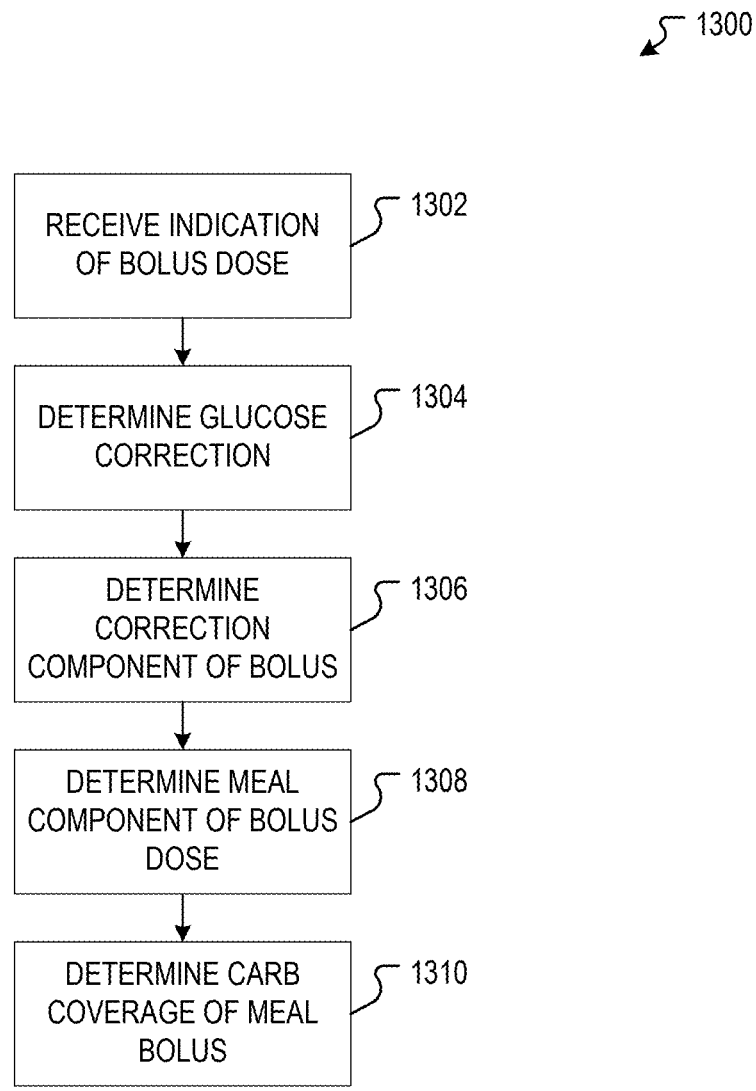
FIG. 13 is a flowchart showing an example of a process flow that may be executed by a bolus application to determine bolus effect data for a bolus dose.

FIG. 13 is a flowchart showing an example of a process flow 1300 that may be executed by the bolus application 1134 to determine bolus effect data for a bolus dose. In the example of FIG. 13, the bolus application 1134 receives an indication of a bolus dose at operation 1302, for example, as described herein.

At operation 1304, the bolus application 1134 determines a glucose correction associated with the bolus dose. The glucose correction can be determined in any suitable manner. In some examples, the bolus application 1134 receives glucose concentration data from the analyte sensor system 1112, where the glucose concentration data indicates a glucose concentration for the host 1101. The bolus application 1134 may determine a glucose correction by comparing the glucose concentration to a target glucose concentration ($GC_T$) for the host 1101. For example, if the glucose concentration of the host 1101 is 130 mg/dL and the target glucose concentration is 100 mg/dL, then the glucose correction would be 30 mg/dL. In some examples, the glucose correction is permitted to be negative. For example, if the host's current glucose concentration is below the target glucose concentration, then the glucose concentration is negative.

At operation 1306, the bolus application 1134 determines a correction component of the bolus dose. In some examples, this includes using a formula that relates glucose correction and a corresponding correction component, such as Equation [1] above. In this example, the glucose correction determined at operation 1304 may be equivalent to $GC_M$-$GC_T$. If the glucose correction was negative, the correction component may also be negative. A negative correction component may be considered when determining the meal component, as described herein below. In some examples, a negative correction component is not shown to the host 1101 via the bolus application user interface 1103.

At operation 1308, the bolus application 1134 determines a meal component of the bolus dose using the correction component determined at operation 1306. The meal component may be the total bolus dose minus the correction component. In examples where the correction component is negative, the meal component is larger than the total bolus dose. At operation 1310, the bolus application 1134 determines a carbohydrate coverage of the meal bolus. This can be determined using a formula that relates meal components to carbohydrates (e.g., grams of carbohydrates).

Figure 14:
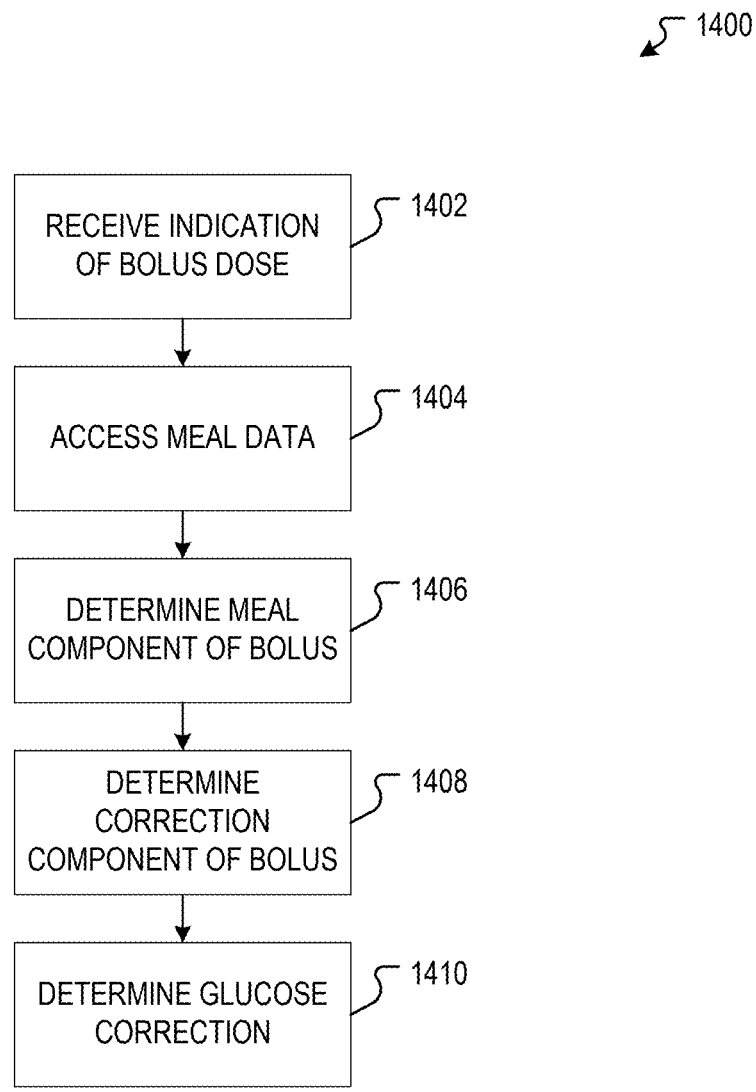
FIG. 14 is a flowchart showing an example of a process flow that may be executed by a bolus application to determine bolus effect data for a bolus dose.

FIG. 14 is a flowchart showing an example of a process flow 1400 that may be executed by the bolus application 1134 to determine bolus effect data for a bolus dose. At operation 1402, the bolus application 1134 receives an indication of a bolus dose, for example, as described herein.

At operation 1404, the bolus application 1134 accesses meal data. The meal data can be received and/or determined in any suitable manner. In some examples, the meal data is received from the host 1101. For example, the host 1101 may provide meal, such as a carbohydrate count for the meal. The host 1101 may enter the meal data via the bolus application user interface 1103. In other examples, the bolus application 1134 receives an image of the meal. The image may be captured using a camera or other suitable image sensor of the computing device 1102. In some examples, the delivery system 1114 comprises an insulin pen that includes an image sensor. The host 1101 uses the insulin pen to capture the image of the meal, which is sent from the delivery system 1114 to the computing device 1102. The bolus application 1134 analyzes the image to determine data about the meal, such as, for example, an estimated carb count for the meal (e.g., the grams of carbohydrates in the meal).

Any suitable technique may be used to determine an estimated carb count, or other data about a meal, from the image of the meal. For example, the bolus application 1134 (or other suitable application in communication with the bolus application 1134) may execute an image recognition and/or classification algorithm to identify one or more food items depicted in the image. The bolus application 1134 or other suitable application may estimate a quantity of one or more of the food items, for example, from a size of the food item depiction (e.g., relative to the size of other object depictions in the image). The bolus application 1134 or other suitable application may access a database indicating the nutritional content of the detected food items, for example, at the detected quantity.

At operation 1406, the bolus application 1134 determines a meal component of the bolus dose. For example, the bolus application 1134 determines the amount of insulin that would cover the meal described by the meal data in any suitable manner, including as described herein. In some examples, the bolus application 1134 utilizes a formula, such as that of Equation [2] above.

In some examples, the bolus application determines the meal component of the bolus dose utilizing a physiological model of the host 1101. For example, the bolus application 1134 may train the physiological model using previous glucose concentration data describing the host 1101 and previous meal data describing one or more meals consumed by the host 1101 at the time that the previous glucose concentration data was collected. Other training data that may be used by the bolus application 1134 to train the physiological model can include, bolus dose data indicating historical bolus doses received by the host as well other data describing the host 1101 such as blood parameters, anthropometric (e.g., body size) values, types of gut microbiota at the host, etc.

At operation 1408, the bolus application 1134 determines a correction component of the bolus dose. The correction component may be the amount of the bolus dose minus the meal component. Consider an example in which the bolus dose is 8 units and the meal component is 6 units. In this case, the correction component would be 2 units. In examples in which the meal component is equal to the bolus dose, the correction component is zero. Also, in examples in which the meal component is greater than the bolus dose, the correction component is negative.

At operation 1410, the bolus application 1134 determines a glucose correction for the bolus dose. The glucose correction is a reduction to the glucose concentration of the host 1101 that will result from the bolus dose. The glucose correction can be determined utilizing a formulation, such as that of Equation [1] above, or in any other suitable manner. In examples where the correction component is negative, the glucose correction may indicate that the host's glucose concentration will go up after the bolus dose instead of going down.

In some examples, the process flows 1300 and/or 1400 can be executed while also considering basal insulin at the host. For example, the bolus application 1134 may receive basal dose data describing one or more basal doses received by the host. The bolus application 1134 may modify, for example, the meal component and/or the correction component of the determined bolus effect data considering the basal dose data.

Figure 15:
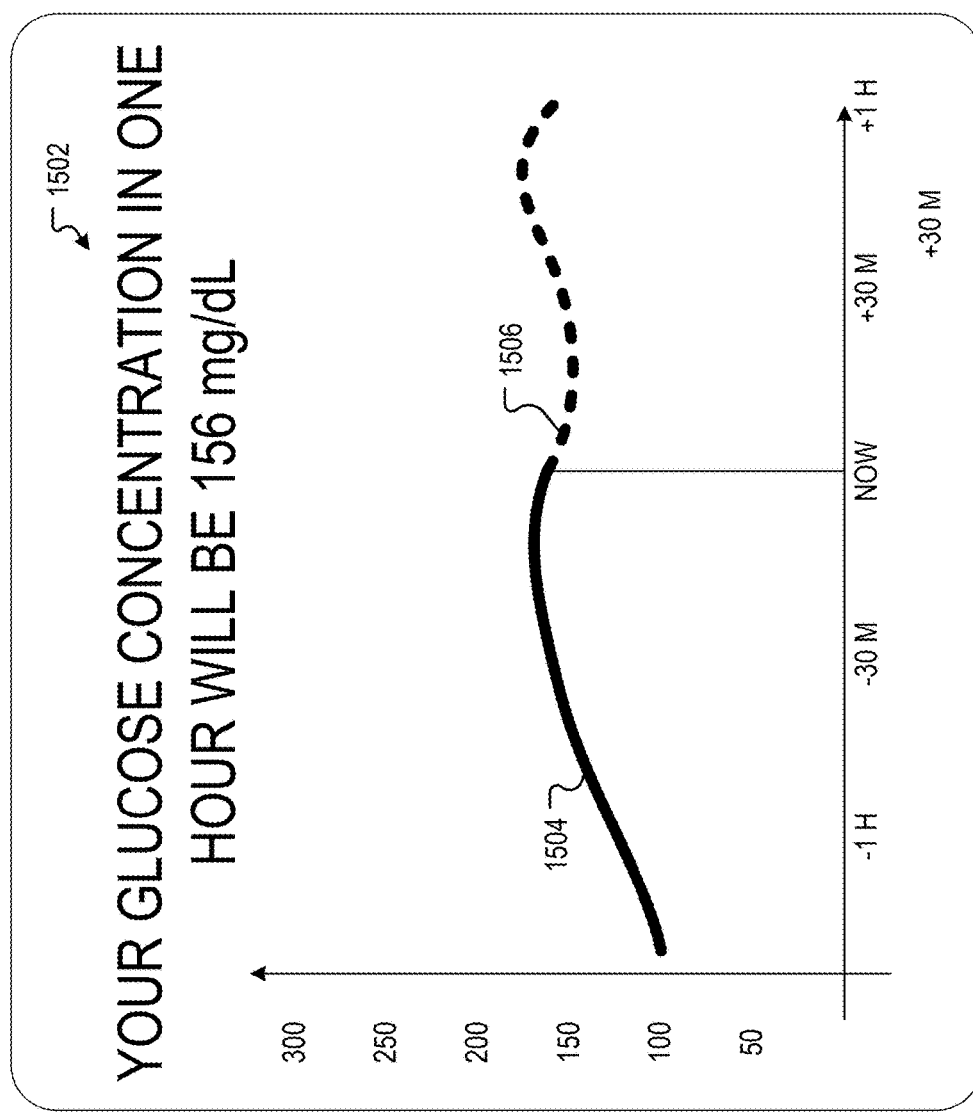
FIG. 15 is a diagram showing an example screen of the bolus application user interface showing bolus effect data.

FIG. 15 is a diagram showing an example screen 1500 of the bolus application user interface 1103 showing bolus effect data. In the example of FIG. 15, the bolus application 1134 is configured to determine bolus effect data including an estimated future glucose value and an estimated glucose trace. The estimated future glucose value is determined in any suitable manner. In some examples, the bolus application 1134 determines the estimated future glucose value by considering a meal component and a correction component for the bolus dose and the host's current glucose concentration, provided by the analyte sensor system 1112. For example, the bolus application 1134 may project the estimated future glucose value as the current glucose concentration minus the correction component. The screen 1500 includes an indication 1502 of an estimated future glucose value, where the example indication 1502 is a text statement of the estimated future glucose value. In this example, the indication 1502 also indicates a time of the estimated future glucose value (e.g., 1 hour from the present). This time can be determined, for example, based on the insulin action time of the bolus dose and/or an estimate of how long it will take the host 1101 to eat the meal.

In some examples, the bolus application 1134 determines an estimated future glucose trace. The estimated future glucose trace can be determined, for example, based on the insulin action time of the bolus dose and/or an estimate of how long it will take the host 1101 to eat the meal. In the example of FIG. 15, an actual glucose concentration trace 1504 indicates historical (e.g., previously-measured) glucose concentrations for the host 1101 and an estimated future glucose concentration trace 1506, shown as a dashed line.

In some examples a bolus application uses a case-based reasoning technique to determine one or more bolus doses for a host. A case-based reasoning technique, such as the Advanced Bolus Calculator for Diabetes or ABC4D method by the Imperial College of London, determines bolus configuration parameters for a bolus dose by comparing a host's current circumstances, referred to as case parameters, to a set of stored cases, where the stored cases describe previously-administered bolus doses. The stored cases include parameter data describing the circumstances of the previously-administered bolus doses, therapy data describing the bolus dose that was previously-administered, and outcome data describing the circumstances of the host after the previously-administered bolus dose.

According to a case-based reasoning approach, the host provides current case parameter data indicating parameters of the desired bolus dose. The current case parameters can include data about the host's glucose concentration, other data about the host, and (if the bolus includes a meal component) data about a meal associated with the bolus dose. The data about the host's glucose concentration can be determined using an analyte sensor system as described herein and may include a current glucose concentration as well as previous glucose concentrations (e.g., glucose concentration from the previous 30 minutes, from the previous hour, etc.). Other data about the host can include any other physiological descriptor of the host that may affect the host's physiological response to insulin including, for example, data about recent exercise, data about recent alcohol consumption, data about the host's menstrual cycle, etc. Data about the associated meal can include, for example, a carb content of the meal (e.g., in grams of carbohydrates), as well as other nutritional information about the meal including the content of non-carb nutritional elements such as protein, fat, salt, etc.

The current case parameter data is compared to parameter data for the stored cases to select a closest previous case is selected. For example, a Manhattan distance, a weighted arithmetic mean, a Euclidean distance, Mahalanobis distance, a variation of dynamic time warping distance or other suitable method to determine a difference between the current case parameter data and the case parameter data of the stored cases. The calculated bolus is, in some examples, selected to match treatment data from the closest previous case. When the bolus dose is administered, the host may be monitored to generate outcome data for the current case. The current case, including the case parameters, therapy data, and outcome, can then be stored as a new stored case.

Although case-based reasoning can provide positive results, there remain challenges. For example, because case-based reasoning relies on stored cases, its accuracy and sometimes even operability depend on having a large and diverse set of stored cases. Further, the physiology of different hosts causes different hosts to react differently to different physiological or contextual factors, such as stress, alcohol, and exercise. Accordingly, it may be desirable to generate stored cases from one host. As a result, case-based reasoning approaches may generate inferior results or even fail altogether until a large and diverse set of stored cases is generated. Further, even with a large set of stored cases, case-based reasoning techniques may suffer in performance or even fail if a host encounters a new or unusual case that does not neatly match a stored case.

Another challenge associated with case-based reasoning is that it is often desirable for stored cases to include outcome data indicating the host's glucose concentration and/or other factors over an extended period of time, often a number of hours. In practice, however, it is common for the host to eat a meal and/or receive a subsequent bolus dose within a few hours of a previous bolus dose. When such an intervening event occurs, it may spoil outcome data for the previous bolus dose, preventing the previous bolus dose from forming the basis of new stored case. This can make the process of generating a large and diverse set of stored cases longer and more difficult.

Figure 16:
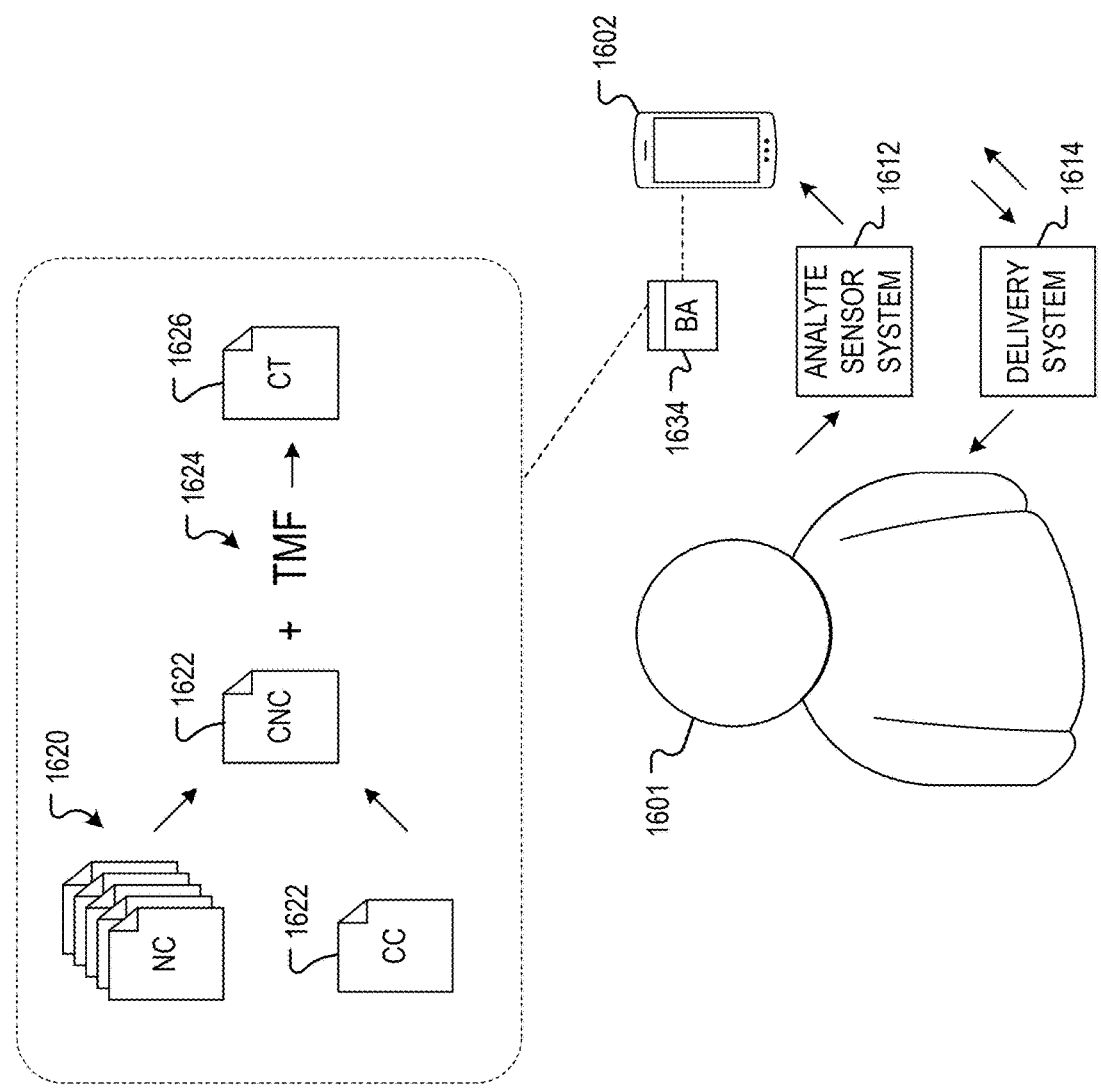
FIG. 16 is a is a diagram showing an example of an environment that demonstrates the use of a bolus application to apply an example case-based reasoning technique.

FIG. 16 is a is a diagram showing an example of an environment 1600 that demonstrates the use of a bolus application 1634 to apply an example case-based reasoning technique. In the example of FIG. 16, the bolus application 1634 is programmed to modify bolus configuration parameters of a closest nominal case to generate a bolus dose for a host 1601.

In this example, the host 1601 utilizes a computing device 1602 to execute the bolus application 1634. The computing device 1602 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 1602 may include and/or be in communication with an analyte sensor system 1612 and a delivery system 1614. The analyte sensor system 1612, similar to the analyte sensor system 102, may detect an analyte at the host 1601, such as a glucose concentration of the host 1601. The delivery system 1614 is configured to deliver a bolus dose to the host 1601. For example, the delivery system 1614 can be or include an insulin pen, an insulin pump, or other suitable delivery system.

In the example of FIG. 16, the bolus application 1634 accesses current case parameter data 1622. The current case parameter data 1622 can include data describing the host 1601 and, optionally, data about a meal associated with a requested bolus. The data about the host 1601 can include current and/or historical glucose data received from the analyte sensor system 1612. Data about the host 1601 can also include, for example, a physiological descriptor such as data about recent exercise, data about recent alcohol consumption, data about the host's menstrual cycle, etc. Other data about the host 1601 can include data about the host's body weight, age, height, body mass index (BMI), etc. Data about the associated meal can include, for example, a carb content of the meal (e.g., in grams of carbohydrates) and may also include other nutritional information about the meal.

The bolus application 1634 compares the current case parameter data 1622 to a set of nominal cases 1620. This can include, for example, finding a closest nominal case 1622, where the closest nominal case 1622 is the nominal case 1622 with nominal case parameter data having a shortest distance to or a smallest difference from the current case parameter data 1622. The distance or difference between the current case parameter data 1622 and the closest nominal case 1622 parameter data can be found using any suitable method including, for example, a Manhattan distance, a weighted arithmetic mean, a Euclidean distance, Mahalanobis distance, a variation of dynamic time warping distance, etc.

The bolus application 1634 may also generate a therapy modification factor 1624 based on the distance or difference between the current case parameter data and the parameter data of the closest nominal case. The therapy modification factor 1624 includes a modification or modifications to be applied to the therapy data of the closest nominal case 1622. For example, therapy data of the closest nominal case can include various bolus configuration parameters, such as ISF, ICR, etc. The therapy modification factor 1624 includes data describing how to modify one or more of the bolus configuration parameters. For example, the therapy modification factor 1624 can include one or more multipliers to be applied to the respective bolus configuration parameters of the closest nominal case 1622. The bolus application 1634 applies the therapy modification factor to the bolus configuration parameters of the closest nominal case to determine therapy data for the current case 1626. The therapy data for the current case 1626 can be used to generate a bolus dose for the host 1601. The generated bolus dose can be provided to the host via a user interface of the computing device 1602. In some examples, the generated bolus dose is provided directly to the delivery system 1614, which provides the bolus dose to the host 1601.

Figure 17:
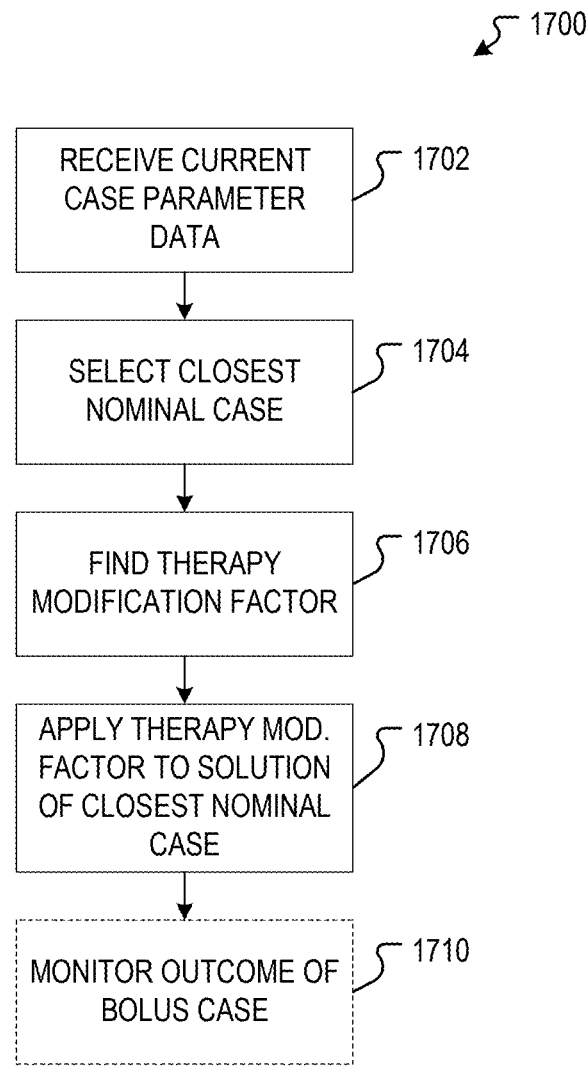
FIG. 17 is a flowchart showing an example of a process flow that can be executed by a bolus application to determine a bolus dose for a host.

FIG. 17 is a flowchart showing an example of a process flow 1700 that can be executed by the bolus application 1634 to determine a bolus dose for the host 1601. At operation 1702, the bolus application 1634 receives current case parameter data. As described herein, this can include current and/or previous glucose concentration data received from the analyte sensor system 1612 as well as information about the host 1601 including data indicating recent exercise, recent alcohol consumption, etc. In some examples, the bolus application accesses data describing the host 1601 that may have previously been received and stored such as, for example, body weight, BMI, menstrual cycle status, etc. Also, in some examples, the bolus application 1634 is configured to receive an image of meal to be associated with the bolus and derive nutritional information about the meal from the image. The image may be captured, for example, using a camera or other image sensor at the delivery system 1614.

At operation 1704, the bolus application 1634 selects the closest nominal case. This can include comparing the current case parameter data to the case parameter data of one or more nominal cases describing bolus doses previously-administered to the host 1601. The closest nominal case may be the nominal case having case parameter data that has the smallest difference to the current case parameter data. The difference can be measured in any suitable manner including, for example, as a Manhattan distance, a weighted arithmetic mean, a Euclidean distance, Mahalanobis distance, a variation of dynamic time warping distance, etc.

At operation 1706, the bolus application 1634 determines a therapy modification factor. The therapy modification factor is to be applied to therapy data of the closest nominal case to generate current case therapy data. In some examples, the therapy modification factor is generated utilizing a Bayesian inference technique. In other examples, the bolus application 1634 trains a model, such as a regression-type model, to relate therapy data, including bolus configuration parameters, from the closest nominal case to corresponding therapy data of the current case At operation 1708, the bolus application 1634 applies the therapy modification factor determined at operation 1706 to the therapy data of the closest nominal case to determine therapy data for the current case. In some examples, the therapy modification factor comprises a multiplier or set of multipliers to be applied to bolus configuration data included with the closest nominal case therapy data. Accordingly, generating the therapy data for the current case can include applying multipliers to bolus configuration data of the nominal case therapy data, such as an ISF, ICR, etc. The bolus application 1634 can apply the current case therapy data to determine a current case bolus dose, for example, as described herein including with respect to Equations [1] and [2]. The current case bolus dose can be displayed to the host 1601, for example, at a screen of the computing device 1602. In other examples, the bolus application 1634 can provide the current case therapy data to the delivery system 1614 to configure the delivery system 1614 to provide a bolus dose to the host 1601.

At optional operation 1710, the bolus application 1634 monitors the outcome of the current bolus case. This can include, for example, receiving additional glucose concentration data from the analyte sensor system 1612 after the current case bolus dose has been applied. The monitored outcome data can be used, in some examples, to generate a new nominal case that can be added to the set of nominal cases for future bolus determinations. Also, in some examples, the monitored outcome data can be used to change the therapy modification factor and/or change the way that the therapy modification factor is generated. For example, when the therapy modification factor is determined using a machine learning model, the monitored outcome data may be used as or to supplement training data for re-training the model.

It will be appreciated that generating current case therapy data in this manner may reduce the dependence of the technique on a large and diverse set of stored cases. For example, the process flow 1700 may provide suitably accurate results even when there are larger differences between the current case and the closest stored or nominal case.

Figure 18:
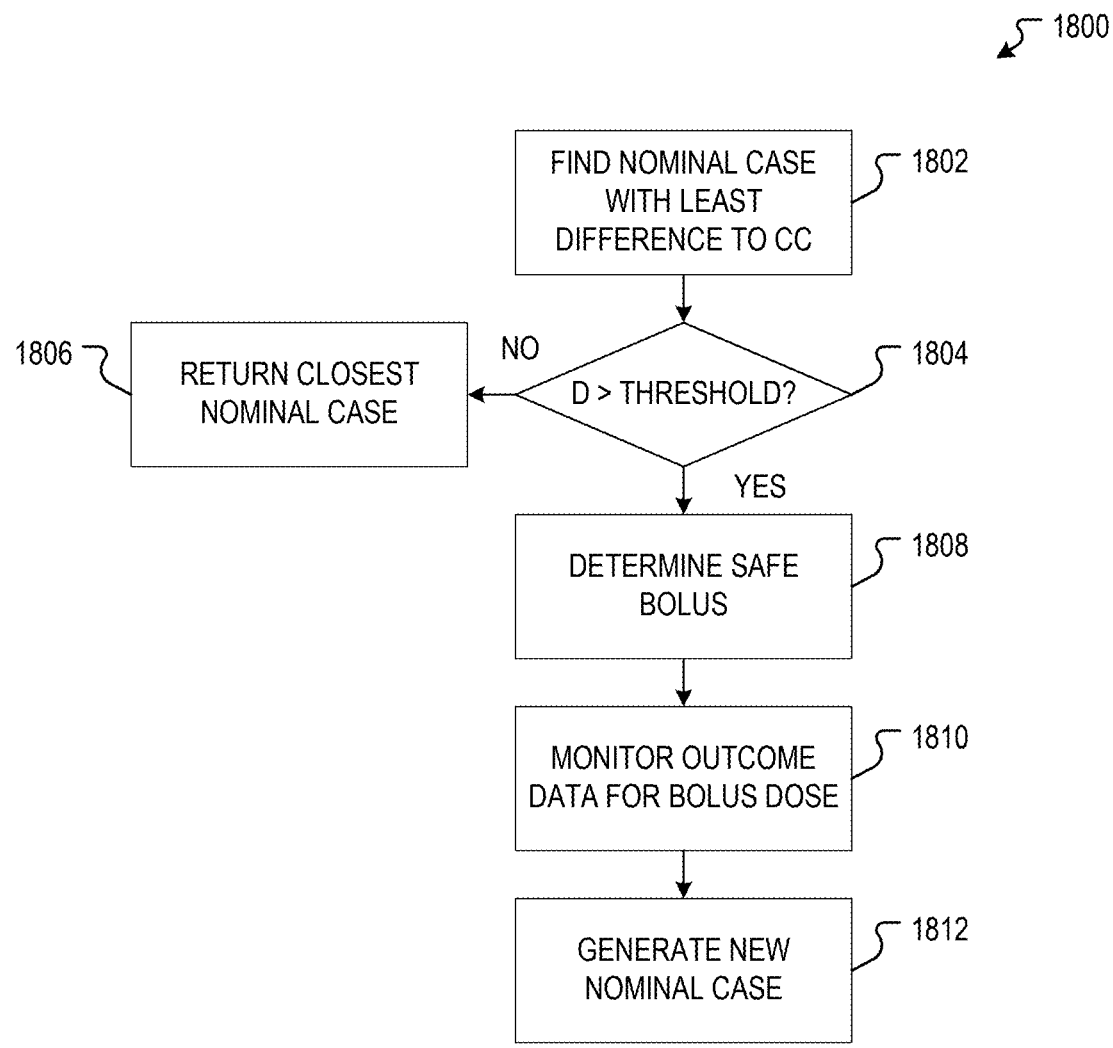
FIG. 18 is a flowchart showing an example of a process flow that may be executed by the bolus application when the difference between the current case and the closest nominal case is too large to allow a suitably accurate bolus dose to be determined.

FIG. 18 is a flowchart showing an example of a process flow 1800 that may be executed by the bolus application 1634 when the difference between the current case and the closest nominal case is too large to allow a suitably accurate bolus dose to be determined. For example, the process flow 1800 shows an example way that the bolus application 1634 can execute the operation 1704 of the process flow 1700.

At operation 1802, the bolus application 1634 determines the nominal case with the least difference relative to the current case. This can be determined, for example, as described herein. At operation 1804, the bolus application 1634 determines if the difference between the current case and the closest nominal case is greater than a threshold. If not, then the bolus application 1634 returns the determined closest nominal case and may proceed as described at operations 1706, 1708, etc. of the process flow 1700.

If the difference between the current case and the closest nominal case is greater than the threshold, it may indicate that a suitable therapy modification factor may not be developed. At operation 1808, the bolus application 1634 determines a safe bolus dose for the host 1601 by applying an alternate bolus method. The alternate bolus method can include, for example, applying the therapy data of the closest nominal case and then reducing the determined bolus dose by a safety factor (e.g., 10%, 20%, etc.). In this way, the bolus application 1634 determines a bolus dose that, if it is in error will tend to cause the host's glucose concentration to rise rather than fall. This is because although high glucose concentration can cause long-term health issues, the ill effects of low glucose concentration are more immediately severe. In some examples, the alternate bolus method can include using any other bolus technique described herein including, for example, the techniques described herein with respect to Equations [1] and [2]. In some examples, the safe bolus dose is provided to the host 1601 via the computing device 1602 and/or provided to the delivery system 1614 to cause the bolus dose to be delivered to the host 1601.

At operation 1810, the bolus application 1634 monitors outcome data for the bolus dose determined at operation 1808, for example, as described herein. At operation 1812, the bolus application 1634 uses the current case parameter data, the outcome data. Therapy data for the new nominal case can be based on the bolus configuration parameters used to determine the safe bolus at operation 1808. For example, if the monitored data indicates an acceptable outcome, the bolus configuration parameters that would generate the same safe bolus may be accessed or determined and stored as the therapy data of the new nominal case. If the monitored data indicates an unacceptable outcome, the bolus application 1634 modifies the bolus configuration parameters used to generate the safe bolus.

As described above, one challenge of implementing case-based reasoning in bolus calculation is that intervening events can prevent new stored cases from being developed. For example, referring to FIG. 18, if an intervening event (e.g., a new meal or bolus dose) occurs during the monitoring at operation 1810, the bolus application 1634 may not be able to obtain a full set of outcome data.

Figure 19:
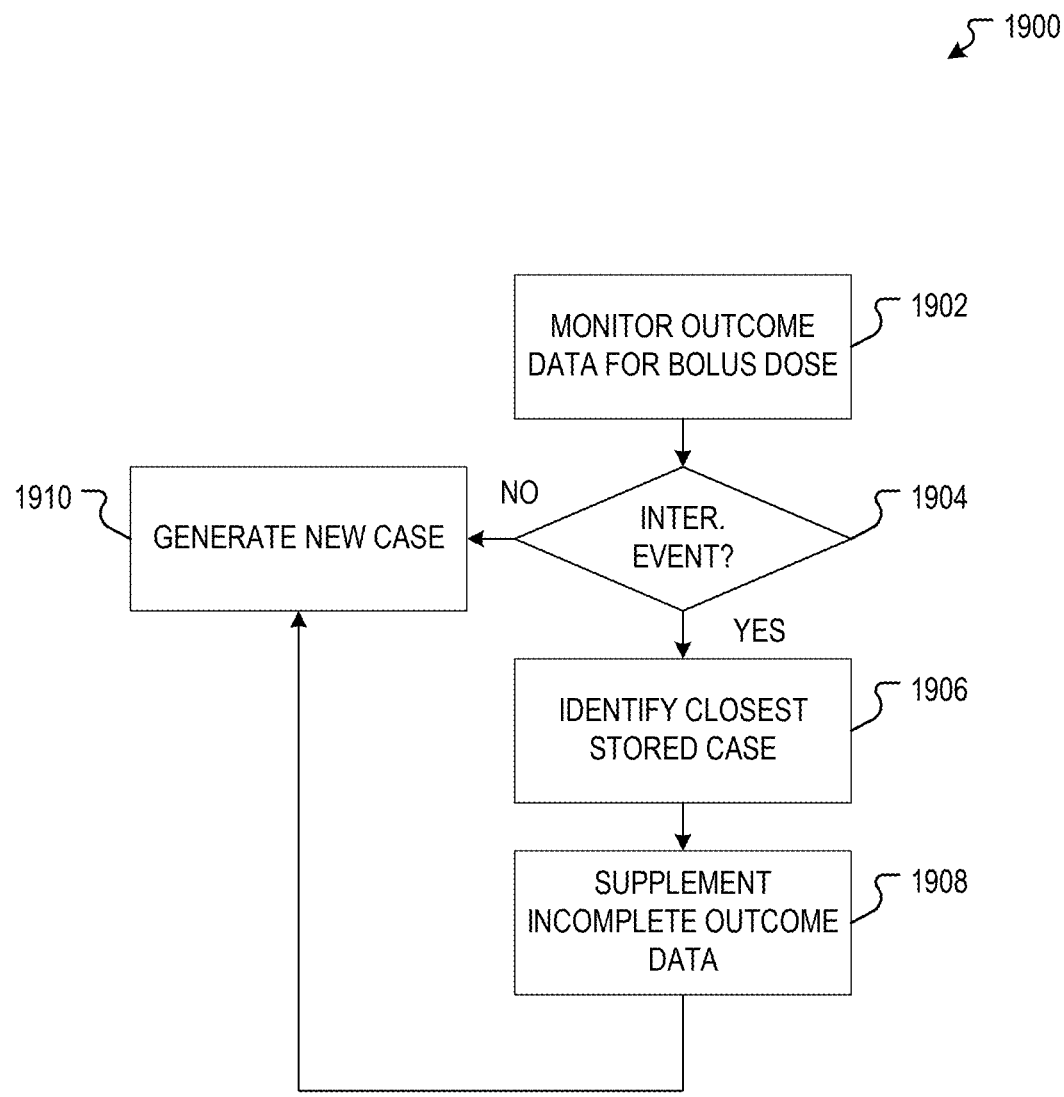
FIG. 19 is a flowchart showing an example of a process flow that may be executed by the bolus application when an intervening event occurs during the monitoring of outcome data for a potential new nominal or stored case.

FIG. 19 is a flowchart showing an example of a process flow 1900 that may be executed by the bolus application 1634 when an intervening event occurs during the monitoring of outcome data for a potential new nominal or stored case. The process flow 1900 may be executed in a case-based technique as described with respect to FIGS. 16 and 17 where a therapy modification factor is used to modify the therapy data of a nominal case to more closely match a current case. The process flow 1900 may also, in some examples, be utilizes in other case-based reasoning techniques in which therapy data for the closest stored case is not modified.

At operation 1902, the bolus application 1634 monitors outcome data for a potential new stored case. The potential new stored case can be a nominal case for use in arrangements similar to those described herein at FIGS. 16-18 and/or a new stored case for other implementations of case-based bolus techniques. At operation 1904, the bolus application 1634 determines if an intervening event occurs before sufficient outcome data is collected. An intervening event may occur, for example, if the host 1601 receives a subsequent bolus dose (e.g., a correction bolus dose and/or a follow-on meal bolus dose). If no intervening event occurs, the bolus application 1634 generates a new stored case at operation 1910, for example, as described herein.

If an intervening event does occur at operation 1904, the bolus application 1634 identifies a closest stored case. The closest stored case is a stored case that is closest to the potential new stored case. The closest stored case can be found by comparing the potential new stored case to the previously-stored cases, for example, as described herein. In some examples, the closest stored case is determined using case parameter data, case therapy data and the incomplete case outcome data (e.g., incomplete due to the intervening event). For example, the closest can ca be determined considering case definition data such as the glucose level and trend at the time of the meal, meal size, IOB at the time of the meal. Also, in some examples, glucose level data can be used to determine the closest stored case, where the considered glucose level data is limited to data that is available both for the currently considered case and in the stored cases. For example, if current glucose level data is similar to a stored case up until the point of the intervening event, data gap, or data artifact, the stored case may be considered close. In some examples, distance techniques that may be used to identify the closest stored cases considering an intervening event include a Manhattan distance, a weighted arithmetic mean, a Euclidean distance, Mahalanobis distance, a variation of dynamic time warping distance, etc.

At operation 1908, the bolus application 1634 uses the closest stored case to supplement the incomplete outcome data of the potential new stored case. In some examples, this includes copying outcome data from the closest stored case to the potential new stored case. For example, if the intervening event occurred one hour after the bolus dose of the potential new stored case and the total monitoring period for a new stored case is two hours, outcome data from the closest stored case starting at one hour after the bolus dose through two hours after the bolus dose may be added to the outcome data for the potentially new stored case captured before the intervening event. This may result in a full set of outcome data for the potential new stored case, which can then be used as a stored case.

In some examples, outcome data from the closest stored case is modified before being added to outcome data for the potential new stored case. For example, the outcome data may be scaled, smoothed, and/or otherwise modified to more closely match the potential new stored case. For example, the bolus application 1634 may utilize interpolation to fill gaps in data between the closest stored case and the potential new stored case. Also, in some examples, the bolus application 1634 may remove continuous glucose sensor artifacts (e.g., resulting from erroneous glucose readings).

In some examples, the techniques and apparatuses described herein with respect to FIGS. 16-19 may consider one or more basal doses for the host. For example, information about one or more recent basal doses may be part of the parameter data describing one or more cases. Also, in some examples, therapy data associated with a case may prescribe a change to a basal dose for the host.

In some examples, a bolus application can be programmed to analyze glucose concentration data in view of bolus doses to determine a recommended action for the host, also referred to herein as a host action. For example, the bolus application can be programmed to use glucose concentration data and bolus dose data to predict a hypoglycemic or hyperglycemic episode in the host. When this occurs, the bolus application can be programmed to recommend a host action for treating the episode (e.g., a correction bolus to treat a hyperglycemic episode or a snack to treat a hypoglycemic episode). In some examples, the bolus application is programmed to use the glucose concentration data and bolus dose data to determine optimizations to the host's bolus configuration parameters and/or optimizations to the host's basal doses. Also, in some examples, the bolus application is programmed to provide a graphical user interface to the host that includes a trace of the host's glucose concentration and an indication of when meal bolus doses and/or correction bolus doses were received.

In many of these examples, however, it is desirable for the bolus application to determine when a bolus dose is administered and to discriminate between meal boluses, correction boluses, and mixed meal and correction boluses. For example, if the bolus application is to recommend a change to the bolus configuration parameters used by the host at lunch, it is desirable for the bolus application to identify the meal or mixed bolus dose received by the host at lunch time and correlate the bolus dose to glucose concentration data. Whether a change in glucose concentration indicates an oncoming hyperglycemic or hypoglycemic episode is dependent on whether the glucose concentration change occurs near in time to a bolus dose.

When the bolus application calculates a bolus dose for the host, for example, as described herein, the bolus application may have apriori information about the bolus doses that are administered to the host including, an approximate time of the bolus dose, a type of the bolus dose, etc. When the host does not use the bolus application to calculate bolus doses, however, the bolus application may lack this a priori knowledge of bolus doses. This may limit the ability and/or effectiveness of the bolus application in determining host actions or providing graphical user interfaces, as described herein.

Figure 20:
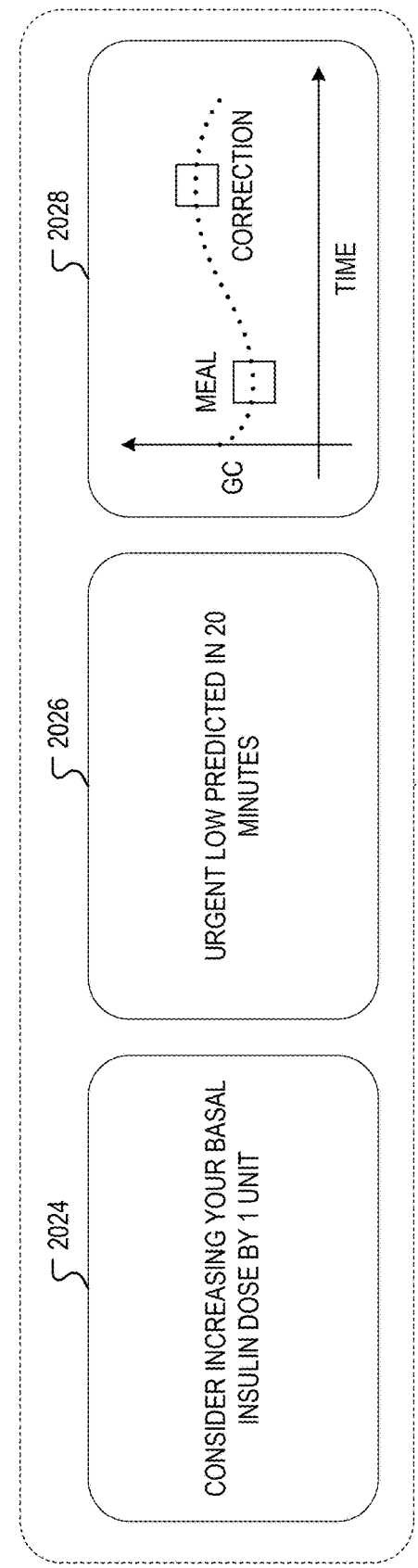
FIG. 20 is a diagram showing an example of an environment that demonstrates the use of a bolus application to execute a classification model for classifying bolus doses.
Figure 20:
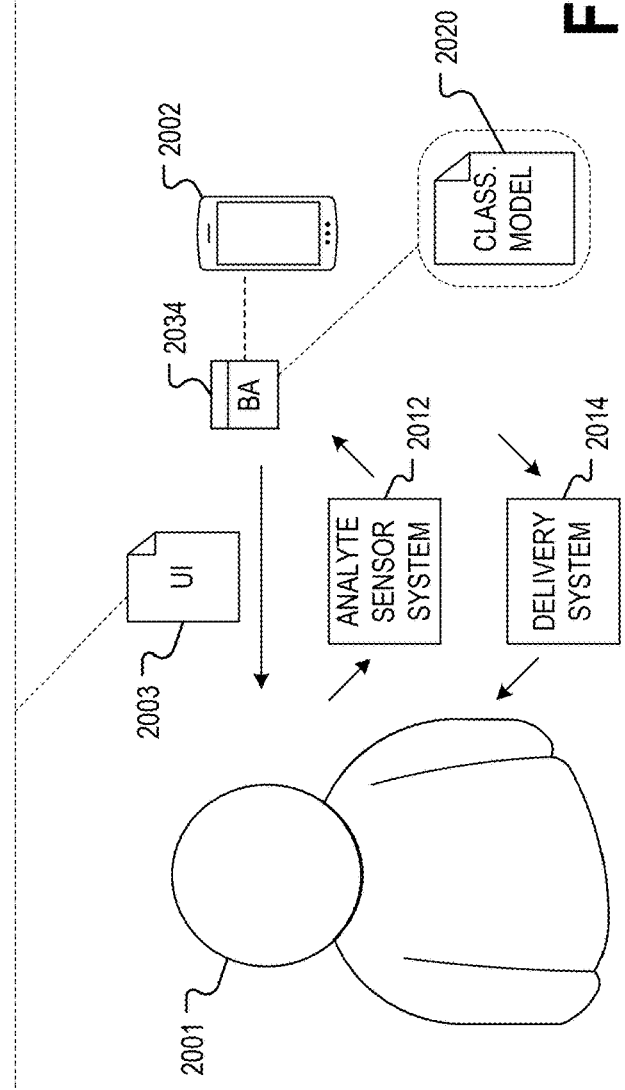

Various examples address these and other issues by implementing a classification model to derive bolus dose data, for example, from glucose concentration data. FIG. 20 is a diagram showing an example of an environment 2000 that demonstrates the use of a bolus application 2034 to execute a classification model 2020 for classifying bolus doses. In this example, the host 2001 utilizes a computing device 2002 to execute the bolus application 2034. The computing device 2002 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 2002 may include and/or be in communication with an analyte sensor system 2012 and a delivery system 2014. The analyte sensor system 2012, similar to the analyte sensor system 102, may detect an analyte at the host 2001, such as a glucose concentration of the host 2001. The delivery system 2014 is configured to deliver a bolus dose to the host 2001. For example, the delivery system 2014 can be or include an insulin pen, an insulin pump, or other suitable delivery system. The bolus application 2034 generates a bolus application user interface 2003 that is provided to the host 2001. The bolus application user interface 2003 may include visual and/or audible elements to provide information to the host 2001 and/or to receive information from the host 2001.

In the arrangement of FIG. 20, the bolus application 2034 receives glucose concentration data from the analyte sensor system 2012 and uses the glucose concentration data to implement a classification model 2020. The classification model can be trained to classify bolus doses as, for example, meal boluses, correction boluses, or mixed meal and correction boluses. In some examples, the bolus application 2034 receives an indication that a bolus dose has been administered to the host 2001. For example, the delivery system 2014 may provide an indication that a bolus dose has been administered and, in some examples, may indicate a size of the bolus dose. Also, in some examples, the host 2001 may indicate to the bolus application 2034 that a bolus dose has been administered and, optionally, the size of the bolus dose. In other examples, the bolus application 2034 detects the bolus dose without receiving any indication of the bolus dose from the host 2001 or delivery system 2014.

The classification model 2020 can be any suitable type of machine learning model that is configured to provide a classification of things or events. For example, the classification model may be or include a linear classifier model such as a logistic regression model or naive Bayes classifier, a nearest neighbor model, a support vector machine (SVM) model, a decision tree model, a boosted tree model, a random forest model, a neural network model, etc. In some examples, the classification model 2020 is a logistic regression model with an L2 penalty.

Glucose concentration data describing glucose concentration at the host 2001 can be input to the classification model 2020. The glucose concentration data can be received directly from the analyte sensor system 2012 and/or can be derived therefrom. Example glucose concentration data can include a rate-of-change of the host's glucose concentration at various intervals before and/or after the bolus dose including, for example, 120 minutes prior to the bolus dose, 60 minutes prior to the bolus dose, 30 minutes prior to the bolus dose, at the time of the bolus dose, 30 minutes after the bolus dose, 60 minutes after the bolus dose, 90 minutes after the bolus dose, etc.

Other inputs to the classification model 2020 can include data about the current and/or historic bolus doses for the host 2001 including, for example, a size of the bolus dose divided by the glucose concentration at that time, a size of the bolus dose divided by the minimum bolus dose over a recent time period (e.g., the previous 14 days), the size of the bolus dose divided by the maximum insulin taken over a recent time period (e.g., the previous 7 days), the size of the bolus dose minus the average or mean bolus dose over a recent time period (e.g., the previous 7 days), and/or a difference between the glucose concentration at the bolus dose and an average or median glucose concentration over a recent time period (e.g., the previous 24 hours, the previous 72 hours, the previous 3 days, etc.). In some examples, the difference is a signed distance may have a positive or negative sign indicating direction relative to the median glucose concentration. For example, if the sign of the distance is positive, the glucose concentration at the time of the bolus dose is above the average or median glucose concentration and the bolus dose is more likely to be a correction dose. In some examples, the larger the positive difference between the glucose concentration and the average or median glucose concentration, the more likely it is that the bolus dose is a correction bolus dose. Also, in some examples, the time period over which the average or median glucose concentration is taken may be tuned.

Another example of a classification model 2020 input is a 2 coefficient polynomial quadratic that is fit to a period (e.g., 30 minutes) of glucose concentration data around the time of the bolus dose.

The output of the classification model 2020 is an indication of a bolus category, which may be correction bolus or meal bolus. In some examples, the classification model 2020 is trained to also indicate a mixed bolus category for bolus doses that include both a meal component and a correction component. In other examples, the model 2020 is trained to classify mixed bolus doses generally as meal boluses.

The bolus application 2034 is programmed to determine a host action based on the category of one or more bolus doses, as indicated by the classification model 2020. In some examples, the bolus application 2034 is programmed to determine a recommended change to insulin dosing (e.g., basal dosing and/or bolus dosing) for the host 2001. For example, if the host's meal bolus doses are consistently causing the host's glucose concentration to fall below a target glucose concentration, the bolus application 2034 may recommend that the host 2001 modify a bolus configuration parameter such as, for example, decreasing an ICR used to generate bolus doses. In another example, if the host's glucose concentration is consistently above or below a target glucose concentration before meal bolus or mixed bolus doses are administered, the bolus application 2034 may be programmed to recommend that the host 2001 modify a basal dose. If the host 2001 receives insulin via multiple daily injections, this can include increasing or decreasing a periodic basal dose. If the host 2001 receives insulin from an insulin pump, this can include modifying the basal delivery profile of the insulin pump. FIG. 20 shows an example screen 2024 of the bolus application user interface 2003 that includes a prompt to the host 2001 to take a host action that involves changing an insulin dosing configuration parameter. In this example, the recommended host action is to increase the host's basal dose by one unit.

In some examples, the bolus application 2034 is programmed to predict hyperglycemic or hypoglycemic episodes using one or more bolus dose categories determined using the classification model 2020. For example, if the host 2001 has received a correction bolus, but the host's glucose concentration continues to rise after the correction bolus (e.g., one hour after the correction bolus), the bolus application 2034 may detect a current or predicted hyperglycemic episode and instruct the host 2001 to take a host action to treat the hyperglycemic episode. Similarly, if the host 2001 has received a meal bolus, but the host's glucose concentration declines after the meal bolus (e.g., one hour after the meal bolus), then the bolus application 2034 may detect a hypoglycemic episode. The bolus application 2034 may instruct the host 2001 to treat the hypoglycemic episode. FIG. 20 shows an example screen 2026 of the bolus application user interface 2003 that may be displayed to the host 2001 to instruct the host 2001 to treat a predicted hypoglycemic episode.

The bolus application 2034 is also programmed, in some examples, to provide the host 2001 with a graphical user interface indicating different categories of bolus doses in conjunction with glucose concentration data. For example, FIG. 20 also includes an examples screen 2028 of the bolus application user interface 2003 that includes a trace of glucose concentration for the host 2001. In the screen 2028, glucose concentration is indicated on the vertical axis and time is indicated on the horizontal axis. As shown, an example meal bolus ("MEAL") and an example correction bolus ("CORRECTION") are indicated on the trace at the times when the respective bolus doses were administered.

Figure 21:
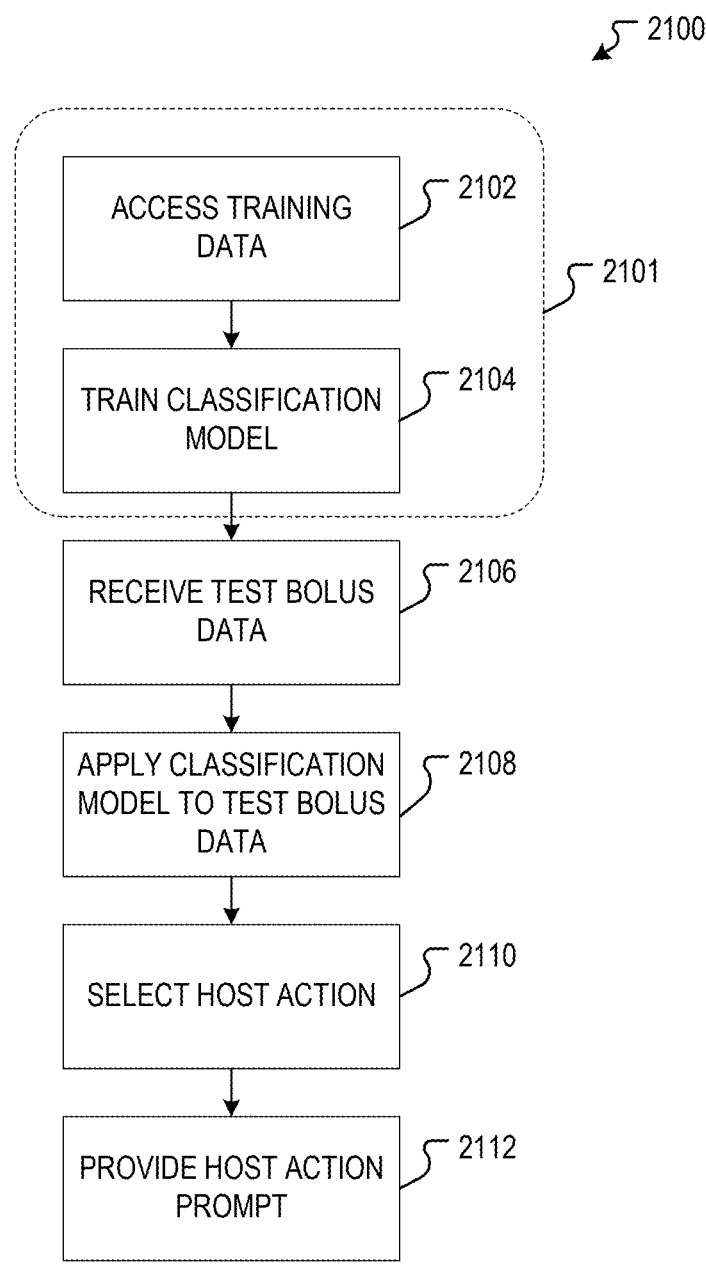
FIG. 21 is a flowchart showing an example of a process flow that may be executed by the bolus application to utilize a classification model to determine bolus dose categories.

FIG. 21 is a flowchart showing an example of a process flow 2100 that may be executed by the bolus application 2034 to utilize the classification model 2020 to determine bolus dose categories. At operation 2102, the bolus application 2034 accesses training data. Training data is data that includes at least glucose concentration data that is labeled to indicate whether the data corresponds to a bolus dose, when the bolus dose was administered, and, in some examples, what category of bolus dose was administered. In some examples, the training data also includes basal dose information describing one or more basal doses received by the host or other subject of the training data. Training data may describe the host 2001 only or, in some examples, can be gathered from other subjects (e.g., different hosts). At operation 2104, the training data is used to train the classification model. The classification model 2020 may be trained in any suitable manner.

The operations 2102 and 2104 (shown in box 2101) can be performed, in some examples, at the same computing device 2002 that executes the classification model 2020, for example, by performing the remainder of the process flow 2100. In some examples, however, the operations 2102 and 2104 in the box 2101 can be performed by a different computing device. For example, the training of the classification model 2020 (e.g. operations of 2101) may be performed at a server system 126. The trained model may be provided to the computing device 2002 (e.g., a medical device 108, the user computing device 132, the tablet computing device 114, the smart pen 116, the smart device 112, the medical device 122, and/or the computing device 118), which may utilize the trained classification model 2020 as described herein.

At operation 2106, the bolus application 2034 receives test bolus data. Test bolus data includes, at least glucose concentration data describing the glucose concentration of the host 2001 at and/or around a time that the host 2001 receives a bolus dose. The test bolus data, in some examples, also includes data indicating when the host 2001 received the bolus dose and/or, in some examples, a size of the bolus dose (e.g., a number of units of insulin delivered). The test bolus data may also include information about one or more basal doses received by the host 2001. In some examples, the bolus application 2034 is configured to determine when a bolus dose was administered from the glucose concentration data. For example, the bolus application 2034 may detect that a bolus dose was administered based on a rate-of-change (first time derivative) and/or change in the rate-of-change (second time derivative) of the glucose concentration data.

At operation 2108, the bolus application 2034 applies the classification model to the test bolus data to determine a category of the test bolus. This can include, for example, providing the test bolus data to the classification model 2020 as input and receiving from the classification model 2020 an output that indicates the category of the test bolus. In some examples in which the classification model 2020 is or includes a logistic regression model with an L2 penalty, the classification model 2020 is arranged such than a model output above 0.5 corresponds to a correction bolus and any other model output corresponds to a meal bolus. At operation 2110, the bolus application 2034 selects a host action based on the category of the bolus dose determined at operation 2108. At operation 2112, the bolus application 2034 provides the host 2001 with a prompt for the host action determined at 2110. Examples for determining host actions and providing corresponding prompts are described herein, for example, with respect to FIG. 20.

Figure 22:
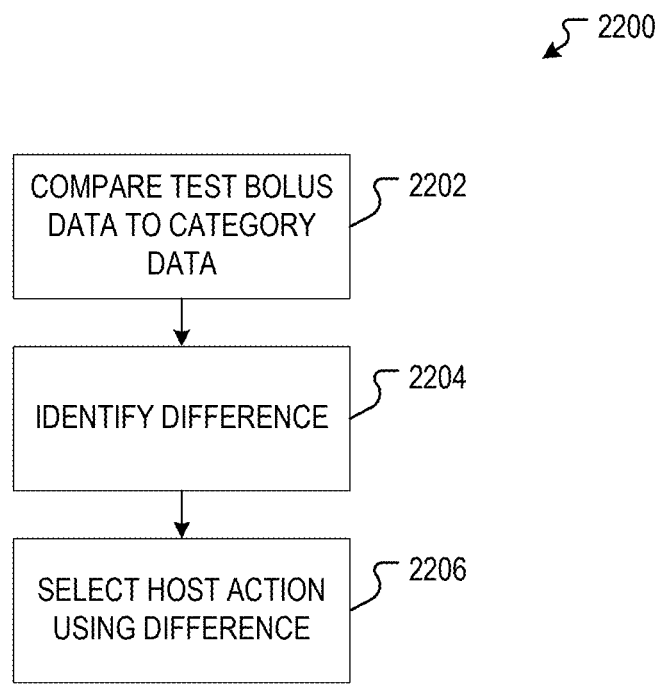
FIG. 22 is a flowchart showing an example of a process flow that may be executed by a bolus application to determine a recommended host action based on the category of a test bolus determined using a classification model.

FIG. 22 is a flowchart showing an example of a process flow 2200 that may be executed by the bolus application 2034 to determine a recommended host action based on the category of a test bolus determined using the classification model 2020. At operation 2202, the bolus application 2034 compares test bolus data to category data. Test bolus data includes data describing the test bolus and, in some examples, includes some or all of the data provided as input to the classification model 2020. Category data includes data describing the host 2001 in response to other bolus doses in the same category as the test bolus.

At operation 2204, the bolus application 2034 identifies a difference between test bolus data and the category data. For example, the bolus application 2034 may determine that the host's glucose concentration has risen or risen at a higher rate than is typical after boluses of the same category. In another example, the bolus application 2034 may determine that the host's glucose concentration has fallen after a meal bolus when the host's glucose concentration typically rises (at least temporarily) after a meal bolus. At operation 2206, the bolus application 2034 selects a host action based on the difference identified at operation 2204. For example, if the host's glucose concentration is rising at a higher rate than is typical for boluses of the same category, the bolus application 2034 may recommend a change to a bolus or basal configuration parameter that tends to reduce glucose concentration and/or recommend action to treat a hyperglycemic episode. In another example, if the host's glucose concentration is lower or dropping at a greater rate than is typical for boluses of the same category, the bolus application 2034 may recommend a change to a bolus or basal configuration parameter that tends to increase glucose concentration and/or recommend action to treat a hypoglycemic episode.

An example bolus configuration parameter that may be modified by a bolus application based on the category of one or more bolus doses is an insulin-on-board (IOB) parameter. IOB is an amount of active insulin that is in a host's body at the time that a bolus dose is received. When a host receives a bolus dose with IOB present, it is desirable to reduce the amount of the bolus dose to account for the IOB. For example, a bolus dose is often determined based on the host's current glucose concentration. When IOB is present, however, the IOB may tend to reduce the host's current glucose concentration. Accordingly, it is desirable for a bolus dose based on the host's current glucose concentration to be reduced to account for the reduction in the current glucose concentration that will be caused by the IOB.

IOB can be accounted for by considering an IOB component when determining a bolus. The IOB component may be based on a model of the insulin action (e.g., pharmacodynamics or pharmacokinetics), where the model of insulin action describes one or more previously-administered insulin doses (e.g., bolus doses, basal doses, and/or combined basal/bolus doses). Insulin Action Time (IAT) may be a parameter of the model. The IAT is the amount of time that insulin from a previous dose remains active in the body. In practice, insulin action may not be constant over the IAT. For example, after the host receives an insulin dose, the host's body may metabolize the received insulin and glucose in the host's blood quickly at first, with the metabolization rate slowing down over time. An IOB component may be based on a model of insulin action over the IAT. Such a model use a suitable curve to represent the drop-off of IOB over time, such as, for example, a linear curve, a cumulative lognormal curve, a linear corrected lognormal curve, etc. In some examples, an IOB component is considered for (e.g., subtracted from) both a meal component (if any) and a correction component (if any). In some examples, an IOB component is considered for (e.g., subtracted from) a correction component but not considered for a meal component.

Correctly modeling IOB to generate an IOB component, however, can be challenging. Different hosts process insulin and glucose in different ways. Further, the way that even the same host processes insulin and glucose can change over time and/or with varying conditions. Various example arrangements address this and other issues by determining IOB parameter corrections using glucose concentration data and bolus data indicating one or more bolus doses received by a host.

Figure 23:
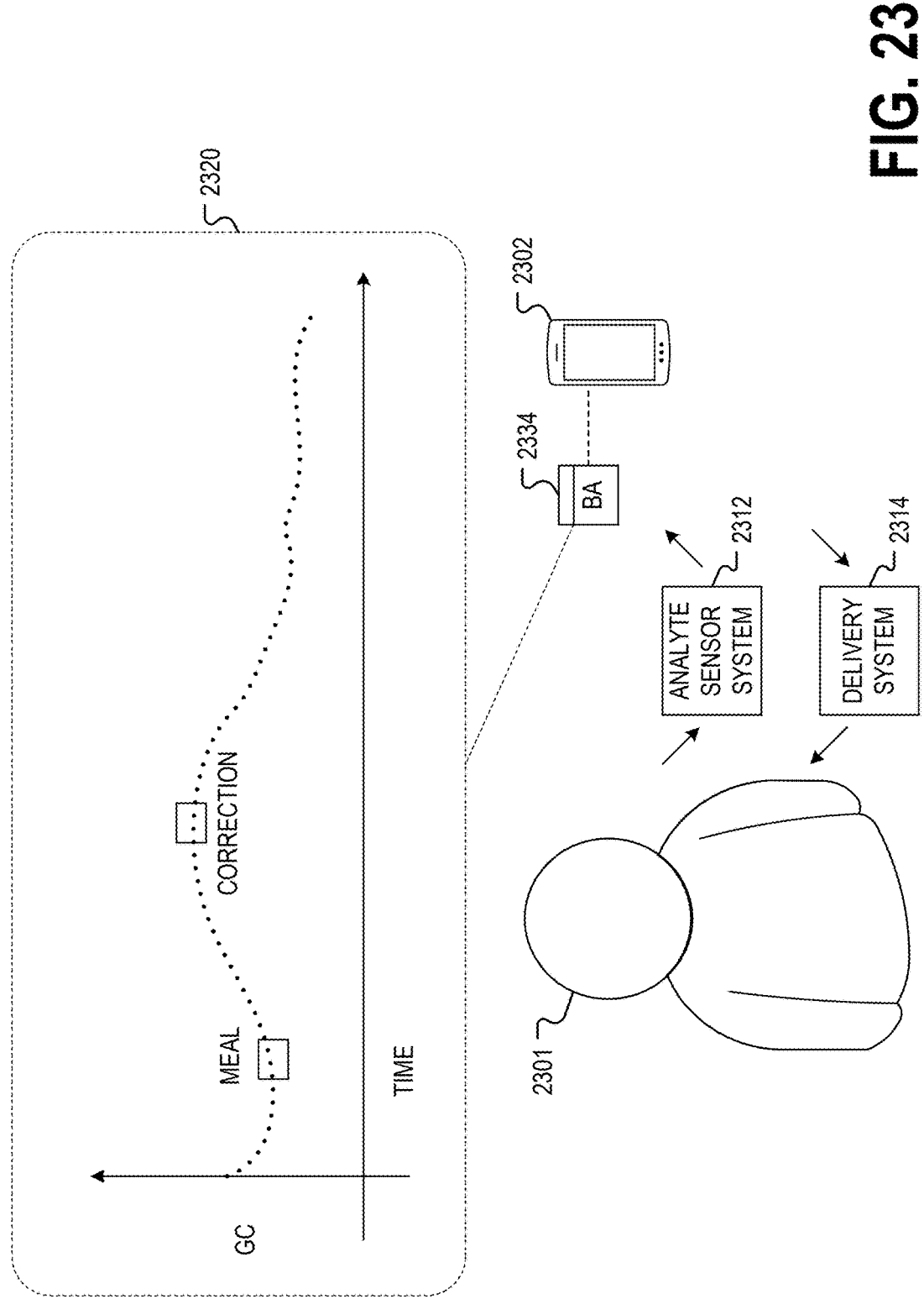
FIG. 23 is a is a diagram showing an example of an environment that demonstrates the use of a bolus application to modify an insulin-on-board (IOB) parameter.

FIG. 23 is a is a diagram showing an example of an environment 2300 that demonstrates the use of a bolus application 2334 to modify an insulin-on-board (IOB) parameter. In this example, the host 2301 utilizes a computing device 2302 to execute the bolus application 2334. The computing device 2302 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 2302 may include and/or be in communication with an analyte sensor system 2312 and a delivery system 2314. The analyte sensor system 2312, similar to the analyte sensor system 102, may detect an analyte at the host 2301, such as a glucose concentration of the host 2301. The delivery system 2314 is configured to deliver a bolus dose to the host 2301. For example, the delivery system 2314 can be or include an insulin pen, an insulin pump, or other suitable delivery system.

In the example of FIG. 23, the bolus application 2334 determines a recommended change to an IOB parameter for the host 2301 using insulin dose data and glucose concentration data. An IOB parameter is a parameter that is used to determine an IOB component of a bolus dose. For example, an IOB parameter may include, a type of model of insulin action, a parameter of an insulin action model, such as shape or offset features of a curve modeling insulin action, etc. Glucose concentration data describes the host's glucose concentration and can be received from the analyte sensor system 2312, as described herein. The insulin dose data can include bolus data and/or basal data. Bolus data describes one or more bolus doses received by the host 2301 while basal data describes one or more basal doses received by the host 2301. For example, bolus data may indicate a time when the host 2301 received a bolus dose, a type of bolus dose (e.g., correction, meal, mixed), and/or a size of the bolus dose (e.g., in units of insulin).

The bolus application 2334 may receive and/or access insulin dose data in any suitable manner. In some examples, the bolus application 2334 receives and/or derives insulin dose data from a priori knowledge. For example, if the bolus application 2334 determines a bolus and/or basal dose for the host 2301, the bolus application 2334 may store insulin dose data describing the determined bolus dose. In some examples, the bolus application 2334 receives insulin dose data from the delivery system 2314. For example, the delivery system 2314 may provide the bolus application 2334 with data describing bolus doses delivered to the host 2301 by the delivery system 2314. In other examples, the bolus application 2334 derives some or all of the insulin dose data, from other data, such as glucose concentration data. For example, as described herein, the bolus application 2334 may detect a bolus from glucose concentration data and may classify a bolus as described herein.

In some examples, the bolus application 2334 considers bolus data describing JOB-affected bolus doses. An JOB-affected bolus dose is a bolus dose that was affected by IOB, for example, from a previously-received bolus dose and/or basal dose. The bolus application 2334 can identify JOB-affected bolus doses by detecting bolus doses that are received within a threshold time of another bolus dose. The threshold time may be dependent on the insulin action time (IAT). For example, a bolus dose that is received more than a threshold time after the previous bolus (e.g., one hour or more, three hours or more, etc.) may not have considered or require any consideration of IOB because IOB may not have been present and, as such, may not be considered by the bolus application 2334 in determining a recommended change to an IOB parameter. Accordingly, when the bolus application 2334 considers bolus data, it may identify and utilize bolus data describing bolus doses that are within a threshold time of previous bolus doses such that the considered correction bolus doses include an IOB component.

In some examples, the bolus application 2334 determines a recommended change to an IOB parameter considering correction bolus doses. A correction bolus, as described herein, is a bolus dose that is provided to correct for deviations between the host's current glucose concentration and a target glucose concentration. Correction boluses are commonly received after a meal, for example, if the host 2301 failed to receive a meal bolus dose and/or if the host's blood sugar rose unexpectedly after a meal bolus. Accordingly, correction boluses are commonly JOB-affected. Accordingly, in some examples, the bolus application 2334 determines a recommended change to an IOB parameter considering correction bolus doses selected from the bolus data. In some examples, the bolus application 2334 determines a recommended change to an IOB parameter considering JOB-affected correction bolus doses, for example, by identifying correction boluses received by the host 2301 within the threshold of a previous bolus dose.

FIG. 23 includes a graphical representation 2320 of insulin dose data and glucose concentration data illustrating how the bolus application 2334 may determine a recommended change to an IOB parameter. The graphical representation 2320 is provided as an illustration. In some examples, the graphical representation 2320 is shown to the host 2301 via a bolus application user interface. In other examples, the bolus application 2334 utilizes bolus data and glucose concentration data similar to that depicted by the representation 2320 numerically (e.g., without rending such a graphical representation).

In the graphical representation 2320, time is indicated by the horizontal axis and glucose concentration is indicated by the vertical axis. The dotted line indicates a trace of glucose concentration over time. The graphical representation 2320 indicates a meal bolus ("MEAL") and a correction bolus ("CORRECTION"). In this example, IOB from the meal bolus was present at the time of the correction bolus. The bolus application 2334 determines the behavior of the host's glucose concentration to determine the accuracy of the IOB component of the correction bolus. In the example shown in FIG. 23, the hosts glucose concentration consistently declines after the bolus correction. If the decline is below the host's target glucose concentration, it may indicate that the IOB component underestimated the IOB at the correction bolus, leading to a higher correction bolus than was called for. To correct this, the bolus application 2334 may recommend a change to an IOB parameter to lower the IOB component.

Figure 24:
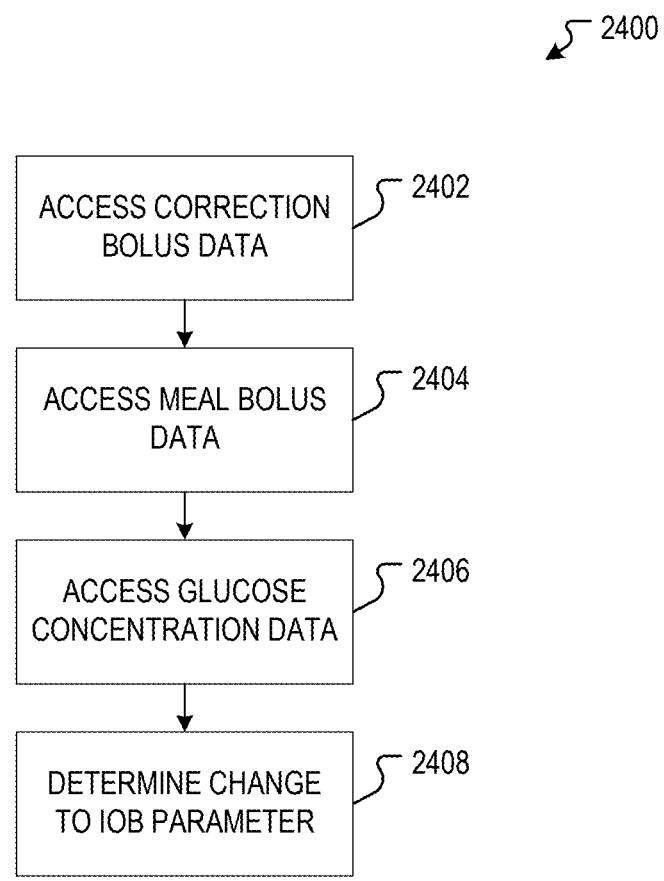
FIG. 24 is a flowchart showing an example of a process flow that may be executed by the bolus application to generate a recommended change to an IOB parameter.

FIG. 24 is a flowchart showing an example of a process flow 2400 that may be executed by the bolus application 2334 to generate a recommended change to an IOB parameter. At operation 2402, the bolus application 2334 accesses correction bolus data describing at least one correction bolus. At operation 2404, the bolus application 2334 accesses meal bolus data describing at least one meal bolus dose received by the host 2301 prior to a correction bolus dose. In some examples, operation 2404 is omitted and the bolus application 2334 determines a recommended change to an IOB parameter considering only the correction bolus data. At operation 2406, the bolus application 2334 accesses glucose concentration data describing glucose concentrations for the host 2301 at or around the time of the bolus or boluses described by the data accessed at operations 2402 and 2404.

At operation 2408, the bolus application 2334 determines a change to an IOB parameter based on the correction bolus data and the glucose concentration data and, in some examples, the meal bolus data accessed at operation 2404. Any suitable method may be used to generate the recommended change to the IOB parameter. In some examples, the bolus application 2334 substitutes an actual glucose concentration into the correction bolus dose formula, such as the Equation [1] above. Holding the correction bolus dose equal to the actual correction bolus administered, the bolus application 2334 solves for actual IOB component. Actual IOB parameters can be found by determining one or more IOB parameter changes that lead to an IOB component that matches or is similar to the actual IOB component. In some examples, a single IOB parameter or limited set of IOB parameters may not generate a matching IOB component for every historical bolus dose. If a match is not found, the bolus application 2334 may be programmed to assign a cost to the difference between an actual IOB component (observed by the host) and the IOB component determined with a particular IOB parameter of set of IOB parameters. The distance may be determined utilizing a squared difference between IOB components or any other suitable manner. The IOB parameters for use by the bolus application 2334 may be determined to minimize the sum of the cost across the set of considered correction boluses.

In some examples, the bolus application 2334 determines the change to the IOB parameter, at least in part, by identifying a post-bolus pattern in the glucose concentration of the host 2301 over a set of considered bolus doses described by the bolus data. The set of considered bolus doses can include, for example, JOB-affected bolus doses, correction bolus doses, JOB-affected correction bolus doses, etc. A post-bolus pattern occurs when the glucose concentration of the host behaves similarly over some or all of the considered bolus doses. A post-bolus pattern can be determined in any suitable manner. In some examples, a post-bolus pattern is determined by finding a mean, median, or other aggregation of glucose concentrations for the host 2301 after a considered bolus dose. A post-bolus pattern may be observed at any suitable time after the considered bolus doses including, for example, 30 minutes, 60 minutes, 90 minutes, etc.

Consider an example in which a post-bolus pattern indicates that the glucose concentration of the host 2301 is below the host's target glucose concentration (e.g., 20 minutes after the considered bolus doses), it may indicate that the IOB component of the bolus dose underestimates the IOB for the host. In this example, the bolus application 2334 may recommend a change to an IOB parameter that tends to increase the IOB component of determined boluses. Consider another example in which a post-bolus pattern indicates that the glucose concentration of the host 2301 is above the host's target glucose concentration 35 minutes after the considered bolus doses. In this example, the bolus application 2334 may recommend a change to an IOB parameter that tends to decrease the IOB component of determined boluses.

Example IOB parameters include Insulin Action Time (IAT), as well as various coefficients or other parameters describing the shape of an IOB curve. For example, the bolus application 2334 may generate IOB utilizing a function representing a curve, such as a cumulative lognormal distribution curve. IOB parameters for such a function may include the mean and standard deviation of the normal distribution associated with the lognormal distribution.

Also, in some examples, the change to an IOB parameter may depend on when the post-bolus pattern occurs (e.g., how long after the bolus dose), or the size of the bolus. These and other factors may affect the size of the change to the IOB parameter or parameters, a choice of which IOB parameter or parameters to change, etc.

Determining accurate bolus doses for a host is a consistent challenge. For example, as described herein, the proper level of insulin for a bolus dose to achieve a target glucose concentration depends on many factors including, the host's current blood sugar, a meal to be eaten (if any), the host's activity level, alcohol consumption, etc. Further, the proper level of insulin for a bolus dose can also depend on physiological factors that are difficult to directly measure. Various examples address these and other issues utilizing a bolus application that is programmed to determine bolus doses for a host considering a trend adjustment. According to a trend adjustment, the bolus application uses glucose concentration data received from an analyte sensor system to determine a glucose concentration rate-of-change (ROC) for the host. The bolus application uses the glucose concentration ROC to determine a predicted glucose concentration at a future time after a prediction time period. The bolus application then determines the bolus dose for the host including a trend component that corrects for the predicted glucose concentration, as described herein.

Figure 25:
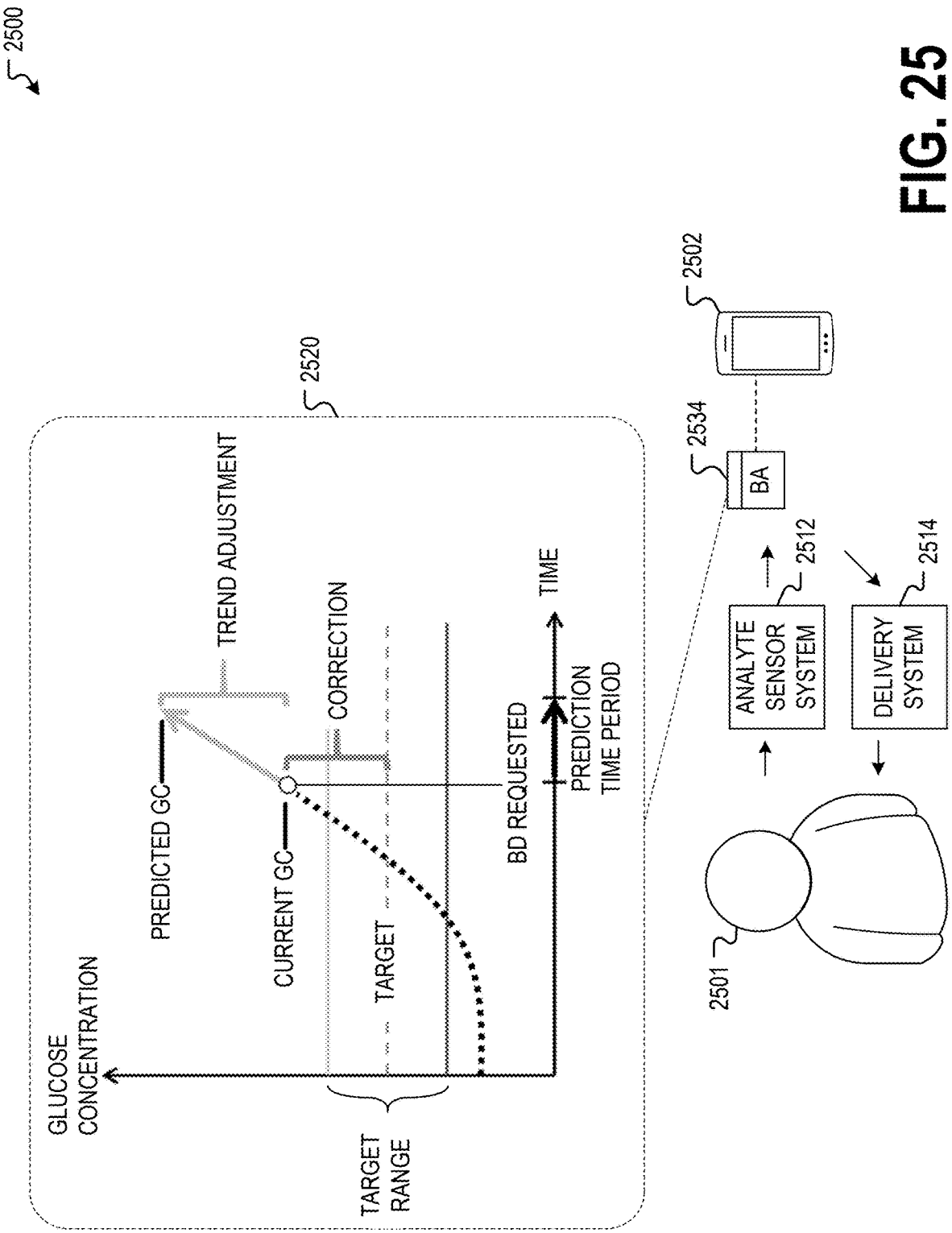
FIG. 25 is a diagram showing an example of an environment that demonstrates the use of a bolus application to determine bolus doses for a host using a trend adjustment, as described herein.

FIG. 25 is a diagram showing an example of an environment 2500 that demonstrates the use of a bolus application 2534 to determine bolus doses for a host 2501 using a trend adjustment, as described herein. In this example, the host 2501 utilizes a computing device 2502 to execute the bolus application 2534. The computing device 2502 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 2502 may include and/or be in communication with an analyte sensor system 2512 and a delivery system 2514. The analyte sensor system 2512, similar to the analyte sensor system 102, may detect an analyte at the host 2501, such as a glucose concentration of the host 2501. The delivery system 2514 is configured to deliver a bolus dose to the host 2501. For example, the delivery system 2514 can be or include an insulin pen, an insulin pump, or other suitable delivery system.

In the example of FIG. 25, the bolus application 2534 receives bolus request data describing a requested bolus dose. (In some examples, the bolus application 2534 determines a combined basal/bolus dose and/or determines a basal dose in addition to the requested bolus dose). The bolus application 2534 adjusts for a glucose concentration trend, as described herein, by considering a trend component of the bolus dose. As described elsewhere herein, a bolus dose can be determined considering a correction component and (if the bolus dose is associated with a meal), a meal component. An example for determining a correction component is given by Equation [1] herein while an example for determining a meal component is given by Equation [2]

herein. As also described herein, a total bolus dose can be found by summing a correction component and a meal component (if any).

FIG. 25 includes a graphical representation 2520 to demonstrate how the bolus application 2534 determines a bolus dose using a trend component. In some examples, the bolus application 2534 generates or renders a graphical representation similar to the graphical representation 2520, for example, to be displayed at a display of the computing device 2502. In other examples, however, the bolus application 2534 utilizes some or all of the concepts described herein without rendering a graphical representation similar to the graphical representation 2520.

The graphical representation 2520 shows a glucose concentration trace plotted on a graph in which the horizontal axis corresponds to time and the vertical axis corresponds to glucose concentration. The graph indicates a target glucose concentration range ("TARGET RANGE") and a target glucose concentration value ("TARGET"). In this example, the glucose concentration trace begins below the target glucose concentration range and begins rising.

At the indicated time ("BD REQUESTED"), the bolus application 2534 receives a request to determine a bolus dose for the host 2501. The request is accompanied, in some examples, with meal data describing a meal associated with the bolus dose (if the bolus dose is to include a meal component). The meal data may include a number of carbs in the meal, as described herein.

The bolus application 2534 receives glucose concentration data from the analyte sensor system 2512. The glucose concentration data can include glucose concentrations for the host 2501 at multiple different times. The bolus application 2534 utilizes the glucose concentration data to generate a glucose concentration rate-of-change (ROC) for the host 2501. The glucose concentration ROC indicates a change in glucose concentration per unit time (e.g., mg/dL per second). A positive glucose concentration ROC may indicate that the glucose concentration of the host 2501 is rising while a negative glucose concentration ROC may indicate that the glucose concentration of the host 2501 is dropping.

Using the glucose concentration ROC, the bolus application 2534 projects from the current glucose concentration of the host 2501 ("CURRENT GC") to generate a predicted glucose concentration ("PREDICTED GC") for the host 2501 at the future time. The future time is after a current time, where the current time is a time when the bolus dose was requested or is to be administered. The future time is separated from the current time be a prediction time period ("PREDICTION TIME PERIOD"). The prediction time period can be any suitable value. In some examples, the prediction time period is between about five minutes and sixty minutes. In some examples, the prediction time period is between about ten minutes and about forty minutes. In some examples, the prediction time period is different depending on characteristics of the host 2501. For example, the bolus application 2534 may use a first prediction time period for hosts who are above a threshold age and a second, shorter prediction time period for hosts who are below the threshold age. In some examples, a prediction time period of twenty minutes is used for hosts 2501 under the age of eighteen while a prediction time period of thirty minutes is used for hosts 2501 who are eighteen and over.

The graphical representation 2520 illustrates a correction ("CORRECTION") which is the difference between the current glucose concentration of the host 2501 ($GC_M$ in Equation [1]) and target glucose concentration of the host 2501 ($GC_T$ in Equation [1]). The correction may be used to generate a correction component of the bolus, for example, using the correction and an insulin sensitivity factor (ISF) for the host 2501, for example, as shown in Equation [1].

The glucose application 2534 may find a trend component, for example, as given by Equation [3] below:

$$TC = \frac{GC_P - GC_M}{ISF} \quad [3]$$

In Equation [3], TC is the trend component. $GC_M$ is the measured glucose concentration of the host 2501 (e.g., CURRENT GC) and indicates the glucose concentration of the host 101 at or about the time that the bolus dose is to be received. $GC_P$ is the predicted glucose concentration after the prediction time period. Similar to Equation [1], in Equation [3] ISF is the insulin sensitivity factor of the host 2501. The total bolus dose determined by the bolus application 2534 can be a sum or other suitable combination of a correction component, a meal component (if any), and the trend component.

Figure 26:
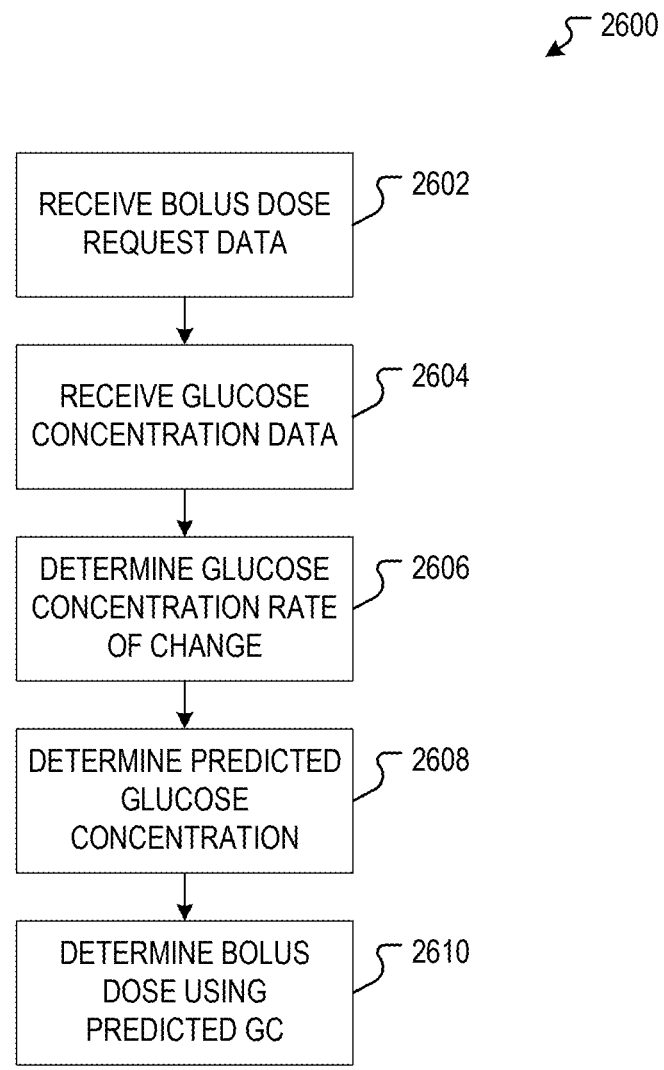
FIG. 26 is a flowchart showing an example of a process flow that can be executed by the bolus application to determine a bolus dose for the host using a trend component.

FIG. 26 is a flowchart showing an example of a process flow 2600 that can be executed by the bolus application 2534 to determine a bolus dose for the host 2501 using a trend component. At operation 2602, the bolus application 2534 receives bolus dose request data describing a requested bolus dose. The bolus dose request data describes the bolus dose that is to be determined. For example, the bolus dose request data can include meal data describing a meal associated with the bolus dose. The bolus dose data may also indicate that no meal is to be associated with the bolus dose (e.g., that it is a correction bolus).

At operation 2604, the bolus application 2534 receives glucose concentration data from the analyte sensor system 2512. The glucose concentration data can be continuous glucose concentration data. For example, the glucose concentration data can include glucose concentration values for the host 2501 over a number of times (e.g., at least two times). At operation 2606, the bolus application 2534 utilizes the glucose concentration data to determine a glucose concentration ROC for the host 1501. The glucose concentration ROC can be determined in any suitable manner. In some examples, the bolus application 2534 finds a best-fit line between the glucose concentration values for the host 2501 over two or more times. In other examples, the glucose concentration ROC is found by measuring two glucose concentration values and taking a difference between the two glucose concentration values over the time between the two glucose concentration values. Also, any other suitable technique for finding glucose concentration ROC may be used.

At operation 2608, the bolus application 2534 determines a predicted glucose concentration at a future time, where the future time is after a current time by a prediction time period, as described herein. At operation 2610, the bolus application 2534 determines a bolus dose using the predicted glucose concentration. For example, the bolus application 2534 may generate a trend component, for example, as indicated by Equation [3]. The trend component may be summed with a correction component (e.g., determined in accordance with Equation [2]) and, if there is an associated meal, a meal component (e.g., determined in accordance with Equation [1]).

In some examples, the bolus application 2534 is also configured to consider a carbs-on-board (COB) component.

To utilize a carbs-on-board component, the bolus application 2534 is configured review bolus data describing previous bolus doses provided to the host 2501 and/or meals previously consumed by the host. Bolus data describing previous bolus doses may be received in any suitable manner, including those described herein. Also, in some examples, the host 2501 may provide meal data describing previously consumed meals. From the bolus data and/or meal data, the bolus application 2534 can determine a COB value describing carbs that have been previously consumed, but not covered by a previous bolus dose. The COB value may be converted to a COB component, for example, as indicated by Equation [4] below:

$$COBC = \frac{COB}{ICR} \quad [4]$$

In Equation [4], COBC is a carbs-on-board component of a bolus dose. COB is the carbs-on-board value described above indicating carbs that the host 2501 has previously consumed but have not been covered by a previous bolus dose. ICR is the insulin to carbs ratio for the host 2501. A COB component can be summed with other components (e.g., meal component, correction component, trend adjustment, insulin-on-board, etc.) to generate a bolus dose.

Figure 27:
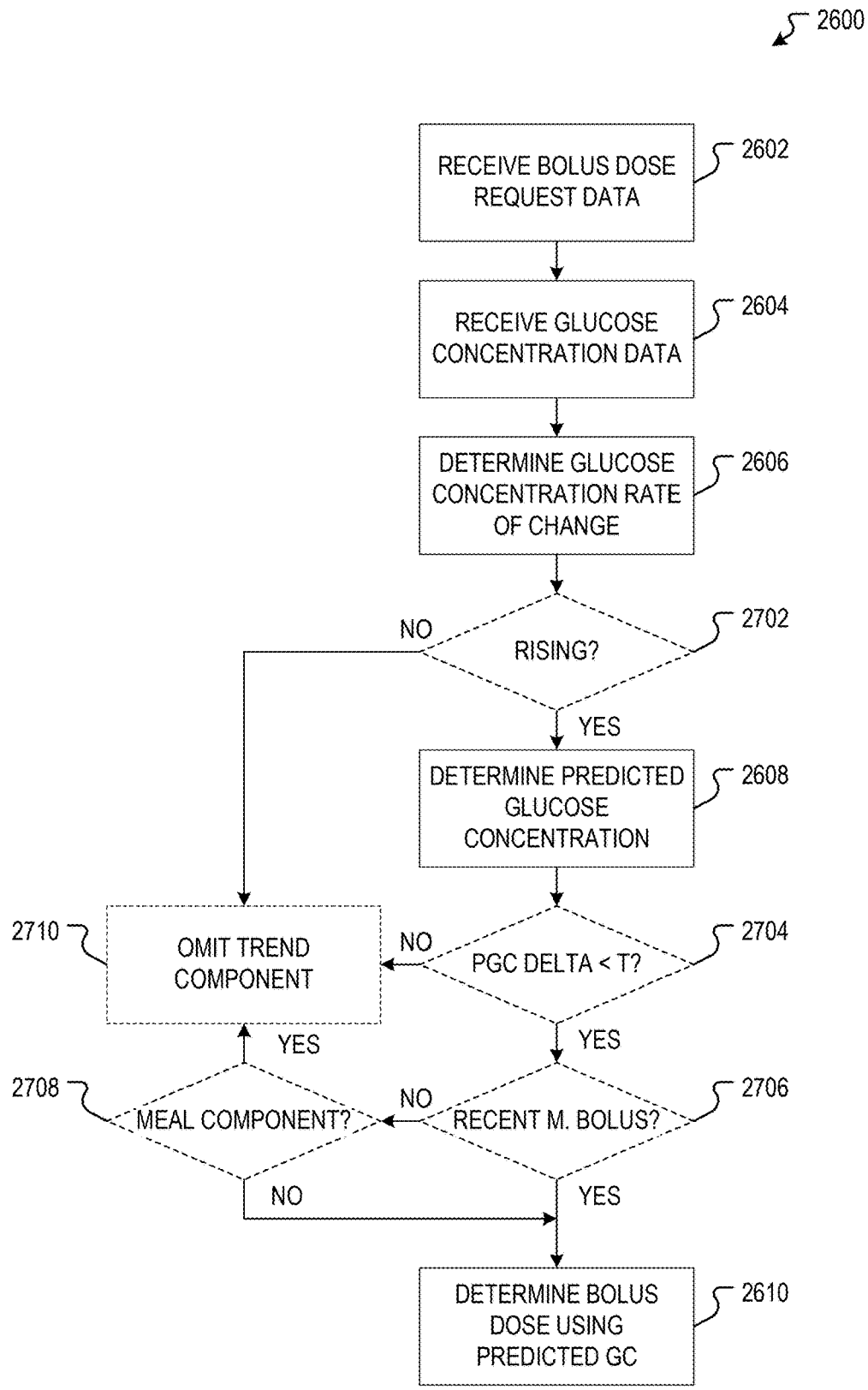
FIG. 27 is a diagram showing another example of the process flow of FIG. 26 with additional operations for omitting a bolus trend component in some circumstances.

In some examples, it is not desirable to use a trend adjustment for determining a bolus dose for the host 2501 in all circumstances. FIG. 27 is a diagram showing another example of the process flow 2600 of FIG. 26 with additional operations for omitting a bolus trend component in some circumstances. For example, after determining the glucose concentration ROC at operation 2606, the bolus application 2534 may optionally determine at operation 2702 whether the glucose concentration ROC is rising. If the glucose concentration ROC is rising, the bolus application may proceed to operation 2608 as described above. If the glucose concentration ROC is not rising, the bolus application 2534 may, at operation 2710, determine the bolus dose for the host 2501 while omitting a trend component (e.g., using the correction component and meal component (if any) only).

Similarly, at optional operation 2704, after determining the predicted glucose concentration at operation 2608, the bolus application 2534 may determine if a difference between the predicted glucose concentration and the current glucose concentration is less than a threshold. For example, if the predicted glucose concentration is different from the current glucose concentration by more than the threshold amount, it may indicate that the predicted glucose concentration is unreliable. Accordingly, the bolus application 2534 may determine the bolus dose for the host 2501 while omitting a trend component at operation 2710. In some examples, instead of omitting the trend component, the bolus application 2534 modifies the predicted glucose concentration to the maximum allowable value. For example, if the maximum difference from the current glucose concentration to the predicted glucose concentration is 50 mg/dL, and the current glucose concentration is 150 mg/dL, the glucose application 2534 may set the predicted glucose concentration value to 200 mg/dL and determine the bolus using a trend component.

Another scenario where it may not be desirable to use trend adjustment is if there was an immediately preceding meal bolus or if the host has otherwise recently ingested food, for example, if the host began eating a meal before receiving a bolus dose to cover the meal. In such a situation, all or part of the glucose concentration ROC may be due to prandial variations in glucose concentration, making the glucose concentration ROC less predictive of the host's future glucose concentration. For example, the host's previous meal may cause the host's glucose concentration (and associated ROC) to rise.

Accordingly, at optional operation 2706, the bolus application 2534 may determine whether a previous meal bolus was received by the host 2501 within a threshold time period (e.g., 30 minutes, 1 hour, 2 hours, etc.). For example, the bolus application 2534 may determine whether it provided a meal bolus determination in that time. In addition to or instead of determining whether it provided a meal bolus determination within the threshold time period, the bolus application 2534 may analyze glucose concentration data to detect a previous bolus dose and/or characterize a previous bolus dose as a meal bolus, for example, as described herein. If no previous meal bolus within the threshold time is detected, the bolus application 2534 proceeds to operation 2610.

In some examples, upon determining, at operation 2706, that there was a previous meal bolus within the threshold time period, the bolus application may omit a trend component from the current bolus determination at operation 2710. In other examples, the bolus application 2534 first determines, at operation 2708, whether the currently requested bolus dose includes a meal component. If the currently requested bolus dose does include a meal component, then the bolus application 2534 may omit a trend component at operation 2710. If the currently requested bolus dose does not include a meal component, the bolus application 2534 may proceed to operation 2610.

Figure 28:
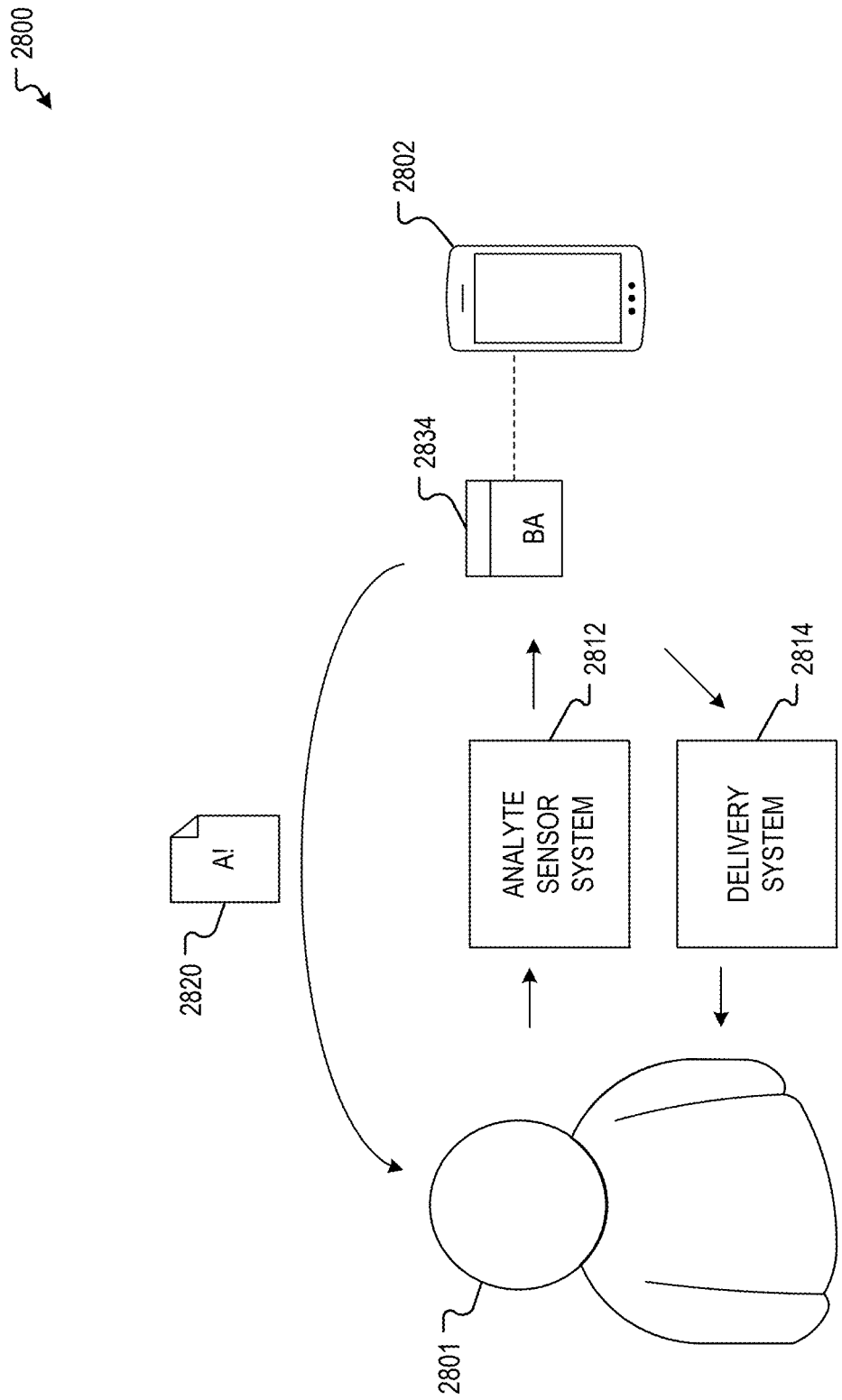
FIG. 28 is a diagram showing an example of an environment 2800 showing a bolus application 2834 that is configured to generate glucose concentration alerts considering bolus data.

FIG. 28 is a diagram showing an example of an environment 2800 showing a bolus application 2834 that is configured to generate glucose concentration alerts considering bolus data. For example, it is desirable for the host 2801 to be alerted when his or her glucose concentration is outside of a target range. For example, if the host's glucose concentration above the target range, it may indicate a current or imminent hyperglycemic episode. It may be desirable for the host 2801 to treat the hyperglycemic episode, for example, by receiving a correction bolus. Also, for example, if the host's glucose concentration is below the target range, it may indicate a current or imminent hypoglycemic episode. It may be desirable for the host 2801 to treat the hypoglycemic episode, for example, by receiving food including carbohydrates to increase glucose concentration.

In various examples, however, the relationship between glucose concentration and the likelihood of hyperglycemic or hypoglycemic episodes depends on bolus data describing one or more recent bolus doses received by the host 2801. For example, it is common for the host's glucose concentration to rise upon eating a meal and then fall again after a meal bolus dose received with the meal begins to take effect. Such a rise, in conjunction with a meal bolus, may not indicate a current or imminent hyperglycemic event. Also, the host 2801 may sometimes forget to take a bolus dose before eating a meal. When this occurs, it may be desirable to catch the missed bolus dose early to allow the host to receive a bolus dose before the host's glucose concentration becomes dangerously high.

In various examples, these and other issues are addressed by configuring a bolus application 2834 to select a glucose concentration alert threshold for alerting the host 2801 based at least in part on bolus data. A glucose concentration alert threshold is a glucose concentration level above which the bolus application 2834 generates an alert 2820 to the host 2801 indicating a potential hypoglycemic or hyperglycemic episode. In some examples, the bolus application 2834 utilizes a hyperglycemic alert threshold and a hypoglycemic alert threshold. When the glucose concentration of the host 2801 is above the hyperglycemic alert threshold, the bolus application 2834 generates servers an alert 2820 indicating a current or imminent hyperglycemic event. When the glucose concentration of the host 2801 is lower than the hypoglycemic alert threshold, the bolus application 2834 serves an alert 2820 indicating a current or imminent hypoglycemic event.

In the example of FIG. 28, the host 2801 utilizes a computing device 2802 to execute the bolus application 2834. The computing device 2802 can be any suitable computing device such as, for example, the medical device 108, the user computing device 132, the tablet computing device 114, the smart pen 116, the smart device 112, the medical device 122, the computing device 118, the remote terminal 128, and/or the server system 126.

The computing device 2802 may include and/or be in communication with an analyte sensor system 2812 and a delivery system 2814. The analyte sensor system 2812, similar to the analyte sensor system 102, may detect an analyte at the host 2801, such as a glucose concentration of the host 2801. The delivery system 2814 is configured to deliver a bolus dose to the host 2801. For example, the delivery system 2814 can be or include an insulin pen, an insulin pump, or other suitable delivery system.

In the example of FIG. 28, the bolus application 2834 receives glucose concentration data from the analyte sensor system 2812. The glucose concentration data indicates at least a current glucose concentration of the host 2801. The bolus application 2834 can also receive bolus data. The bolus data indicates at least one previous bolus dose provided to the host 2801. The bolus data can be received or accessed from any suitable source. In some examples, the bolus data is stored at a data storage associated with the bolus application 2834, for example, at the computing device 2802. For example, bolus data may include data regarding one or more previous bolus doses determined for the host 2801 by the bolus application 2834. In other examples, bolus data is received from the host 2801, for example, via a bolus application user interface. Also, in some examples, bolus data is received from a delivery system 2814, for example, based on a record of bolus doses provided to the host 2801 by the deliver system 2814.

Using the bolus data, the bolus application 2834 modifies a glucose concentration alert threshold. In some examples, the selected glucose concentration alert threshold is a hyperglycemic alert threshold. For example, if a meal bolus was received by the host 2801 within a threshold time period (e.g., on hour, two hours, four hours, etc.), the bolus application 2834 may tend to increase the hyperglycemic alert threshold, such that the alert 2820 is not sent to indicate a current or imminent hyperglycemic episode until or unless the glucose concentration of the host 2801 is higher than the level that would otherwise trigger an alert 2820.

On the other hand, if no meal bolus was received by the host 2801 within a threshold time period (e.g., one hour, two hours, four hours, etc.), it may indicate that the host 2801 is due to eat a meal and may have missed, or may be about to miss, a meal bolus (e.g., eat a meal without receiving a corresponding bolus dose). Accordingly, the bolus application 2834 may reduce the hyperglycemic alert threshold, such that the alert 2820 is sent to indicate a current or imminent hyperglycemic episode at an earlier host 2801 glucose concentration than otherwise.

In some examples, the bolus application 2834 utilizes an insulin-on-board (IOB) value derived from the bolus data to determine one or more glucose concentration alert thresholds. The bolus application 2834 may determine an IOB value for the host 2801 based on the bolus data. For example, the bolus application 2834 may consider the time that a most recent bolus dose was received by the host 2801 and an insulin action time (IAT) model as described herein. The bolus application 2834 may set the hyperglycemic alert threshold based on the IOB. A higher IOB (e.g., above an IOB threshold) may cause the bolus application 2834 to raise the hyperglycemic alert threshold. For example, a higher IOB may indicate that the IOB at the host 2801 will tend to reduce the glucose concentration at the host 2801 without further treatment, meaning that treatment for a current or imminent hyperglycemic episode may not be desirable until a higher blood glucose is received. Similarly, a lack of IOB at the host 2801 may indicate a long time since a previous bolus, which may indicate that the host 2801 is due to eat or may have already missed a meal bolus. Accordingly, a low IOB or lack of IOB may cause the bolus application 2834 to lower the hyperglycemic alert threshold. In some examples, IOB may be utilized to modify a hypoglycemic alert threshold indicating when the host 2801 is at risk of a hypoglycemic event. For example, if there has been a recent bolus or current IOB is high (e.g., higher than a threshold value), the hypoglycemic alert threshold can be raised because, in these conditions, the remaining insulin action could lower glucose further and put the host at greater risk of a hypoglycemic episode.

Other factors that may be considered to determine glucose concentration alert thresholds may include historical glucose patterns, contextual information, the host's history of food intake or calculated carbs on board, and/or a glucose rate of change. For example, historical glucose patterns may be considered to make glucose concentration alert thresholds more or less aggressive at times of day when the individual host tends to have high or low glucose. Contextual information, such as data describing the host level of exercise or stress, may affect the probability of a hyperglycemic episode and may be accordingly considered. For example, if contextual information indicates that the host is at a higher risk of a hyperglycemic episode, then the bolus application 2834 may utilize a lower hypoglycemic alert threshold. The host's history of food intake or calculated carbs on board can be used, for example, to raise the hypoglycemic alert threshold if the host has recently eaten or has carbs on board. The glucose rate of change may be used, fore example, to lower the hypoglycemic alert threshold when current glucose rate of change is high. In some examples, a predicted glucose that accounts for current rate of change could be evaluated against the hypoglycemic alert threshold instead of current glucose.

Figure 29:
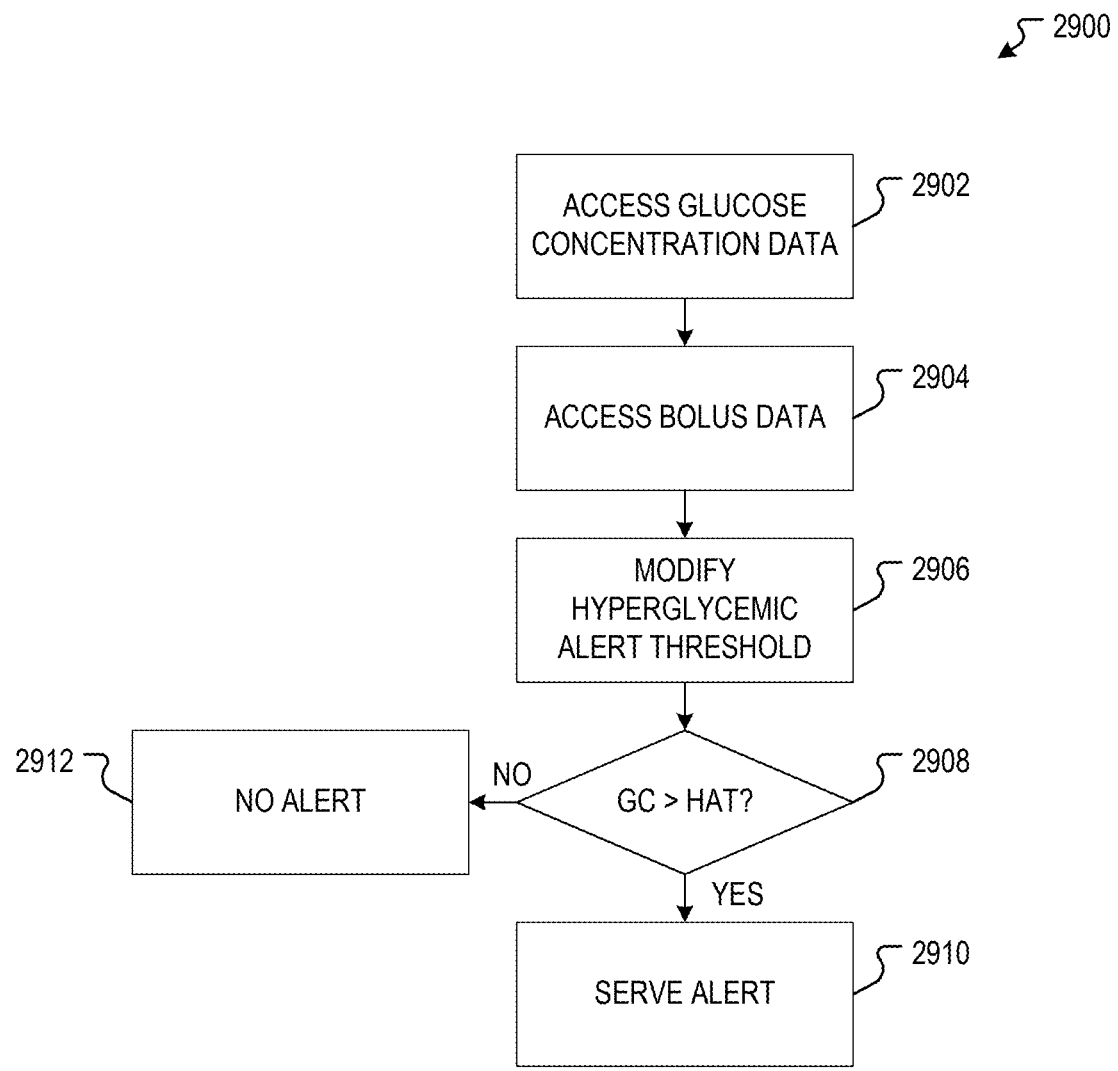
FIG. 29 is a flowchart showing an example of a process flow that may be executed by a bolus application to generate bolus informed alerts for a host.

FIG. 29 is a flowchart showing an example of a process flow 2900 that may be executed by the bolus application 2834 to generate bolus informed alerts for the host 2801. At operation 2902, the bolus application 2834 accesses glucose concentration data, for example, from the analyte sensor system 2812. At operation 2904, the bolus application 2834 accesses bolus data, for example, as described herein. For example, the bolus data can describe previous bolus and/or combined basal/bolus doses received by the host 2801.

At operation 2906, the bolus application 2834 modifies a hyperglycemic alert threshold based on the bolus data. For example, if more than a threshold time period has passed since the previous bolus dose for the host 2801 and/or the value of IOB is high, the bolus application 2834 may lower the hyperglycemic alert threshold. Also, if less than a threshold time period has passed since the previous bolus dose received by the host 2801 and/or the value of IOB is high, the bolus application 2834 may raise the hyperglycemic alert threshold. Any suitable thresholds may be used. In some examples, if less than the threshold time period has passed since the previous bolus dose and/or the value of IOB is high, the hyperglycemic alert threshold may be between about 220 mg/dL and 280 mg/dL. In some examples, the threshold is about 250 mg/dL. Also, in some examples, if more than the threshold time period has passed since the previous bolus dose and/or the value of IOB is not high, the hyperglycemic alert threshold may be between about 160 mg/dL and about 200 mg/dL. In some examples, the threshold is about 180 mg/dL.

At operation 2908, the bolus application 2834 determines if the glucose concentration of the host 2801 is greater than the hyperglycemic alert threshold determined at operation 2906. If the glucose concentration is greater than the hyperglycemic alert threshold then the bolus application 2834 may serve an alert 2820 at operation 2910. If the glucose concentration is not greater than the hyperglycemic alert threshold, then the bolus application may not serve the alert 2820 at operation 2912.

Figure 30:
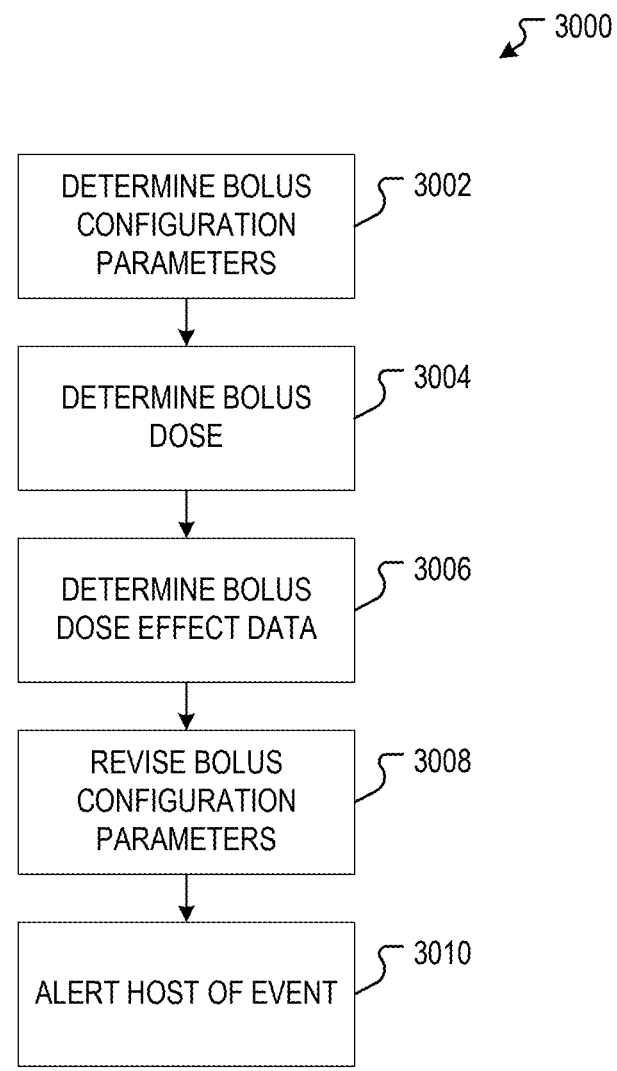
FIG. 30 is a flowchart showing an example of a process flow that can be executed by a bolus application to execute various techniques described herein.

The various examples described herein for managing bolus doses can be practiced individually or, in some examples, can be practiced together in any suitable combination. For example, FIG. 30 is a flowchart showing an example of a process flow 3000 that can be executed by a bolus application (e.g., bolus application 134A, 134B, 134C, 134D, 134E, 134F, 134G, 134H, 734, 1134, 1634, 2034, 2334, 2534, and/or 2834) to execute various techniques described herein. It will be appreciated that any of the operations of the process flow 3000 may be omitted and/or substituted, depending on the configuration. In other examples, the order of the operations of the process flow 300 can be modified. For example, determining a bolus dose (operation 3004) and determining bolus dose effect data (3006) can be performed together or in reverse order. Other modifications are also contemplated.

At operation 3002, the bolus application determines bolus configuration parameters for determining bolus doses for a host. This may be performed in any suitable manner including, for example, as described herein with respect to FIGS. 7-10. In some examples, the bolus application may directly query the host to provide bolus configuration parameters. In some examples, the bolus application may begin with a default set of bolus configuration parameters that is the same for every host and/or is based on characteristics of the host (e.g., size, weight, age, diabetes type, etc.)

At operation 3004, the bolus application determines a bolus dose for the host, for example, based on a request from the host. The determined bolus dose can be a correction bolus dose, a meal bolus dose, and/or a mixed bolus dose. Various different techniques can be used. In some examples, the bolus application implements a case-based reasoning technique described herein with respect to FIGS. 16-19. In some examples, the bolus application implements a trend-adjusted technique described herein with respect to FIGS. 25-27. In some examples, the bolus application implements a combination of the described techniques, for example, using a case-based reasoning technique that considers glucose concentration trend as a case parameter. In other examples, the bolus application can determine the bolus dose using an application of a formula or set of formulas, such as Equations [1] and [2] described herein. The determined bolus dose can be displayed to the host at a user interface and/or provided to a delivery device, as described herein.

At operation 3006, the bolus application determines bolus dose effect data, for example, as described herein with respect to FIGS. 11-15. The bolus dose effect data can be provided to the host, as described herein, to allow the host to verify the correctness of the determined bolus dose before receiving the bolus dose.

At operation 3008, the bolus application revises bolus configuration parameters based on glucose concentration data received after the determined bolus dose is received. In some examples, this includes classifying bolus doses as described herein with respect to FIGS. 20-22. In some examples, the bolus application also determines a host action based on the classification as also described with respect to FIGS. 20-22. Examples that describe modifying bolus configuration parameters, with respect to IOB parameters, are described herein with respect to FIGS. 23 and 24.

At operation 3010, the bolus application alerts the host of an event, for example, based on glucose concentration data. The event can be a hyperglycemic or hypoglycemic episode, and/or an indication for other host action such as, for example, as described herein with respect to FIGS. 28 and 29.

Figure 31:
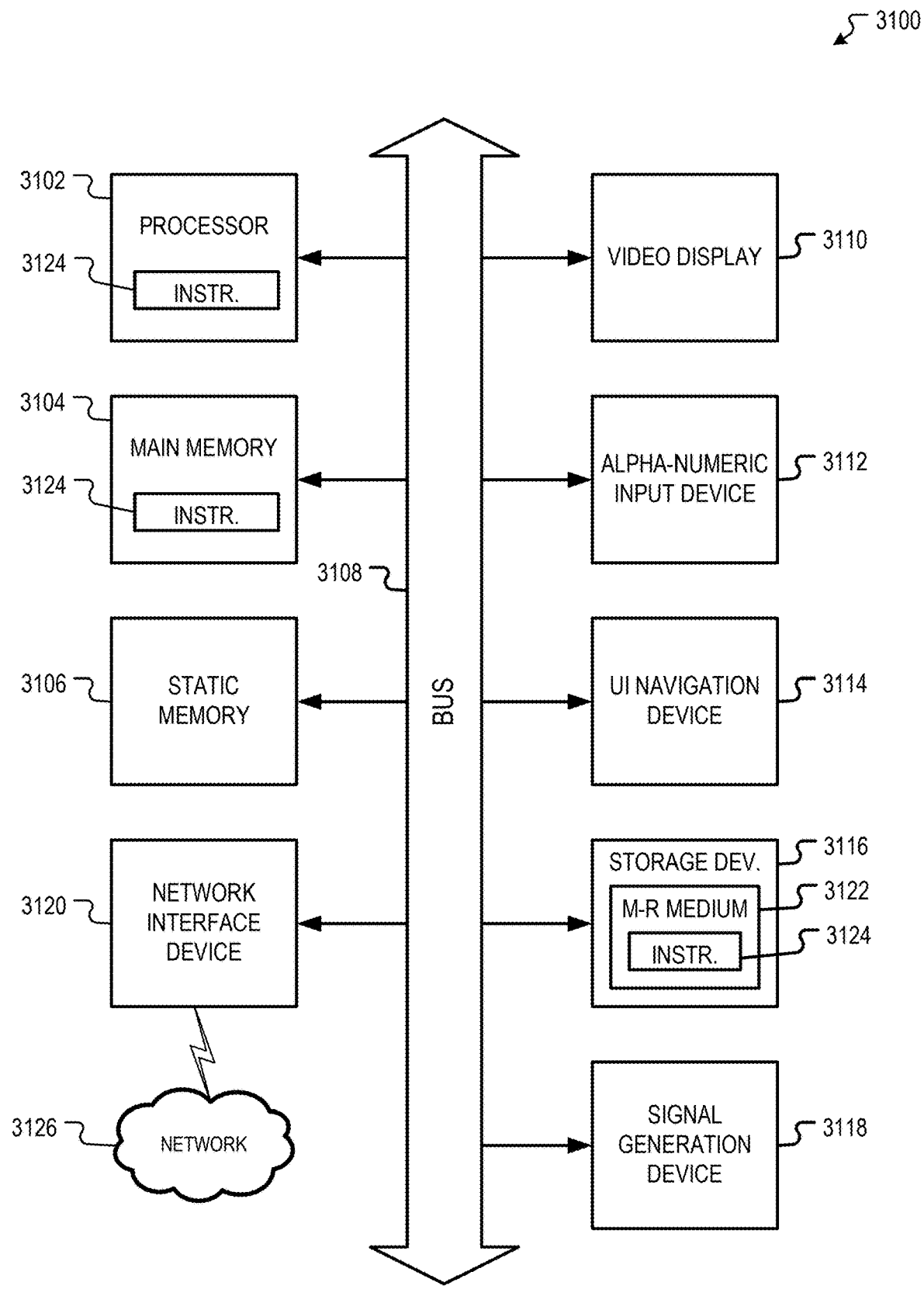
FIG. 31 is a block diagram illustrating a computing device hardware architecture, within which a set or sequence of instructions can be executed to cause a machine to perform examples of any one of the methodologies discussed herein.

FIG. 31 is a block diagram illustrating a computing device hardware architecture 3100, within which a set or sequence of instructions can be executed to cause a machine to perform examples of any one of the methodologies discussed herein. The hardware architecture 3100 can describe various computing devices including, for example, the sensor electronics 106, the peripheral medical device 122, the smart device 112, the tablet computing device 114, etc.

The architecture 3100 may operate as a standalone device or may be connected (e.g., networked) to other machines. In a networked deployment, the architecture 3100 may operate in the capacity of either a server or a client machine in server-client network environments, or it may act as a peer machine in peer-to-peer (or distributed) network environments. The architecture 3100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 3100 includes a processor unit 3102 comprising at least one processor (e.g., a central processing unit (CPU), a graphics processing unit (GPU), or both, processor cores, compute nodes). The architecture 3100 may further comprise a main memory 3104 and a static memory 3106, which communicate with each other via a link 3108 (e.g., bus). The architecture 3100 can further include a video display unit 3110, an input device 3112 (e.g., a keyboard), and a UI navigation device 3114 (e.g., a mouse). In some examples, the video display unit 3110, input device 3112, and UI navigation device 3114 are incorporated into a touchscreen display. The architecture 3100 may additionally include a storage device 3116 (e.g., a drive unit), a signal generation device 3118 (e.g., a speaker), a network interface device 3120, and one or more sensors (not shown), such as a Global Positioning System (GPS) sensor, compass, accelerometer, or other sensor.

In some examples, the processor unit 3102 or another suitable hardware component may support a hardware interrupt. In response to a hardware interrupt, the processor unit

3102 may pause its processing and execute an ISR, for example, as described herein.

The storage device 3116 includes a machine-readable medium 3122 on which is stored one or more sets of data structures and instructions 3124 (e.g., software) embodying or used by any one or more of the methodologies or functions described herein. The instructions 3124 can also reside, completely or at least partially, within the main memory 3104, within the static memory 3106, and/or within the processor unit 3102 during execution thereof by the architecture 3100, with the main memory 3104, the static memory 3106, and the processor unit 3102 also constituting machine-readable media.

Executable Instructions and Machine-Storage Medium

The various memories (i.e., 3104, 3106, and/or memory of the processor unit(s) 3102) and/or storage device 3116 may store one or more sets of instructions and data structures (e.g., instructions) 3124 embodying or used by any one or more of the methodologies or functions described herein. These instructions, when executed by processor unit(s) 3102 cause various operations to implement the disclosed examples.

As used herein, the terms "machine-storage medium," "device-storage medium," "computer-storage medium" (referred to collectively as "machine-storage medium 3122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 3122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 3122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 3124 can further be transmitted or received over a communications network 3126 using a transmission medium via the network interface device 3120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Each of these non-limiting examples in any portion of the above description may stand on its own or may be combined in various permutations or combinations with one or more of the other examples.

The above detailed description includes references to the accompanying drawings, which form a part of the detailed description. The drawings show, by way of illustration, specific embodiments in which the subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Geometric terms, such as "parallel", "perpendicular", "round", or "square" are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the subject matter should be determined with reference to the claims, along with the full scope of equivalents to which such claims are entitled.

What is claimed is:

1. A system for generating a bolus dose for a host, the system comprising:
    at least one processor programmed to perform operations comprising:
    executing a first method of determining bolus configuration parameters, the executing the first method comprising:
        displaying, at a user interface, at least one first bolus configuration parameter question;
        receiving, through the user interface, at least one first answer to the at least one first bolus configuration parameter question, the at least one first answer describing a previous bolus determination technique of the host;
        selecting, using the at least one first answer, at least one second bolus configuration parameter question;
        providing, at the user interface, the at least one second bolus configuration parameter question;
        receiving, through the user interface, at least one second answer to the at least one second bolus configuration parameter question;
        deriving a first bolus configuration parameter using the at least one first answer and the at least one second answer, wherein the at least one first answer and the at least one second answer do not include the first bolus configuration parameter;
    determining, based on the at least one first answer and the at least one second answer, that a second bolus configuration parameter is not provided via the first method;
    responsive to the determining that the second bolus configuration parameter is not provided via the first method, determining the second bolus configuration parameter via a second method different from the first method, the second method comprising utilization of a trained model that relates the second bolus configuration parameter to one or more of the at least one first answer and the at least one second answer at;
    receiving, from a continuous glucose sensor, a host glucose concentration;
    determining the bolus dose for the host using the host glucose concentration, the first bolus configuration parameter, and the second bolus configuration parameter;
    displaying an indication of the bolus dose at the user interface;
    receiving, from the continuous glucose sensor, at least one additional host glucose concentration after the bolus dose is provided to the host; and
    re-training the trained model based on the provided bolus dose and the at least one additional host glucose concentration.

2. The system of claim 1, the operations further comprising selecting a second set of questions using the at least one first answer, wherein the second bolus configuration parameter question is part of the second set of questions.

3. The system of claim 1, the operations further comprising:
   after receiving the at least one second answer, determining that the at least one first answer and the at least one second answer are not sufficient to determine at least the first bolus configuration parameter; and
   providing, at the user interface, a third bolus configuration parameter question, wherein the deriving of the first bolus configuration parameter is also based at least in part on a third answer to the third bolus configuration parameter question.

4. The system of claim 1, wherein the at least one first answer indicates that the previous bolus determination technique of the host considers glucose concentration and an indication of meal size, and wherein the at least one second answer to the second bolus configuration parameter question indicates that the previous bolus determination technique of the host uses a formula.

5. The system of claim 1, wherein:
   the at least one first answer indicates that the previous bolus determination technique of the host considers a bolus-associated meals,
   the at least one second bolus configuration parameter question requests that the host provide an indication of a bolus insulin dose according to the previous bolus determination technique and an indication of a meal associated with the bolus insulin dose according to the previous bolus determination technique,
   the at least one second answer comprises information about at least one bolus insulin dose for at least one example meal; and
   the deriving the first bolus configuration parameter comprises deriving an insulin-to-carbs ratio based on the information about the at least one bolus insulin dose for the at least one example meal, the first bolus configuration parameter comprising the insulin-to-carbs ratio.

6. The system of claim 1, wherein:
   the at least one first answer indicates that the previous bolus determination technique of the host considers a glucose concentration of the host,
   the at least one second bolus configuration parameter question requests that the host provide an indication of a change to bolus insulin dosing at a meal when a specified deviation between the glucose concentration of the host and a target glucose concentration of the host is present;
   the at least one second answer comprises information about the change to bolus insulin dosing at a meal when the specified deviation is present; and
   the deriving the first bolus configuration parameter comprises deriving an insulin sensitivity factor based on the information about the change to bolus insulin dosing, the first bolus configuration parameter comprising the insulin sensitivity factor.

7. The system of claim 1, wherein the at least one first answer indicates that the previous bolus determination technique of the host uses a bolus dose that is not dependent on meal size or blood glucose, and wherein the determining the second bolus configuration parameter comprises executing the trained model based at least in part on the at least one first answer and the at least one second answer to generate the second bolus configuration parameter.

8. The system of claim 1, the operations further comprising sending, to an insulin delivery system, data describing the bolus dose, the data for use in providing the bolus dose to the host by the insulin delivery system.

9. A method of using a bolus application to generate a bolus insulin dose for a host, the method comprising:
   executing a first method of determining bolus configuration parameters, the executing the first method comprising:
      displaying, by the bolus application and at a bolus application user interface, at least one first bolus configuration parameter question;
      receiving, by the bolus application and through the bolus application user interface, at least one first answer to the at least one first bolus configuration parameter question, the at least one first answer describing a previous bolus determination technique of the host;
      selecting, using the at least one first answer, at least one second bolus configuration parameter question;
      providing, by the bolus application and at the bolus application user interface, the at least one second bolus configuration parameter question;
      receiving, by the bolus application and through the bolus application user interface, at least one second answer to the at least one second bolus configuration parameter question:
      deriving, by the bolus application, a first bolus configuration parameter using the at least one first answer and the at least one second answer, wherein the at least one first answer and the at least one second answer do not include the first bolus configuration parameter;
   determining, based on the at least one first answer and the at least one second answer, that a second bolus configuration parameter is not provided via the first method;
   responsive to the determining that the second bolus configuration parameter is not provided via the first method, determining the second bolus configuration parameter via a second method different from the first method, the second method comprising utilization of a trained model that relates the second bolus configuration parameter to one or more of the at least one first answer and the at least one second answer;
   receiving, by the bolus application and from a continuous glucose sensor, a host glucose concentration;
   determining, by the bolus application, the bolus insulin dose for the host using the host glucose concentration, the first bolus configuration parameter, and the second bolus configuration parameter;
   displaying, by the bolus application, an indication of the bolus insulin dose at the bolus application user interface;
   receiving, from the continuous glucose sensor, at least one additional host glucose concentration after the bolus insulin dose is provided to the host; and
   re-training the trained model based on the provided bolus dose and the at least one additional host glucose concentration.

10. The method of claim 9, further comprising selecting a second set of questions using the at least one first answer, wherein the second bolus configuration parameter question is part of the second set of questions.

11. The method of claim 9, further comprising:
   after receiving the at least one second answer, determining, by the bolus application that it can calculate less than all of a set of bolus configuration parameters; and
   providing, by the bolus application and at the bolus application user interface, a third bolus configuration parameter question, wherein the deriving of the first bolus configuration parameter is also based at least in part on a third answer to the third bolus configuration parameter question.

12. The method of claim 9, wherein the at least one first answer indicates that the previous bolus determination technique of the host considers glucose concentration and an indication of meal size, and wherein the at least one second answer to the second bolus configuration parameter question indicates that the previous bolus determination technique of the host uses a formula.

13. The method of claim 9, wherein the at least one first answer indicates that the previous bolus determination technique of the host considers a bolus-associated meal, and wherein the at least one second answer to the second bolus configuration parameter question requests that the host provide an indication of a bolus insulin dose according to the previous bolus determination technique and an indication of a meal associated with the bolus insulin dose according to the previous bolus determination technique.

14. The method of claim 9, wherein the at least one first answer indicates that the previous bolus determination technique of the host considers a glucose concentration of the host, and wherein the at least one second answer to the second bolus configuration parameter question requests that the host provide an indication of a bolus insulin dose and an indication of a deviation between the glucose concentration of the host and a target glucose concentration of the host.

15. The method of claim 9, wherein the at least one first answer indicates that the previous bolus determination technique of the host uses a bolus dose that is not dependent on meal size or blood glucose, and wherein the determining the second bolus configuration parameter comprises executing the trained model based at least in part on the at least one first answer and the at least one second answer to generate the second bolus configuration parameter.

16. The method of claim 9, further comprising sending, by the bolus application to an insulin delivery system, data describing the bolus insulin dose, the data for use in providing the bolus insulin dose to the host by the insulin delivery system.

17. A machine-readable medium comprising instructions thereon that, when executed by at least one processor, cause the at least one processor to execute operations comprising:

executing a first method of determining bolus configuration parameters, the executing the first method comprising:

displaying, at a user interface, at least one first bolus configuration parameter question;

receiving, through the user interface, at least one first answer to the at least one first bolus configuration parameter question, the at least one first answer describing a previous bolus determination technique of a host;

selecting, using the at least one first answer, at least one second bolus configuration parameter question;

providing, at the user interface, the at least one second bolus configuration parameter question;

receiving, through the user interface, at least one second answer to the at least one second bolus configuration parameter question:

deriving a first bolus configuration parameter using the at least one first answer and the at least one second answer wherein the at least one first answer and the at least one second answer do not include the first bolus configuration parameter;

determining, based on the at least one first answer and the at least one second answer, that a second bolus configuration parameter is not provided via the first method;

responsive to the determining that the second bolus configuration parameter is not provided via the first method, determining the second bolus configuration parameter via a second method different from the first method, the second method comprising utilization of a trained model that relates the second bolus configuration parameter to one or more of the at least one first answer and the at least one second answer, receiving, from a continuous glucose sensor, a host glucose concentration;

determining a bolus dose for the host using the host glucose concentration, the first bolus configuration parameter, and the second bolus configuration parameter;

displaying an indication of the bolus dose at the user interface;

receiving, from the continuous glucose sensor, at least one additional host glucose concentration after the bolus dose is provided to the host; and re-training the trained model based on the provided bolus dose and the at least one additional host glucose concentration.

* * * * *